US010770899B2

(12) United States Patent
Sheble

(10) Patent No.: US 10,770,899 B2
(45) Date of Patent: Sep. 8, 2020

(54) RESOURCE CONTROL BY PROBABILITY TREE CONVOLUTION PRODUCTION COST VALUATION BY ITERATIVE EQUIVALENT DEMAND DURATION CURVE EXPANSION (AKA. TREE CONVOLUTION)

(71) Applicant: Gerald Bernard Sheble, Portland, OR (US)

(72) Inventor: Gerald Bernard Sheble, Portland, OR (US)

(*) Notice: Subject to any disclaimer, the term of this patent is extended or adjusted under 35 U.S.C. 154(b) by 841 days.

(21) Appl. No.: 14/851,403

(22) Filed: Sep. 11, 2015

(65) Prior Publication Data

US 2016/0077507 A1 Mar. 17, 2016

Related U.S. Application Data

(60) Provisional application No. 62/048,815, filed on Sep. 11, 2014.

(51) Int. Cl.
*H02J 3/14* (2006.01)
*G06Q 50/06* (2012.01)
(Continued)

(52) U.S. Cl.
CPC .............. *H02J 3/14* (2013.01); *G06Q 10/06* (2013.01); *G06Q 50/06* (2013.01); *H02J 3/00* (2013.01);
(Continued)

(58) Field of Classification Search
CPC .......... H02J 3/14; H02J 3/00; H02J 2003/007; H02J 2003/146; G06Q 10/06;
(Continued)

(56) References Cited

U.S. PATENT DOCUMENTS 7,698,233 B1 * 4/2010 Edwards ................ G06Q 10/04
700/291
7,775,374 B1 * 8/2010 Barker .................... C02F 9/005
210/203

(Continued)

FOREIGN PATENT DOCUMENTS

KR      10-2009-0043732 A      2/2010

OTHER PUBLICATIONS

Sheble-G., "Smart Grid Millionare—Do you want to be one?", 2008, IEEE Power & Energy Magazine. pp. 22-29.*

(Continued)

*Primary Examiner* — Thomas C Lee
*Assistant Examiner* — Charles Cai
(74) *Attorney, Agent, or Firm* — Cozen O'Connor

(57) ABSTRACT

A method, system and program product for quantifying risk of unserved energy in an energy system using a digital simulation. An energy demand forecast is generated based at least in part on a weather model for near term future periods. A plurality of energy supply resources are committed to meet the plurality of energy demand assisted by a plurality of storage devices and associated ancillary services. A probable operating status is specified for each committed energy supply resource in the energy system. Renewable energy resources such as wind, solar cells, and biofuels are also included in the models for energy supply sources. A determination is made as to whether or not the committed supply resources and storage devices are sufficient to meet the energy demand as well as determine the cost of production above a prespecified loss of demand probability (LODP) and expected unserved energy (EUE).

29 Claims, 44 Drawing Sheets

(51) Int. Cl.
 *G06Q 10/06* (2012.01)
 *H02J 3/00* (2006.01)
(52) U.S. Cl.
 CPC ....... *H02J 2203/20* (2020.01); *H02J 2310/64* (2020.01); *Y02B 70/3225* (2013.01); *Y02P 90/86* (2015.11); *Y04S 20/222* (2013.01); *Y04S 20/224* (2013.01)
(58) Field of Classification Search
 CPC ....... G06Q 50/06; Y02P 90/86; Y04S 20/224; Y04S 20/222; Y02B 70/3225
 USPC ....................................................... 700/295
 See application file for complete search history.

(56) References Cited

U.S. PATENT DOCUMENTS

| | | | | |
|---|---|---|---|---|
| 2003/0006613 | A1* | 1/2003 | Lof | F03D 7/0284 290/44 |
| 2008/0303348 | A1* | 12/2008 | Witters | H02J 3/46 307/72 |
| 2011/0035073 | A1 | 2/2011 | Ozog | |
| 2011/0148195 | A1* | 6/2011 | Lee | H02J 7/35 307/25 |
| 2011/0231028 | A1* | 9/2011 | Ozog | G06Q 10/06 700/291 |
| 2011/0231510 | A1 | 9/2011 | Korsunsky et al. | |
| 2012/0054139 | A1* | 3/2012 | Nikovski | G05B 13/024 706/46 |
| 2012/0109392 | A1* | 5/2012 | Hanks | H02J 3/008 700/291 |
| 2012/0130556 | A1* | 5/2012 | Marhoefer | H02J 3/32 700/291 |
| 2013/0054211 | A1* | 2/2013 | Franke | H02J 3/00 703/6 |
| 2013/0080131 | A1 | 3/2013 | Kaufman et al. | |
| 2013/0179202 | A1* | 7/2013 | Zaher | G06Q 10/06315 705/7.11 |
| 2013/0232094 | A1 | 9/2013 | Anderson et al. | |
| 2014/0048646 | A1* | 2/2014 | DeVaul | B64B 1/40 244/97 |
| 2015/0019036 | A1* | 1/2015 | Murayama | H02J 13/0006 700/291 |
| 2016/0329710 | A1* | 11/2016 | Clifton | H02J 3/32 |
| 2017/0229896 | A1* | 8/2017 | Kearns | H02J 7/02 |

OTHER PUBLICATIONS

International Search Report, dated Jan. 19, 2016, for PCT/US2015/049635, 3 pages.
Written Opinion, dated Jan. 19, 2016, for PCT/US2015/049635, 8 pages.
Hu et al., "Micro-grid State Estimation Using Belief Propagation on Factor Graphs," Department of Electrical Engineering, University of Hawaii at Manoa, URL = http://www-ee.eng.hawaii.edu/~alek/Archive/2010/APSIPA2010.pdf, Nov. 5, 2013, 8 pages.

* cited by examiner

| Committed/Dispatched | Unit Segment | Unit Segment | Unit Segment | Unit Segment | Unit Segment | Unit Segment |
|---|---|---|---|---|---|---|
| 1 – 1 | 1 | 1 | 1 | 1 | 1 | 1 |
| 2 – 1 | 0 | 1 | 1 | 1 | 1 | 1 |
| 3 – 1 | 1 | 1 | 1 | 1 | 1 | 1 |
| 4 - 1 | 1 | 0 | 1 | 1 | 1 | 1 |
| 5 – 1 | 1 | 1 | 0 | 1 | 1 | 1 |
| 6 – 1 | 1 | 1 | 1 | 0 | 1 | 1 |
| 7 – 1 | 1 | 1 | 1 | 1 | 0 | 1 |
| 8 – 1 | 1 | 1 | 1 | 1 | 1 | 0 |
| Generate | Paths | Specified | By | User | Initial | EDDC |
| 1 – 1 | 0 | 1 | 1 | 1 | 1 | 1 |
| 2 – 1 | 0 | 0 | 1 | 1 | 1 | 1 |
| 3 – 1 | 0 | 1 | 0 | 1 | 1 | 1 |
| 4 – 1 | 0 | 1 | 1 | 0 | 1 | 1 |
| 5 – 1 | 0 | 1 | 1 | 1 | 0 | 1 |
| 6 – 1 | 0 | 1 | 1 | 1 | 1 | 0 |
| 7 – 1 | 0 | 0 | 1 | 1 | 1 | 1 |
| 8 – 1 | 0 | 1 | 0 | 1 | 1 | 1 |

| Committed/ Dispatched | Unit Segment | Unit Segment | Unit Segment | Unit Segment | Sensitivity (change in EDDC energy) |
|---|---|---|---|---|---|
| 1 – 2 | 0 | 1 | 1 | 1 | 238.51 |
| 1 – 3 | 0 | 1 | 1 | 1 | 220.5 |
| 3 – 2 | 1 | 1 | 1 | 1 | 185.2 |
| 4 – 2 | 1 | 1 | 1 | 1 | 165.1 |
| 5 – 2 | 0 | 0 | 1 | 1 | 98.2 |
| 6 – 2 | 0 | 0 | 0 | 1 | 88.5 |
| 7 – 2 | 0 | 0 | 0 | 1 | 82.1 |
| 8 – 2 | 0 | 1 | 1 | 0 | 76.4 |
| 1 – 4 | 0 | 1 | 1 | 1 | 65.2 |
| 2 – 3 | 0 | 1 | 1 | 1 | 51.3 |
| 2 – 4 | 0 | 0 | 1 | 1 | 42.7 |
| 4 – 3 | 0 | 1 | 0 | 1 | 30.1 |
| 5 – 3 | 0 | 0 | 1 | 1 | 15.2 |
| 6 – 3 | 0 | 1 | 0 | 0 | 9.2 |
| 7 – 3 | 0 | 1 | 0 | 1 | 1.2 |
| 8 – 3 | 0 | 0 | 1 | 1 | 0.4 |

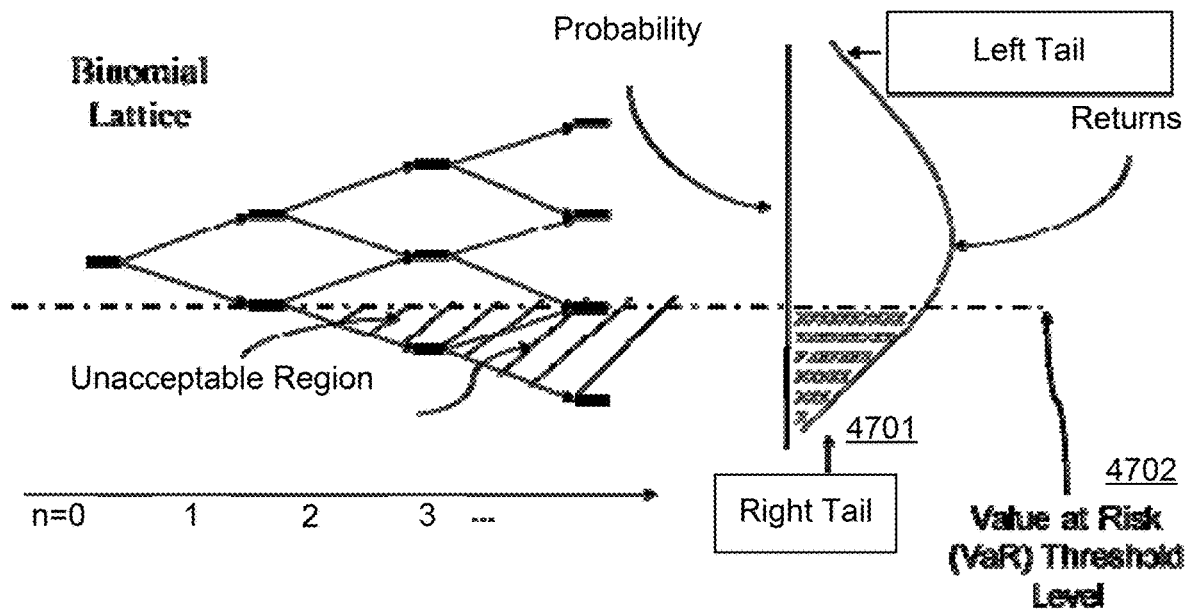

*FIG. 47*

| Input Data for each supply resource 4801 ||||
|---|---|---|---|
| Type of resource (fossil, hydro, wind, solar, biofuel, hydrogen, etc.) 4802 ||||
| cost data tables (Input/Output) ||||
| | heat rate data |||
| operating constraints ||||
| reliability model (availability) ||||
| connection to electrical network ||||
| response models ||||
| | reserves |||
| | | spinning ||
| | | ready ||
| | inertia |||
| | control models |||
| | | voltage control ||
| | | governor control ||
| | fuel |||
| | | fuel inventory ||
| | | connection to fuel network ||
| | | fuel price ||

*FIG. 48*

| Input Data for each storage resource 4901 | | |
|---|---|---|
| | Type of storage (Pumped hydro, compressed air, liquid compressed air, chemical, inertial, etc.) 4902 | |
| | | lower reservoir limits |
| | | upper reservoir limits |
| | | rate of flow from one reservoir to another |
| | | operating constraints |
| | | efficiency of flow (losses) |
| | | reliability model |

*FIG. 49*

| Input Data for each demand location 5001 | | |
|---|---|---|
| | physical model | 5002 |
| | | heat, moving product through process, product manufacturing, other appliances, etc. |
| | | connection to transportation network |
| | | flow constraints |
| | | schedule constraints |
| | | operating constraints |
| | | forecasted demand |
| | | reliability model |

*FIG. 50*

| Input Data for each component of the transportation or distribution network 5101 | | |
|---|---|---|
| Physical model (electrical network, oil or gas flow network, train grid, river grid, etc.) 5102 | | |
| | model values | |
| | | transmission: resistance, inductance, capacitance |
| | | pipeline: diameter, length, elevation changes |
| | pumping components (transformers, pumps, heaters) | |
| | connections to distribution system components | |
| | operating constraints | |
| | reliability model | |

*FIG. 51*

| | |
|---|---|
| Calculate Sensitivity from Optimization Solution to Select Segment Expansion Starting at Lowest Equivalent Demand | |
| | Data to preform warm start or parametric changes to find valuation of branches to be added |

*FIG. 52*

| Input Data fuel contracts 5301 | |
|---|---|
| | type (take or pay) |
| | minimum amount committed |
| | maximum amount committed |
| | price |
| | flow constraints |
| | penalties |

*FIG. 53*

| Input Data Demand Response Management 5401 | | |
|---|---|---|
| Contract type (interruptible, reschedulable, etc.) 5402 | | |
| firm demand | | |
| flexible demand | | |
| model | | |
| | inertia | |
| | governor following | |
| | energy imbalance following | |
| | energy | |
| | contractual | |
| | | limits |
| | | rate limits |
| | availability | |
| | price per response offered | |

*FIG. 54*

| Contingency Contract Bids | Remedial Actions |
|---|---|
| | Suppliers |
| | Buyers |
| | Transportation Suppliers |
| | Paid even if not used |

FIG. 55

| Input Data hydro network model 5601 | | |
|---|---|---|
| | river model 5603 | |
| | | connections |
| | | flow rates |
| | dam model 5602 | |
| | | generator units |
| | | spill gates |
| | | fish runs |
| | | locks |
| | reservoir model 5604 | |
| | | shape |
| | | dimensions |
| | | water intake |

FIG. 56

| Input data for linearized transmission network (PJM) 5701 | |
|---|---|
| | zone i |
| | zone j |
| | flow loss |
| | flow limit |
| | flow cost for service |
| | transmission right |
| | flowgate model |

FIG. 57

| Input Data interchange contracts 5801 |
|---|
| market based |
| price |
| time schedule |
| lower limit |
| upper limit |
| rate limits |
| terms and conditions |

| Input data to define security zones | |
|---|---|
| Interconnection point for transportation model | |
| | Zone 1  5902 |
| | Zone 2  5902 |
| Link between zone and area control or ancillary service area  5901 | |

FIG. 59

| Input data for security constraints | |
|---|---|
| ancillary service requirements | |
| | voltage range limits |
| | frequency range limits |
| | governor range limits |
| | generation control range limits |
| | interchange error limits |

| Tree Convolution Optimization/Simulation Module | |
|---|---|
| Resource Commitment/Dispatch | |
| Optimize Deterministic Formulation | Use Valuation Method selected by User |
| Calculate Sensitivities for PTC Expansion | Start from least cost Resource |
| Build Table of reduced model expansion | Expand segment reliability based on EDDC impact |

FIG. 64

| Calculate Sensitivity from Optimization Solution to Select Segment Expansion Starting at Lowest Equivalent Demand | |
|---|---|
| | Data to preform warm start or parametric changes to find valuation of branches to be added |

FIG. 65

| Contingency Contract Bids Selection | | |
|---|---|---|
| Segment Remedial Actions by Service Type | | |
| Sort Suppliers by Cost for Regulated Environment | | |
| Sort Suppliers by Price for Competitive Environment | | |
| Sort Transportation Suppliers by Equipment Control | | |
| Dispatch each Remedial Action until | | |
| | Max Amount of Resource is Binding | |
| | Min Amount of Resource is Binding | |

FIG. 66

| Forced Outage Rates Degradation Model |||
|---|---|---|
| Calculate the forced outage rate (FOR) by taking the status from present historical data as the nominal value |||
| | | If the resource forced outage rate is below a threshold, then the resource is placed on maintenance as the resource will have to be on outage |
| | | If the resource has been available longer than the MTTF, the forced outage rate is increased as the resource will more likely to be on outage based on statistics of exponential decay |
| | | If the resource has been on forced outage for longer than the MTTR or on maintenance, the forced outage rate is reset to the value input based on historical statistics, the nominal value |

*FIG. 67*

| | | 6802 |
|---|---|---|
| | Standard equipment results (preferred) | 6801 |
| Generators: | | |
| | Hourly generation | |
| | Hourly production cost (sum of fuel, variable O&M, environmental cost) | |
| | Hourly fuel consumption, BTU consumption | |
| | Hours on line, hours of startup, hours at margin, Hours profitable. | |
| | Monthly variable O&M cost, fuel cost, emission, and emission cost. | |
| Fuel: | | |
| | Hourly fuel consumption. | |
| | Contract compliance (e.g. Take or pay) | |
| Environmental: | (amount of material produced each hour and each period) | |
| | $CO_2$ | |
| | Sox | |
| | Nox | |
| | Mercury | |
| Transmission and distribution lines: | (Transportation Links) | |
| | Hourly flow for selected lines, interfaces, and DC lines. | |
| | Monthly transmission losses (only for marginal loss calculation option) | |
| Locational Marginal Prices (LMP) | | |
| | LMPs (include the energy, loss and congestion components): | |
| | Hourly LMP of selected buses, defined hubs. | |
| | Hourly Load Weighted and Gen Weighted LMP of defined zones. | |
| Constraints: | | |
| | Hourly shadow price; | |
| | Number of hours at Pmax, total shadow price at Pmax; | |
| | Number of hours at Pmin, total shadow price at Pmin; | |
| Company: | | |
| | Hourly purchase/sale. | |
| | Hourly dump and emergency energy. | |

*FIG. 68*

| 6901 |
|---|
| Selected contracts for ancillary services per resource per period |
| Energy resources per hour |
| Demand adjusted for response contracts (Transactive Energy) per resource per hour |
| Equipment control selected per hour |
| Environmental emissions contracts exchanged per hour |
| Fuel inventories |

FIG. 69

| 7001 |
|---|
| Selected Control Contracts (Demand Following, Frequency Correction, Contingent Contracts) |
| Frequency response capability |
| Governor response capability |
| Automatic generation control |
| Economic solution of energy imbalance market |
| Selected Contingent contracts (reserve margins) |

FIG. 70

| Economic Benefit: | 7101 |
|---|---|
| Demand Cost Saving: | Demand Cost difference between two cases; |
| Adjusted Production Cost Saving: | Adjusted Production Cost difference between two studies |
| RECB II Benefit | sum over all regions (30%* Load Cost Saving + 70%*Adjusted Production Cost Saving) |
| To capture the economic benefit of transmission upgrade: | Run two cases, one with transmission upgrade, and one without. For each case, calculate (for each region): |
|  | Load Cost = Load LMP * Load |
| Adjusted Production Cost | Production Cost + Import * Load Weighted LMP (or) - Export *Gen Weighted LMP |

FIG. 71

| | |
|---|---|
| $H_j(t)$ | Feasible region for production schedules for generator j at time t. |
| $c_j(t), hc_j, c_j^{cold}$ | Coefficients for the startup cost function for generator. |
| $D_j$ | Number of hours generator is required to be off at the start of the planning period (h). |
| $D(t)$ | Minimum number of time periods required for generator to be off before it can be turned on (h). |
| $DT_j$ | Demand at time period (MW). |
| $J$ | Set of generators. |
| $K_j^k$ | Cost of turning on generator after it has been inactive for time k periods ($). |
| $\overline{P}_j$ | Maximum power output of generator j (MW). |
| $\underline{P}_j$ | Minimum power output of generator j (MW). |
| $R(t)$ | Spinning reserve at time period t (MW). |
| $RD_j$ | Maximum ramp-down rate of generator (MW/h). |
| $RU_j$ | Maximum ramp-up rate of generator (MW/h). |
| $SD_j$ | Maximum shutdown rate of generator (MW). |
| $SU_j$ | Maximum startup rate of generator (MW). |
| $T$ | Set of time periods. |
| $U_j$ | Number of hours generator is required to be on at the start of the planning period (h). |
| $UT_j$ | Minimum number of time periods required for generator to be on before it can be turned off (h). |

*FIG. 72*

$$\text{Min} \sum_{t \in T} \sum_{j \in J} \left[ c_j \left( p_j(t) \right) + c_j^u(t) \right] \quad [1]$$

$$\sum_{j \in J} \left[ p_j(t) \right] \geq D(t) \quad \forall t \in T \quad [2]$$

$$\sum_{j \in J} \left[ \overline{p}_j(t) \right] \geq D(t) + R(t) \quad \forall t \in T \quad [3]$$

$$\underline{P}_j v_j(t) \leq p_j(t) \leq \overline{p}_j(t) \leq \overline{P}_j(t) v_j(t) \in H_j(t) \quad \forall j \in J, \forall t \in T \quad [4]$$

$$\sum_{k=t-UT_j+1, k \geq 1}^{t} \left[ y_j(k) \right] \leq v_j(k) \quad [5]$$
$$\forall t = \left[ L_j + 1, \ldots, T \right], \quad \forall j \in J$$

$$v_j(t) + \sum_{k=t-DT_j+1, k \geq 1}^{t} \left[ z_j(k) \right] \leq 1 \quad [6]$$
$$\forall t = \left[ F_j + 1, \ldots, T \right], \quad \forall j \in J$$

$$c_j^u(t) \geq K_j^t \left[ v_j(t) - \sum_{n=1}^{t} v_j(t-n) \right] \quad [7]$$
$$\forall j \in J, \forall t \in T$$

$$v_j(t-1) - v_j(t) + y_j(t) - z_j(t) = 0 \quad [8]$$
$$\forall j \in J, \forall t \in T$$

$$p_j(t) \leq \left[ \overline{P}_j v_j(t + K_j(t)) \right] + \sum_{i=1}^{K_j(t)} \left[ ((i-1)RD_j(t) + SD_j) z_j(t+i) \right] - \sum_{i=1}^{K_j(t)} \left[ \overline{P}_j(t+i) \right]$$
$$\forall j \in J, \forall t \in T$$
$$[9]$$

$$K(t) = \max \left\{ \begin{array}{l} k \in \{1, \ldots, UT_j\} \mid SD_j + (k-1)RD_j < \overline{P}_j \\ \text{and } k + t < |T| \end{array} \right\} \quad [10]$$

$$p_j(t-2) - p_j(t) \leq 2(RD_j v_j(t) + SD_j z_j(t-1) + (SD_j + RD_j) z_j(t)$$
$$- 2(RD_j) y(t-2) - (2RD_j + \underline{P}_j) y_j(t-1) - (2RD_j + \underline{P}_j) y(t)) \quad [11]$$
$$\forall j \in J, \forall t \in 2, \ldots T-2$$

$$E_j(t) = \delta[p_j(t) + p_j(t+1)]/2$$
$$[p_j(t) + p_j(t+1)] \leq \Delta_j \quad \text{if } u_j(t) = 1 \quad [12]$$
$$\sum_{j=1}^{J} E_j(t) = D(t) \forall t \in T$$

$$\text{minimize} \sum_{t \in T} \sum_{u \in U} \left( F(p_{ut}) + S(x_{ut}^{\text{off}}, y_{ut}) + H_{ut} \right). \quad (14)$$

$$F(p_{ut}) = \begin{cases} c_u p_{ut}^2 + b_u p_{ut} + a_u & \text{if } y_{ut} = 1, \\ 0 & \text{otherwise.} \end{cases} \quad (15)$$

$$S\left(x_{ut}^{\text{off}}, y_{ut}\right) = y_{ut}(1 - y_{u,(t-1)}) S_x(x_{ut}^{\text{off}}). \quad (16)$$

$$S\left(x_{ut}^{\text{off}}, y_{ut}\right) = a_u^{\text{hot}} s_{ut}^{\text{hot}} + a_u^{\text{cold}} s_{ut}^{\text{cold}}. \quad (18)$$

$$S_x = \begin{cases} a_u^{\text{hot}} & \text{if } T_u^{\text{off}} < x_{ut}^{\text{off}} \leq T_u^{\text{off}} + t_u^{\text{cold}}, \\ a_u^{\text{cold}} & \text{otherwise.} \end{cases} \quad (19)$$

$$F_{ut} \geq \alpha_{un} + \beta_{un}(p_{ut} - \bar{p}_n), \quad \text{for } n = 1, \ldots, |P|, \quad (20)$$

$$\alpha_{un} = c_u \bar{p}_n^2 + b_u \bar{p}_n + a_u,$$
$$\beta_{un} = 2c_u \bar{p}_n + b_u.$$

1: due to model structure, some of the binary variables can be relaxed to the set [0, 1], as presented in the text.

$$g^{l+1} = g^l + s^k \Delta g^k$$

$$s^k = \begin{cases} \dfrac{s^k \upsilon \|\Delta g^k\|}{\|\Delta g^{k+1}\|} & \textit{if } \Phi^{k+1} < \Phi^k \\ s^k, & \textit{otherwise} \end{cases}$$

$$\|g^{l+1} - g^l\| < \varepsilon \Phi^k$$

*FIG. 74*

$$\text{maximize} \quad \sum_{s=1}^{S} p^*_{1gs} q_{gs} - f_g(Q^1) - \sum_{s=1}^{S} c_{gs}(q_{gs})$$

$$\sum_{s=1}^{S} q_{gs} = q_g, \quad g = 1, \ldots, G.$$

subject to $q_{gs} \geq 0, \quad s = 1, \ldots, S.$ $$\sum_{g=1}^{G} \sum_{s=1}^{S} \left[ \frac{\partial f_g(Q^{1*})}{\partial q_{gs}} + \frac{\partial c_{gs}(q^*_{gs})}{\partial q_{gs}} - p^*_{1gs} \right] \times \left[ q_{gs} - q^*_{gs} \right] \geq 0, \quad \forall Q^1 \in R_+^{GS}.$$

$$fg(q) = fg(Q1)$$

$$\frac{\partial f_g(q)}{\partial q_g} \equiv \frac{\partial f_g(Q^1)}{\partial q_{gs}}, \quad g = 1, \ldots, G, \quad s = 1, \ldots, S.$$

$$(q^*, Q^{1*}) \in H^1$$

$$\sum_{s=1}^{S} q_{gs} = q_g, \quad g = 1, \ldots, G.$$

$$\sum_{g=1}^{G} \frac{\partial f_g(q^*)}{\partial q_g} \times [q_g - q^*_g] + \sum_{g=1}^{G} \sum_{s=1}^{S} \left[ \frac{\partial c_{gs}(q^*_{gs})}{\partial q_{gs}} - p^*_{1gs} \right] \times [q_{gs} - q^*_{gs}] \geq 0, \quad \forall (q, Q^1) \in H^1,$$

$$\sum_{k=1}^{K} \sum_{v=1}^{V} q^v_{sk} = \sum_{g=1}^{G} q_{gs}, \quad s = 1, \ldots, S.$$

$$\min_{P_{EL},O} \left\{ \sum_{t=1}^{T}\sum_{u}(\alpha_u^2(t)(P_{EL,u}(t))^2 + \alpha_u^1(t)P_{EL,u}(t) + \alpha_u^0(t)O_u(t) + \sum_{t=1}^{T}\sum_{u}(1-O_u(t-1))O_u(t)\gamma_u(t) \right\}$$

s.t $\sum_u P_{MAX,EL,u}(t)O_u(t) \geq P_{EL,RES}(t)$ $\sum_u P_{EL,u}(t) = P_{EL,DEMAND,u}(t)$ $P_{MIN,EL,u}(t)O(t) \leq P_u(t) \leq P_{MAX,EL,u}(t)O_u(t)$ $O_u(t) \in \{1,0\}$

---

$$\Phi(\lambda,\mu) = \min_{P_{EL},O} \left\{ \begin{array}{l} \sum_{t=1}^{T}\sum_{u}(\alpha_u^2(t)(P_{EL,u}(t))^2 + \alpha_u^1(t)P_{EL,u}(t) + \alpha_u^0(t)O_u(t) + \sum_{t=1}^{T}\sum_{u}(1-O_u(t-1))O_u(t)\gamma_u(t) \\ + \sum_{t=1}^{T}\lambda(t)\left(P_{EL,DEMAND}(t) - \sum_u P_{EL,u}(t)\right) + \sum_{t=1}^{T}\mu(t)\left(P_{EL,RES}(t) - \sum_u P_{MAX,EL,u}(t)O_u(t)\right) \end{array} \right\}$$

s.t $P_{MIN,EL,u}(t)O_u(t) \leq P_{EL,u}(t) \leq P_{MAX,EL,u}(t)O_u(t)$ $O_u(t) \in \{1,0\}$

---

$$\max_{P_{EL},P_{TH},O} \left\{ \begin{array}{l} \sum_{t=1}^{T} P_{EL,SELL,SPOT}(t) price_{SPOT}(t) - \sum_{t=1}^{T}\sum_u cost_t(\alpha_u^0 + \alpha_u^1(P_{EL,u}(t) - \beta_u^1 P_{TH,u}(t))) \\ - \sum_{t=1}^{T} P_{EL,BUY,SPOT}(t) cost_{SPOT}(t) - \sum_{t=1}^{T} P_{EL,BUY,TOP}(t) cost_{TOP} \end{array} \right\}$$

s.t $\sum_u P_{EL,u}(t) + P_{EL,BUY,SPOT}(t) + P_{EL,BUY,TOP}(t) = P_{EL,DEMAND}(t) + P_{EL,SELL,SPOT}(t)$ $P_{EL,BUY,SPOT}(t) \geq 0$ $0 \leq P_{EL,BUY,TOP}(t) \leq P_{MAX,EL,BUY,TOP}$ $P_{EL,SELL,SPOT}(t) \geq 0$ $\sum_u P_{TH,u}(t) \geq P_{TH,DEMAND}(t)$ $P_{MIN,EL,u}O_u(t) \leq P_{EL,u}(t) \leq P_{MAX,EL,u}O_u(t)$ $P_{MIN,TH,u}O_u(t) \leq P_{TH,u}(t) \leq P_{MAX,TH,u}O_u(t)$ $P_{TH,u}(t)\varepsilon_u^1 + \varepsilon_u^0 O_u(t) \leq P_{EL,u}(t) \leq P_{TH,u}(t)\beta_u^1 + \beta_u^0 O_u(t)$ $P_{EL,u}(t) \geq P_{TH,u}(t)\gamma_u^1 + \gamma_u^0 O_u(t)$ $O_u \in \{1,0\}$

$price_{SPOT}(t)$ = the price for the electric power when you sell it at the spot market at time $t$ $cost_r$ = the cost for fuel $r$ $P_{EL,u}(t)$ = the electric power produced by unit $u$ at time $t$ $P_{TH,u}(t)$ = the heat produced by unit $u$ at time $t$ $\alpha_u$ = constant for unit $u$ in fuel consumption equation $\beta_u, \gamma_u, \varepsilon_u$ = constants for unit $u$ in equations describing the PQ-chart $O_u(t)$ = variable indicating the on-off status for the unit $u$ at time $t$ $P_{EL,BUY,SPOT}(t)$ = electric power bought at the spot market at time $t$ $cost_{SPOT}(t)$ = the cost for buying electric power at the spot market at time $t$ $P_{EL,BUY,TOP}(t)$ = electric power bought from take-or-pay contract at time $t$ $cost_{TOP}$ = the cost for buying electric power from the take-or-pay contract $P_{EL,DEMAND}(t)$ = the electric power demand at time $t$ $P_{TH,DEMAND}(t)$ = the heat demand at time $t$ $P_{EL,SELL,SPOT}(t)$ = electric power sold at the spot market at time $t$

*FIG. 77*

RESOURCE CONTROL BY PROBABILITY TREE CONVOLUTION PRODUCTION COST VALUATION BY ITERATIVE EQUIVALENT DEMAND DURATION CURVE EXPANSION (AKA. TREE CONVOLUTION)

BACKGROUND

Technical Field

The present invention relates generally to energy resource planning systems and, more particularly, to methods and systems for determining expected unserved energy in order to quantify reliability risks for electric energy systems. The same reliability analysis applies to other energy networks (e.g., gas and oil) when the physical network description is implemented for those networks.

Description of the Related Art

In planning for energy supply adequacy, determining the optimum level of ancillary services, such as energy reserves is difficult. If an operator maintains too low of a margin of ancillary services, such as reserve margin, there is a high likelihood of being unable to serve the demands of all firm-demand customers. If an operator maintains too high of a reserve margin, financial resources are wasted in building and maintaining capacity that is rarely used. A new digital simulation model is needed that can quantify the risk of occurrence of a wide-range of possible scenarios in terms of expected unserved energy (EUE) and loss of demand probability (LODP). Expensive market purchases required to avoid shedding firm demand can be mitigated over multiple markets with option contracts, storage devices and demand response. A wider range of components that contribute to unreliability need to be modeled than would be in an application that was designed for only minimizing production cost.

Almost all reliability issues are expected to occur in the upper 10% of all possible weather forecast errors, demand forecast errors, market forecast errors, hydro forecast errors, and storage availability scenarios. In order to achieve statistical significance, a large number of availability levels need to be included in a simulation that realistically models energy supply, storage, and transportation. The Tree Convolution includes all paths in the tree as need for economic accuracy as determined by a user specified tolerance.

The analysis is applied to the energy system model of FIG. 1 in the presented embodiment, which is one abstraction of the electric energy supply chain or one instance of a generic supply chain.

BRIEF SUMMARY

The invention is directed to a method, system, and program product for quantifying the potential reliability risks across a wide range of scenarios. A probability tree model is used to determine expected unserved energy (EUE) and loss of demand probability (LODP). Historical and projected data concerning how often and for how long existing and future components fail provide the basis for estimating the expected number of firm demand curtailments at various levels of ancillary services.

All of the resources have different data that are required to be input into the simulation model. Operational data includes distributions on outage levels, costs, and capacities, derating information, maintenance information, energy limitations, market prices, and required margins. This data must be collected and correctly input into the simulation model.

The digital simulation draws on historical distribution of outages by duration, rather than on an annual or seasonal forecast equivalent force outage rate (EFOR) for each unit. This produces a more accurate reflection of cumulative megawatts forced offline during constrained periods. The digital simulation provides the ability to process hundreds of thousands of iterations of an entire year in a matter of hours. Furthermore, the digital simulation includes dynamic market simulation based on supply/demand, dynamic hydro-operation based on market simulation and hydro-availability, and representation of transmission constraints with load flow modeling. Other features include dispatching supplemental modes of operation for combined cycles, and modeling of capacity reduction based on weather.

In one aspect of the invention, a method, system, and computer program product are provided for quantifying a risk of expected unserved energy in an energy system using a computer simulation. An energy demand forecast is generated based at least in part on a weather year model. A plurality of energy resources are committed to meet the energy demand. An operating status is determined for each committed resource in the energy system. A determination is made as to whether or not the committed resources are sufficient to meet the energy demand. A dispatch order for a plurality of energy resources is selected if the committed resources are not sufficient to meet the energy demand. Additional resources are committed based on the selected dispatch order until the firm energy demand is met. The expected unserved energy is determined and the loss of demand probability. The computer program product implements the method for simulating deployment of a plurality of energy resources in an energy system to minimize expected unserved energy. The system includes one or more processors executing a plurality of software components for performing the steps of the method.

A method for calculating an expected unserved energy in an energy system, wherein all steps are performed by a computer, may be summarized as including generating an energy demand forecast based at least in part on a weather model stored in a memory of the computing system; committing a plurality of energy resources to meet the energy demand; determining an operating status for each committed energy generation resource in the energy generation system; determining if the committed resources are sufficient to meet the energy demand; selecting the plurality of additional energy resources if the committed resources are not sufficient to meet the energy demand, wherein the plurality of energy resources includes a plurality of fossil steam units, a plurality of pumped storage hydro units, a plurality of combustion turbine units, a plurality of combined cycle units, a plurality of emergency hydro resources, plurality of market purchase energy contracts, a plurality of demand response contracts, a plurality of energy storage devices, and a plurality of curtailable contracts; dispatching the plurality of contracts based on contract terms and conditions; committing additional supply, storage, or demand responsive resources based on the selected dispatch order until the energy demand is met; and determining the expected unserved energy and loss of demand probability.

The method may further include determining an associated cost for the expected unserved energy. Determining an operating status for each committed energy generation resource may include checking an accumulated number of operating hours for each energy generation resource to determine if the resource should be placed in a reduced probability of full outage or of partial outage condition. Determining if the resource should be placed in a reduced probability of full outage condition based on a comparison between the accumulated number of operating hours and a calculated selected time to failure may be based on an historical time to failure data distribution for the resource.

The method may further include determining if the resource should be returned to an increased probability of operational and committed status based on an historical time to repair data distribution for the resource. Determining if the resource should be placed in an increased probability of partial outage condition may be based on accumulated operating hours, a mean time to failure and a mean time to repair for the resource. Determining if the resource in a partial outage condition should be placed in an increased probability of full outage condition may be based on accumulated operating hours. Selecting a dispatch order may include determining a merit order ranking based on historically expected cost of operation. An estimated merit order may be based on a ratio of peak demand to available energy resource capacity. A predetermined historically economic normal dispatch order may be selected if the merit order ratio is less than the threshold value. A predetermined risk aversion dispatch order may be selected if the ratio is greater than a first threshold value but less than a second threshold value. (alter) A predetermined reliability dispatch order may be selected if the ratio is greater than the threshold value. The market purchase of energy may be based on a contracted market price of energy, contracted available generating capacity, and an contracted available transmission capacity of a neighbor energy system. The amount of energy purchased may be an economically justifiable amount of energy still needed to meet the energy demand, the available resource or storage capacity and the available transmission capacity. The market price of energy may be estimated based on an expected market process, including all ancillary services, such as energy reserve margin, for the study period and a magnitude of an hourly difference between energy demand and available energy resources or storage. Shedding an equivalent amount of energy demand may include determining a loss of demand hours associated with the expected unserved energy; and shedding the energy demand according to contract terms and conditions.

A computer readable storage medium having a plurality of computer readable instructions encoded therein, which when executed by a computer causes the computer to implement a method for quantifying an expected unserved energy in an energy system, may be summarized as including generating an energy demand forecast based at least in part on a weather year model stored in a memory of the computing system; committing a plurality of energy resources to meet the energy demand; determining an operating status for each committed energy resource in the energy system; determining if the committed resources are sufficient to meet the energy demand; selecting a dispatch order for a plurality of additional energy resources if the committed resources are not sufficient to meet the energy demand, wherein the plurality of energy resources includes a plurality of supply, such as fossil or geothermal steam units, a plurality of pumped storage hydro units, a plurality of combustion turbine units, a plurality of combined cycle units, a plurality of hydro resources, a plurality of emergency resources, a plurality of market energy contracts (purchase or sale), and a plurality of demand response contracts; dispatching the plurality of demand response contracts based on economic prices or other contract terms and conditions; committing additional resources based on the selected dispatch order until the energy demand is met; and determining the expected unserved energy and shedding an equivalent amount of energy demand based at least in part on an expected duration of unserved energy.

The method may further include determining an associated cost for the expected unserved energy based on contract terms and conditions.

The method implemented by the computer may further include checking an accumulated number of operating hours for each energy resource and determining if the resource should be placed in an increased probability of full outage or of partial outage condition.

The method implemented by the computer may further include comparing the accumulated number of operating hours and an historical time to failure based on the expected operating history to failure data distribution for the resource.

The method implemented by the computer may further include determining if the resource in an increased probability of full outage condition should be returned to a decreased probability of operational and committed status based on an historically estimated time to repair.

The method implemented by the computer may further include evaluating estimated accumulated operating hours, a mean time to failure and a mean time to repair for each resource.

The method implemented by the computer may further include determining if the resource in a reduced probability of partial outage condition should be placed in an increased probability of full outage condition based on accumulated operating hours.

The method implemented by the computer may further include determining a ratio of peak demand to available energy resource capacity and comparing the ratio against a required value.

The method implemented by the computer may further include selecting an historical or predetermined normal dispatch order if the ratio is less than the threshold value.

The method implemented by the computer may further include selecting a predetermined risk aversion dispatch order if the ratio is greater than a first threshold value but less than a second threshold value.

The method implemented by the computer may further include selecting a predetermined reliability dispatch order if the ratio is greater than the threshold value.

The method implemented by the computer may further include determining a market price of energy, determining an available supply capacity and determining an available transmission capacity of a neighbor energy system.

The method implemented by the computer may further include determining an amount of energy purchased based on a minimum of an amount of energy still needed to meet the energy demand, the available supply capacity and the available transmission capacity.

The method implemented by the computer may further include selecting the market price of energy based on an expected ancillary services, such as energy reserve margin, for the study period and a magnitude of an hourly difference between energy demand and committed energy resources.

The method implemented by the computer may further include determining a loss of demand hours associated with the expected unserved energy; and shedding the energy demand according to contract terms and conditions.

The method implemented by the computer may further include determining a loss of demand probability associated with the expected unserved energy; and shedding the energy demand according to contract terms and conditions.

A system for quantifying an expected unserved energy in an energy supply system may be summarized as including a memory for storing a plurality of energy demand data, a plurality of market data, and a plurality of weather data; a computer processor in communication with the memory and configured for: generating an energy demand forecast based on the historical energy demand data and weather data stored in the memory; committing a plurality of energy supply resources to meet the energy demand; determining an operating status for each committed energy storage resource in the energy system; determining an operating status for each committed energy supply resource in the energy system; determining if the committed resources are sufficient to meet the energy demand; selecting a dispatch order for a plurality of additional energy resources if the committed resources are not sufficient to meet the energy demand, wherein the plurality of energy resources includes a plurality of steam units, a plurality of pumped storage hydro units, a plurality of combustion turbine units, a plurality of combined cycle units, a plurality of emergency hydro resources, a market purchase of energy and a plurality of curtailable contracts; dispatching the plurality of curtailable contracts in a descending order based on an elapsed time since a previous curtailment for each contract such that the contract having a longest elapsed time is curtailed first providing an even distribution of energy demand shedding among a plurality of customers having curtailable contracts; committing additional resources based on the selected dispatch order until the energy demand is met; and determining the expected unserved energy and shedding an equivalent amount of energy demand based at least in part on an expected duration of unserved energy and a customer class grouping.

The computer processor may be further configured for determining an associated cost for the expected unserved energy.

The computer processor may be further configured for checking an accumulated number of operating hours for each energy resource and determining if the resource should be placed in an increased probability of full outage or a partial outage condition.

The computer processor may be further configured for comparing the accumulated number of operating hours and a historically estimated time to failure based on an historical time to failure data distribution for the resource.

The computer processor may be further configured for determining if the resource at a high probability of full outage condition should be returned to a lower probability of operational and committed status based on an historical time to repair for the resource.

The computer processor may be further configured for determining if the resource should be placed in an increased probability of partial outage condition based on expected operating hours, a mean time to failure and a mean time to repair for the resource.

The computer processor may be further configured for determining if the resource should have an increased probability of a partial outage condition based on expected accumulated operating hours.

The computer processor may be further configured for determining a ratio of peak demand to available energy resource capacity and comparing the ratio against a threshold value.

The computer processor may be further configured for dispatching the market purchase of energy based on a market price of energy, an available resource capacity and an available transmission capacity of a neighbor energy system.

The computer processor may be further configured for estimating the market price of energy based on an expected energy reserve margin for the study period and an expected magnitude of an hourly difference between energy demand and available energy resources.

The computer processor may be further configured for determining a loss of demand probability associated with the expected unserved energy; and shedding the energy demand based on contract terms and conditions.

The computer processor may be further configured for determining a loss of demand probability associated with the expected unserved energy; and shedding the energy demand for commercial and industrial customers based on contract terms and conditions. The computer processor may include capability to evaluate Transactive Energy contracts based on the regulations of the supply chain which presently envision support only energy values, all other ancillary support services (frequency through reliability) may be included in this embodiment as regulatory specified contract terms and conditions. BID/ASK contracts for other services may be included, such as voltage response, frequency response, reliability, and others.

Probabilistic production costing may provide assessment for asset management in addition to fuel scheduling (natural gas, oil, hydro, and others), maintenance scheduling, and interchange contract analysis and management. Other supply chains may include, but are not limited to, natural gas, oil, uranium, food, pharmaceutical, financial contracts. Reliability analysis may include all means of transportation, including but not limited to rail, plane, interstate, barge, and ship. Optimum information from the initial selection of tree paths may enable warm starts to find the adjacent optimal solutions as the tree paths are expanded. A check on Monte Carlo embodiments may be provided by selecting the same paths that the Monte Carlo algorithm selected. an interval of solution accuracy may be provided as provided by Latin Hypercube extensions of Monte Carlo algorithms. Multiple solution accuracy measures beyond the price distribution embodied method may be provided, such as real option assessment of the profit at risk tail, the value at risk tail, the energy error distribution, or other statistical error techniques.

A method in a smart grid control system to control a smart energy grid may be summarized as including receiving, by the smart grid control system, input data that describes one or more operational parameters of each of a plurality of resources of the smart energy grid, the plurality of resources including at least a plurality of energy generation resources; building, by the smart grid control system, a probability tree based at least in part on the received input data, the probability tree including a plurality of leaves, each leaf of the plurality of leaves representative of one of the plurality of resources of the smart energy grid; performing, by the smart grid control system, a plurality of approximation iterations to iteratively revise the probability tree based at least in part on iterative updates to an estimated demand duration curve, the iterative updates to the estimated demand duration curve based at least in part on iterative selections of paths through the probability tree; and after performing the plurality of approximation iterations, controlling, by the smart grid control system, the smart energy grid to activate or deactivate one or more resources of the smart energy grid based at least in part on the most recently revised probability tree.

Each approximation iteration may include revising, by the smart grid control system, the probability tree based at least in part on an analysis of a most recently updated version of the estimated demand duration curve; selecting, by the smart grid control system, at least one new path through the revised probability tree; updating, by the smart grid control system, the estimated demand duration curve based at least in part on the selected at least one new path; and determining, by the smart grid control system, whether to perform an additional approximation iteration based at least in part on the updated estimated demand duration curve.

Each approximation iteration may further include determining, by the smart grid control system, at least one of an expected unserved energy, a loss of demand probability, and a loss of load probability for the updated estimated demand duration curve. Revising, by the smart grid control system, the probability tree may include revising, by the smart grid control system, the probability tree to increase a number of states associated with at least one of the plurality of leaves traversed by the most recently selected at least one new path. Revising, by the smart grid control system, the probability tree to increase a number of states associated with at least one of the plurality of leaves may include revising, by the smart grid control system, the probability tree to include uncertainty regarding one or more of a demand, a transportation network, or a fuel for the resource represented by the at least one of the plurality of leaves. Revising, by the smart grid control system, the probability tree may include revising, by the smart grid control system, the probability tree to include at least one new leaf respectively representative of at least one new resource controllably introducible to and operable with the smart energy grid.

The method may further include selecting, by the smart grid control system, the at least one new resource from a plurality of available new resources based at least in part on a merit order ranking associated with the plurality of available new resources. Revising, by the smart grid control system, the probability tree to include at least one new leaf respectively representative of at least one new resource controllably introducible to and operable with the smart energy grid may include revising, by the smart grid control system, the probability tree to include the at least one new leaf respectively representative of at least one new demand response resource or at least one new transactive energy resource. Selecting, by the smart grid control system, at least one new path through the revised probability tree may include at least one of adding, by the smart grid control system, a new path to the probability tree and revising, by the smart grid control system, a previous path to follow a new route. Determining, by the smart grid control system, whether to perform an additional approximation iteration based at least in part on the updated estimated demand duration curve may include determining, by the smart grid control system, whether the updated estimated demand duration curve satisfies one or more accuracy parameters. Determining, by the smart grid control system, whether the updated estimated demand duration curve satisfies one or more accuracy parameters may include comparing, by the smart grid control system, the updated estimated demand duration curve to an expected demand duration curve descriptive of expected energy demand for at least a first period of time.

The method may further include generating, by the smart grid control system, the expected demand duration curve for at least the first period of time based at least in part on a weather forecast for at least the first period of time. Determining, by the smart grid control system, whether to perform an additional approximation iteration based at least in part on the updated estimated demand duration curve may include determining, by the smart grid control system, whether the updated estimated demand duration curve satisfies one or more user-inputted accuracy parameters.

Each approximation iteration may further include performing, by the smart grid control system, a deterministic optimization technique for the selected at least one new path to simulate or value the selected at least one new path. Revising, by the smart grid control system, the probability tree based at least in part on an analysis of a most recently updated version of the estimated demand duration curve may include determining, by the smart grid control system, a sensitivity factor for each resource included in the probability tree and revising, by the smart grid control system, a portion of the probability tree that corresponds to the resource with the smallest sensitivity factor that is still greater than a threshold value.

The method may further include generating a plurality of expected demand duration curves respectively for a plurality of different time periods; and performing, by the smart grid control system, the plurality of approximation iterations for each of the plurality of different time periods, the plurality of approximation iterations performed for each respective time period including iterative updates to an estimated demand duration curve for such time period based at least in part on the respective expected demand duration curve generated for such time period. Building, by the smart grid control system, a probability tree may include building, by the smart grid control system, the probability tree including the plurality of leaves, at least some of the plurality of leaves respectively representative of energy transmission and transportation resources or energy generation fuel resources. Controlling, by the smart grid control system, the smart energy grid to activate or deactivate one or more resources of the smart energy grid based at least in part on the most recently revised probability tree may include causing, by the smart grid control system, one or more of the plurality of resources to come online or offline based at least in part on the most recently revised probability tree.

A smart energy grid control system to control a smart energy grid may be summarized as including at least one processor; and at least one non-transitory processor-readable medium storing at least one of data and instructions that, when executed by the at least one processor, cause the smart energy grid control system to: receive input data that describes one or more operational parameters of each of a plurality of resources of the smart energy grid, the plurality of resources comprising at least a plurality of energy generation resources; build a probability tree based at least in part on the received input data, the probability tree comprising a plurality of leaves, each leaf of the plurality of leaves representative of one of the plurality of resources of the smart energy grid; select at least one initial path through the probability tree; determine an estimated demand duration curve based on the at least one initial path through the probability tree; determine whether the estimated demand duration curve for the at least one initial path satisfies one or more accuracy requirements; responsive to a determination that the estimated demand duration curve does not satisfy the one or more accuracy requirements, perform one or more approximation iterations in which the smart energy grid control system iteratively revises the probability tree based at least in part on an analysis of the estimated demand duration curve, iteratively selects at least one revised path through the revised probability tree, and iteratively updates the estimated demand duration curve; and responsive to a determination that the estimated demand duration curve satisfies the one or more accuracy requirements, control the smart energy grid to respectively activate for at least a first period of time at least one of the particular resources of the smart energy grid that respectively correspond to the leaves of the probability tree included in a most recently selected path.

The data or instructions that may cause the smart energy grid control system to perform one or more approximation iterations may cause, for each of the one or more approximation iterations, the smart energy grid control system to: revise the probability tree based at least in part on the estimated demand duration curve; select at least one revised path through the revised probability tree; update the estimated demand duration curve based at least in part on the selected at least one revised path; and determine whether the updated estimated demand duration curve satisfies the one or more accuracy requirements. The data or instructions that may cause the smart energy grid control system to revise the probability tree based at least in part on the estimated demand duration curve may cause the smart energy grid control system to: determine a plurality of sensitivity factors respectively for the plurality of resources, wherein the sensitivity factor determined for each resource indicates a magnitude of impact that operational unavailability of such resource will have on the estimated demand duration curve for the smart energy grid; and revise a portion of the probability tree associated with at least one of the plurality of resources selected based on the sensitivity factors. The data or instructions that may cause the smart energy grid control system to revise a portion of the probability tree associated with at least one of the plurality of resources selected based on the sensitivity may factors cause the smart energy grid control system to revise the portion of the probability tree to increase a number of states associated with the at least one of the plurality of resources selected based on the sensitivity factors.

The data or instructions may further cause the smart energy grid control system to: generate an expected demand duration curve for the at least one period of time, the expected demand duration curve descriptive of an expected amount of energy demand for the at least one period of time; wherein the data or instructions that cause the smart energy grid control system to determine whether the updated estimated demand duration curve satisfies the one or more accuracy requirements cause the smart energy grid control system to compare the updated estimated demand duration curve to the expected demand duration curve for the at least one period.

A smart energy grid may be summarized as including a plurality of resources, at least some of the plurality of resources comprising energy generation resources; and a smart grid controller respectively controllingly coupled to the plurality of resources, the smart grid controller comprising at least one processor, wherein the smart grid controller: generates a plurality of operational models respectively for the plurality of resources for at least one time period, the plurality of operational models respectively descriptive of operational availability of the plurality of resources during the at least one time period; builds a probability tree representative of the plurality of resources during the at least one time period, the probability tree including respective probabilities of operational availability for the plurality of resources based on the respective operational models; evaluates an availability for each of the plurality of resources according to at least one initial path through the probability tree; determines a plurality of sensitivity factors respectively for the plurality of resources, wherein the sensitivity factor determined for each resource indicates a magnitude of impact that operational unavailability of such resource will have on an estimated demand duration curve for the smart energy grid for the at least one time period; revises a portion of the probability tree associated with at least one of the plurality of resources selected based on the sensitivity factors; and controls one or more of the plurality of resources based at least in part on the revised probability tree.

Prior to determination of the plurality of sensitivity factors, the smart grid controller may further determine whether the plurality of resources according to the at least one initial path through the probability tree provide sufficient energy to meet an expected energy demand, and, responsive to a determination that the plurality of resources according to the at least one initial path through the probability tree do not provide sufficient energy to meet the expected energy demand, supplements the probability tree to include at least one additional representation of at least one additional resource controllably coupleable to the smart energy grid.

The smart grid controller may further: evaluate the availability for each of the plurality of resources according to at least one additional path through the revised probability tree; and generate an estimated demand duration curve based at least in part on at least one additional path through the revised probability tree.

The smart grid controller may further: calculate at least one of an expected unserved energy, a loss of demand probability, and a loss of load probability based at least in part on the estimated demand duration curve.

BRIEF DESCRIPTION OF THE SEVERAL VIEWS OF THE DRAWINGS

These and other advantages and aspects of the present invention will become apparent and more readily appreciated from the following detailed description of the invention taken in conjunction with the accompanying drawings, as follows.

FIG. 47 is a diagram of a PTC Similarity with Real Option Binary Lattice showing comparison with Real Option Binomial Distribution according to one implementation of the present invention.

FIG. 48 is a table of Input Data for each Resource according to one implementation of the present invention.

FIG. 49 is a table of Input date for Each Storage Resource according to one implementation of the present invention.

FIG. 50 is a table of Input Data for Each Demand Contract (Customer) according to one implementation of the present invention.

FIG. 51 is a table of Network Specified Input Data according to one implementation of the present invention.

FIG. 52 is a table of PTC algorithm performance variables to expand the tree for accuracy according to one implementation of the present invention.

FIG. 53 is a table of Fuel Contract Data according to one implementation of the present invention.

FIG. 54 is a table of Input Data for Demand Response Contracts according to one implementation of the present invention.

FIG. 55 is a table of data related to Implementation of Contingency Contracts for Energy or Ancillary Services according to one implementation of the present invention.

FIG. 56 is a table of data related to a Hydro Network Model according to one implementation of the present invention.

FIG. 57 is a table of Linearized Transmission Model Parameters with Flow Transmission Rights and/or Flowgate Contracts according to one implementation of the present invention.

FIG. 58 is a table of data related to an Interchange Contract Model according to one implementation of the present invention.

FIG. 59 is a table of Input data to link control areas with Transportation Network according to one implementation of the present invention.

FIG. 60 is a table of Input Data for Security Constraints per control area according to one implementation of the present invention.

FIG. 64 is a table of a procedure for Resource Commitment/Dispatch to Expand Availability Model by Next Resource Impact Value according to one implementation of the present invention.

FIG. 65 is a table of a procedure for Sensitivities to Expand Tree to Include Remaining Resources according to one implementation of the present invention.

FIG. 66 is a table of a procedure for Contingency Contracts for Energy or Ancillary Services according to one implementation of the present invention.

FIG. 67 is a table of a procedure for a Forced Outage Rate (FOR) Adjustment Due To Duration of Operation according to one implementation of the present invention.

FIG. 68 is a table of a Basic Output from a single study according to one implementation of the present invention.

FIG. 69 is a table of Solution Results For Ancillary Service Contracts according to one implementation of the present invention.

FIG. 70 is a table of Solution Results for Contingent, Transactive, & Demand Response selected contracts according to one implementation of the present invention.

FIG. 71 is a table of a Transaction Economic Valuation to select contracts according to one implementation of the present invention.

FIG. 72 is a list for MILP UC Notation listing variables and parameters in the objective function and constraints for linear constraints according to one implementation of the present invention.

FIG. 73 is a list of MILP UC Formulation, detailing the objective and constraints for Mixed Integer Linear Programming according to one implementation of the present invention.

FIG. 74 is a table for a Preferred MILP extension according to one implementation of the present invention.

FIG. 75 is a table of Notation for EESC Model as Transportation Network Solution showing an alternative model for the transmission and distribution grid according to one implementation of the present invention.

FIG. 76 is a table of equations for an objective function and for constraints of nonlinear solution according to one implementation of the present invention.

FIG. 77 is a table of variables for an objective function and for constraints according to one implementation of the present invention.

DETAILED DESCRIPTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Figure 1:
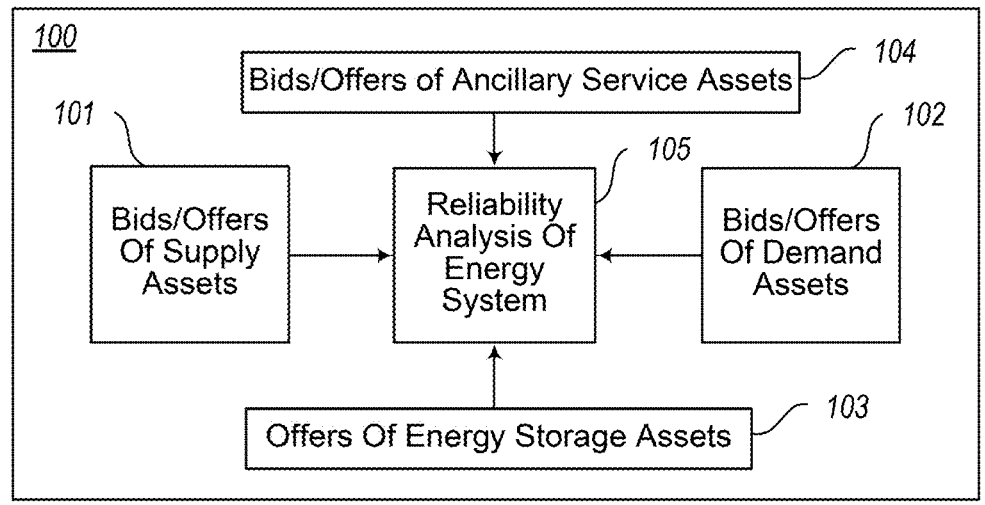
FIG. 1 is a flow diagram of a Basic Energy Model according to one implementation of the present invention.

In an embodiment of the invention, the capabilities of an energy system during peak demand conditions are modeled and analyzed. The modeling and analysis provide insight into the risks and costs during these periods as well as the value of being able to meet peak demand conditions. The results of the analysis can be used to assist the operator or the planner in evaluating the worth of demand response options and energy-limited resources with various constraints. Reliability determinations can help to mitigate the risks involved as described herein. The basic model of the energy model is shown in FIG. 1 for a single period simulation. The preferred period of simulation is the week to emulate weekly storage schedules. Multiple period resources, such as large storage hydro systems are solved by a repetition of weekly simulation for the duration of the energy storage.

Figure 3:
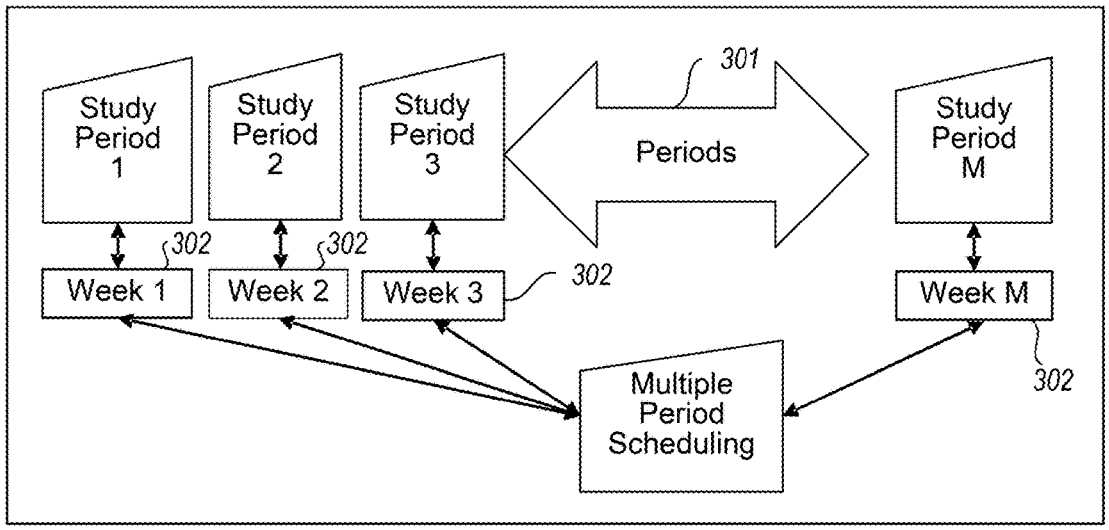
FIG. 3 is a flow diagram of Analysis for Operations, Planning and Supply Chain Interaction according to one implementation of the present invention.
Figure 4:
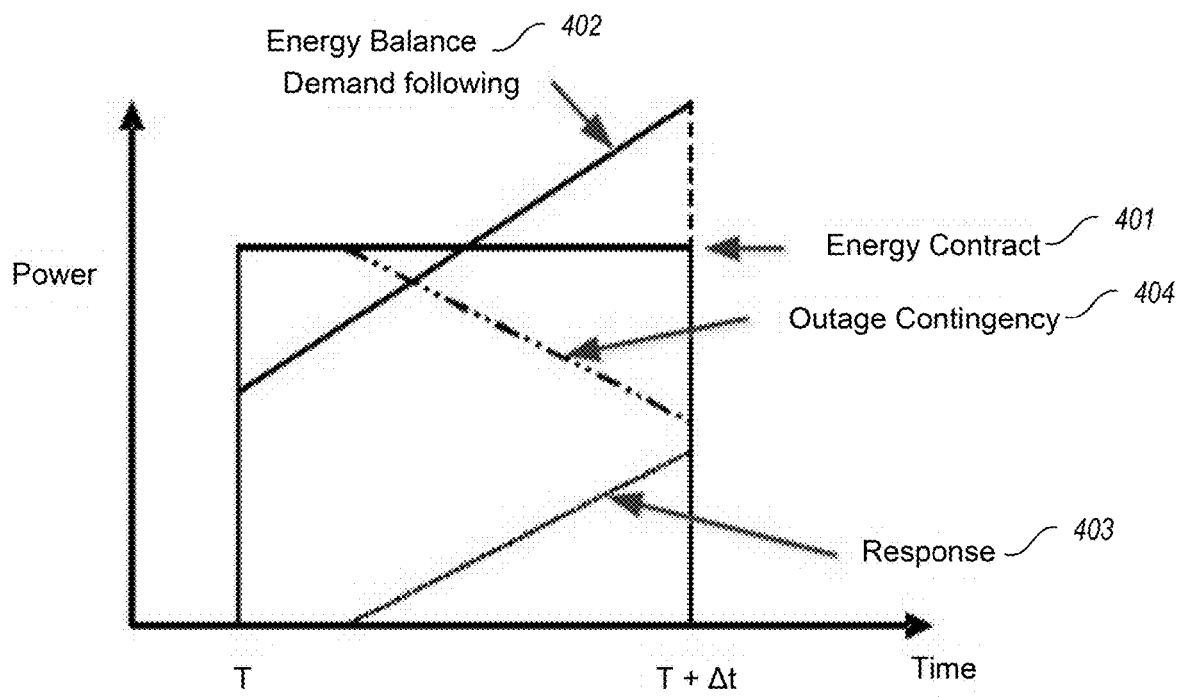
FIG. 4 is a function graph of segmentation of energy product into bulk energy needed for each sub period according to one implementation of the present invention.
Figure 5:
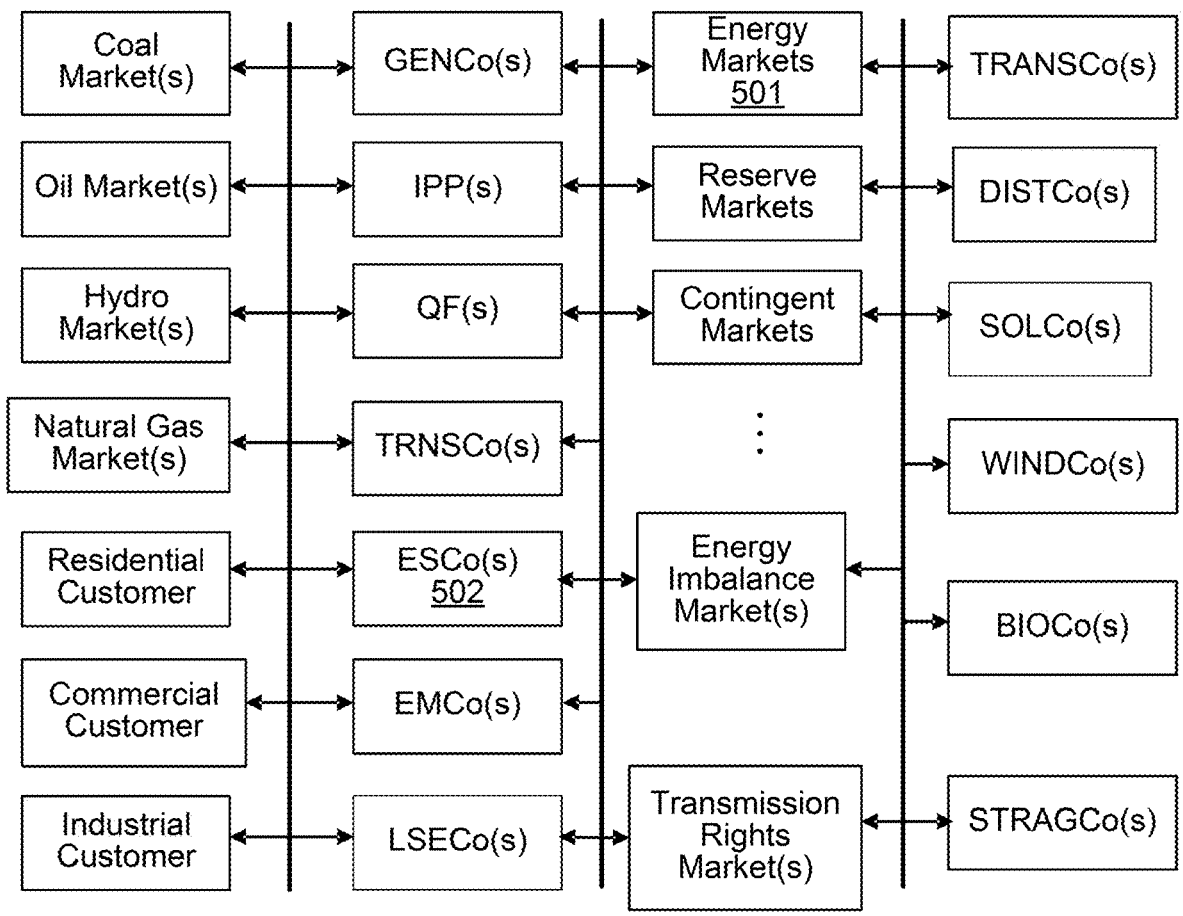
FIG. 5 is a flow diagram of a Supply Chain Model for Electric, Oil, and Natural Gas as Commodities according to one implementation of the present invention.
Figure 6:
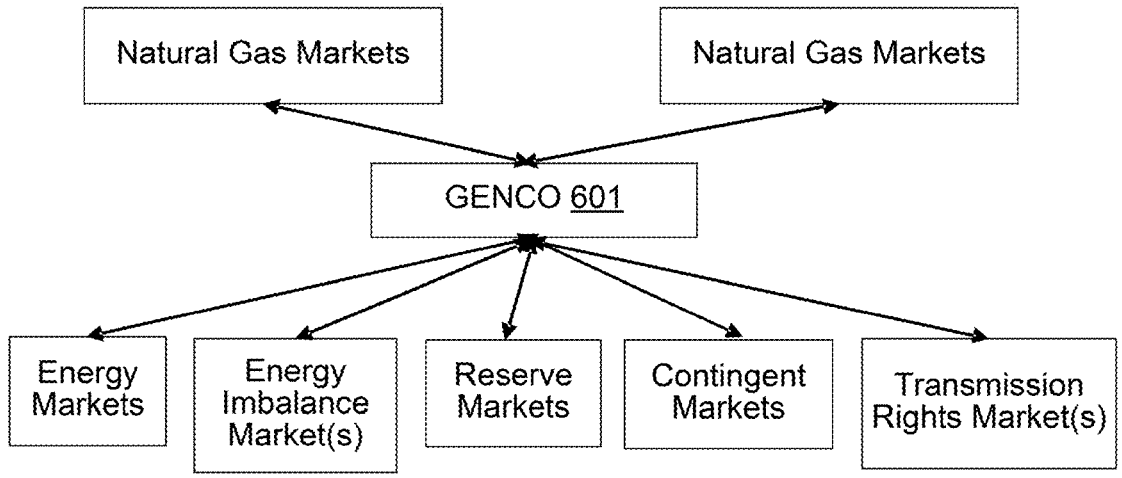
FIG. 6 is a flow diagram of a Generation Company Resource Interaction with Multiple Fuel Markets according to one implementation of the present invention.
Figure 7:
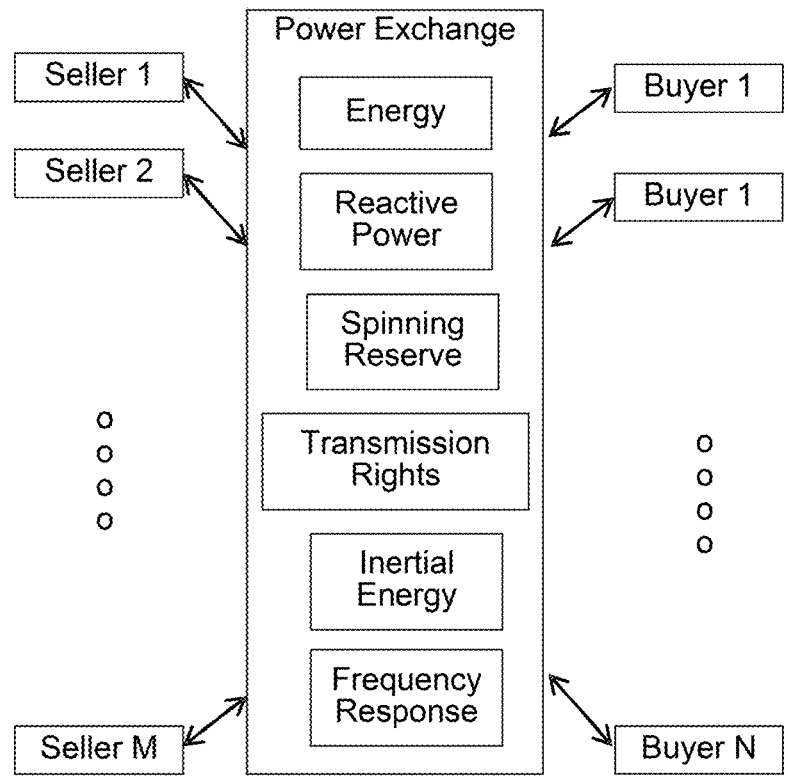
FIG. 7 is a flow diagram of Electric Energy Markets for Ancillary Services, Distributed Resources and Distributed Ancillary Services according to one implementation of the present invention.
Figure 8:
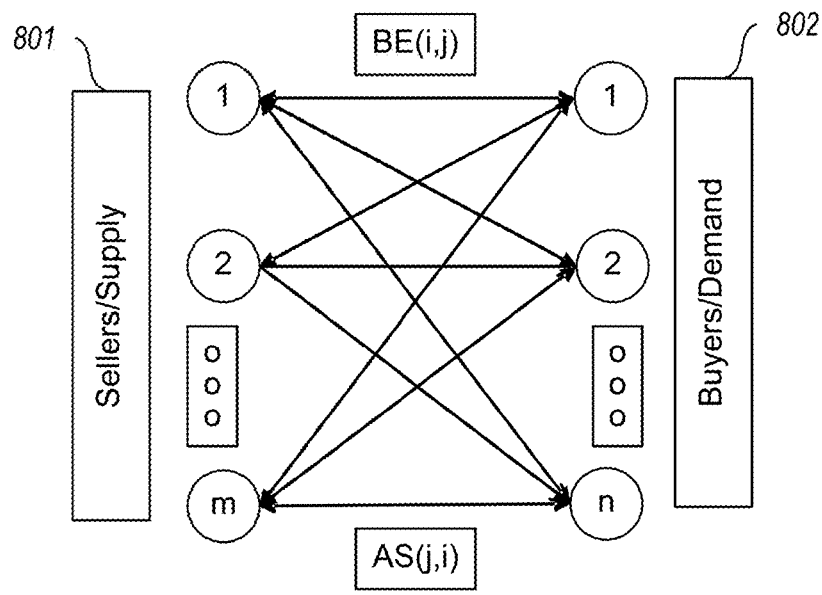
FIG. 8 is a flow diagram of an Auction Model as a Two Sided Assignment Problem according to one implementation of the present invention.
Figure 9:
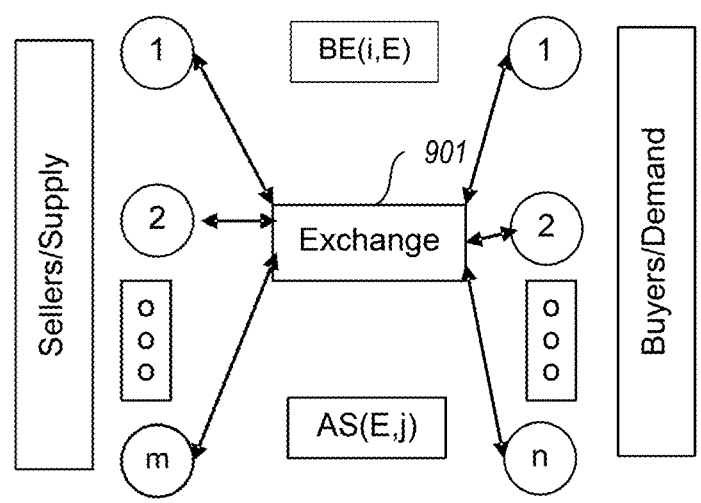
FIG. 9 is a flow diagram of a Computation Auction Model as a Distributed Assignment Problem according to one implementation of the present invention.

The reliability of the electric energy system is modeled at different levels depending on the accuracy of the data and the solutions sought. FIG. 3 shows a multiple supply chain solution with energy flows through various networks from the earth based sources to the various customers. FIG. 4 shows the analysis by a GENCO (e.g., independent power producer (IPP)). FIG. 5 shows the independence of the markets engaged by a GENCO. FIG. 6 shows other energy supply chains which can be evaluated by the Tree Convolution process. FIG. 7 shows the various markets to emulate a competitive environment as connected to the supply resources. FIG. 8 shows the various markets as engaged by distributed resource (generation) suppliers. FIG. 9 shows the natural gas supply chain which is also amenable to the Tree Convolution assessment.

FIG. 1, Basic Energy Model, the described invention accepts bids/asks from supply assets 101, bids/asks from demand assets 102, bids/asks from storage assets 103, and the capability and reliability of the supply chain components 104 to analyze 105 and to implement the control commands to provide a minimum cost solution subject to a minimum level of reliability margin (LODP and EUE). This is the cost (contractual) details needed for each period.

FIG. 1, Basic Energy Model for Period Simulation, the described invention accepts costs (bids/asks) from supply assets 101, tariffs (bids/asks) from demand assets 102, costs (bids/asks) from storage assets 103, and data on the capability and reliability of the supply chain components 104 to implement the control commands to provide a minimum cost solution subject to a minimum level of reliability margin (LODP and EUE) for each period. A regulated environment would use costs and tariffs instead of competitive bids/asks.

Figure 2:
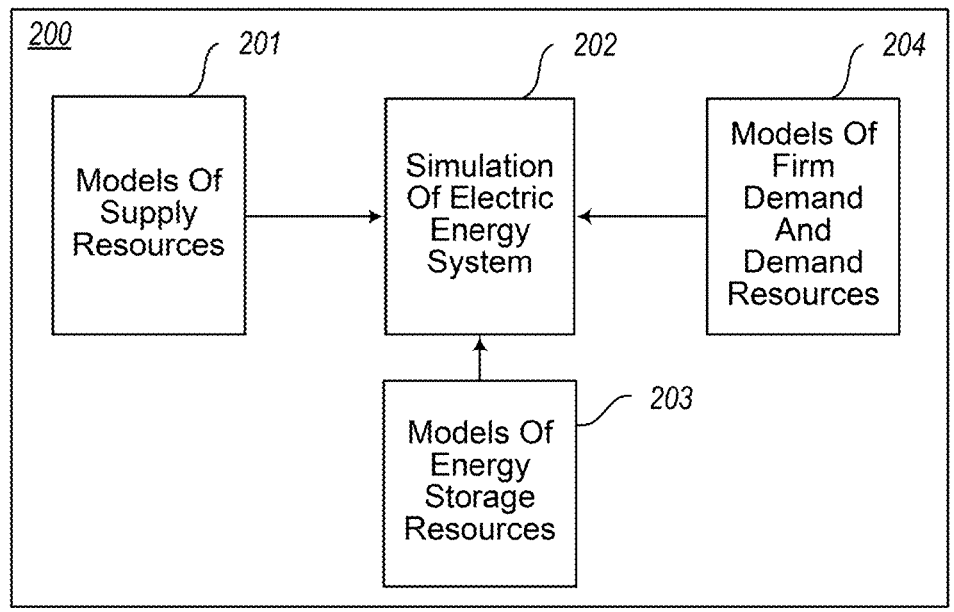
FIG. 2 is a flow diagram of a Basic Energy Model for Period Simulation according to one implementation of the present invention.

FIG. 2, Basic Energy Model for Period Simulation, details the reliability data for each piece of equipment needed to transport the power/energy from the supply to the demand with possible storage to shift the production or demand schedule to reduce the cost of operation from one time period to another. Benefit of real-time reliability analysis is the inclusion of all four resource types to include value added of availability margin impact. Resources that provide services at a more reliable location of operation may increase the benefit due to market balancing based on fewer ancillary services to meet required reliability margins. Resources that provide services at a less reliable location operation may decrease benefit due to market balancing based on more ancillary services to meet required reliability margins. Any of the three Resources may provide ancillary services as well as a separate entity providing only ancillary services.

FIG. 2, Basic Energy Model for Period Simulation, is the model 200 used by Vertically Integrated Utilities. The supply models 201 include all generation resources, based on fuel and maintenance contracts in place, as well as all other contracts to generate electric power over a period of time to meet energy consumption and losses. The electric energy system 202 is the transmission and the distribution systems to move the product from the supply to the buyer. This would include all flow and voltage control devices as well as protection equipment. The models of Energy Storage 203 include all systems and devices to store energy for short or long term benefit. Pumped Hydro storage, batteries, flywheels, hydro systems, are some of the storage systems used to store energy for future use. The models of demand include firm and non-firm demand 204. Firm demand is energy that must be delivered to each customer. Non-firm energy is energy that may be curtailed from customer delivery under contract provisions (tariff in most cases) or by the customer offering a self-curtailment for payment as is practiced in DSM or DR in the regulated environment.

FIG. 3, Analysis for Operations, Planning and Supply Chain Interaction, details the preferred analysis to parallel the operation of the system at equal time increments over the operational planning horizon 301. Reliability of each piece of equipment needed to transport the power/energy from the supply to the demand is explicitly included within the analysis of each week 302. Energy and/or ancillary services may possibly be stored to shift the production or demand schedule to reduce the cost of operation from one time period to another within the week 302 or between weeks 302. Benefit of real-time reliability analysis is the ability of all four resource types to include value added of availability margin impact on offers. Resources that provide services at a more reliable location of operation may increase benefits due to market balancing based on fewer ancillary services to meet required reliability margins. Resource that provide services at a less reliable location operation may decrease offer due to market balancing based on more ancillary services to meet required reliability margins. Any of the three Resources may provide ancillary services as well as an entity providing only ancillary services. Within each week (midterm period) 302, the resource costs of FIG. 1 and the physical availabilities of FIG. 2 are solved at fifteen minute intervals (preferred) based on the services (products) to be coordinated for operation at minimum levels of LODP and EUE.

FIG. 3 shows one program implementation of the algorithm for operation reliability assessment. The basic model of the energy model 100 is the embodiment selected for the following detailed description for a single period simulation which follows in the detailed description. The preferred period of simulation is the week 302 to emulate weekly storage schedules as the weekends are opportune periods for equipment maintenance and for energy storage due to the low demand during weekend and holiday periods. Multiple period resources, such as large storage hydro systems are solved by a repetition of weekly simulation for the duration of the energy storage. Hydro systems, pumped hydro systems, take or pay fuel contracts, and fuel supply chain contract optimization require longer term time studies to optimize and to manage the risk of resource supply chains. The reliability of the electric energy system is modeled at different levels depending on the accuracy of the data and the solutions sought.

FIG. 3 does not explicitly show the intraweek data analysis to emulate hourly storage schedules as there are daily opportune periods for equipment maintenance and for energy storage due to the low demand within the periods when supply is plentiful and/or demand is low. The preferred intra period analysis is performed every fifteen minutes to reduce the number of ancillary services to cover contingencies.

FIG. 4, Preferred Energy Commodity Segmentation, shows the preferred segmentation of the energy product into the bulk energy needed for each sub period, the ancillary services for the bulk period to be available to closely match the demand at each instant of time with demand following and response following additional energy. The outage contingency services are the supplies to be used when any of the energy products (bulk, following, response) are lost due to an outage. As a 15 minute sub-period is preferred, only one type of outage contingency is needed to maintain operation until the next sub period is solved to balance the supplies and the demand. Spinning reserve is the present name given to this service. Additional contingency services may be needed based on the stability of the delivery system and the availability of supply and demand to maintain the exact balance for conservation of energy for the period of analysis. Shorter periods may be preferred to enable faster re-coordination of the resources, the storage, and the demand. Longer periods would require more ancillary services, such as ready reserve, to maintain the operation of the system until the resources, the storage, and the demand are coordinated for unexpected outages or derations.

FIG. 4 shows the segmentation of the demand power and energy as one embodiment for the competitive market. The energy contract 401 is the basic instrument to securing supply for the forecasted demand. Most energy markets are operated a day ahead from the delivery. Such an early, one time bid, is so early, the forecast error is large. A preferred implementation would be an open market until 15 minutes before the hour of the transaction. This would replicate the interchange contract environment before the competitive markets. Other markets operate at other intervals as short as 5 minutes. The benefit of shorter time frames is the need for fewer ancillary or contingent contracts to maintain system stability. The present USA interval is one hour, so that duration is adopted for this description. The basic energy contract is followed by an Energy Balance Demand Following contract 402, sometimes referred to as the Energy Imbalance Market 402. The EIM 402 is to enable the controllers to more quickly and economically follow the actual demand. The Response contract 403 is the available capacity to respond to frequency and interchange excursions due to actual demand and system events. The outage contingency contract 404 enables the control system to replace supply, supply response, network outages, and other event which change the actual demand per control area. The outage contingency contracts 404 often used include spinning reserve and ready reserve. The spinning reserve is that capability available within the next 5 minutes. The ready reserve is the capability available within the next 15 minutes. More contracts are being developed to provide a portfolio of response capability across all future time periods of the energy period.

FIG. 5, Supply Chain Model for Electric, Oil, and Natural Gas as Commodities, shows one of the depictions for energy acquisition, conversion, and transport from the raw resources to the ultimate customer. This figure shows a multiple supply chain solution with energy flows through various networks from the raw resources to the various customers. The supply chain can be segmented in many groups to form a competitive market. The reliability assessment and subsequent management could be applied for all of these possibilities across multiple energy markets 501. The cross dependencies of coal, oil gas, wind and solar, distributed or centralized, are covered by the expanse of this supply chain.

FIG. 5 is one present embodiment of a competitive market in the USA. The energy is offered in advance the day ahead for the Independent System Operator (ISO), to select on behalf of the customer. Distributed generation and storage is available to each customer, in this embodiment pooled by an Energy Service Company (ESCO) 502. This figure shows the various markets to emulate a competitive energy environment as connected to the supply resources. The ancillary service markets are separated and settled by the ISO.

FIG. 5 is an expanded view to show the various markets as engaged by the ISO and the possible direct delivery of the energy sources for distributed conversion by distributed resource (generation) suppliers at the customer site. The reliability analysis would have to include the outage rates (or availability) for each method of transportation (coal train, natural gas pipeline, oil pipeline, and other transportation methods). Present ISOs do not concurrently solve ancillary resources as bids and asks. Instead, ancillary resources are selected based on offers to a Security Constrained Unit Commitment algorithm. The preferred implementation is to treat ancillary services as markets with open bids and asks.

FIG. 6, GENCO Resource Interaction with Multiple Fuel Markets, shows one possible segmentation to link a competitive environments or competitive to regulated market environments. A GENCO 601 is a generation company producing energy and ancillary services based on a raw fuel resource which can be resold to other companies or sold directly to the customer for end use. Heating with oil or natural gas is one such customer direct use. A GENCO 601 is often referred to as an independent power producer (IPP) 601. This is one such embodiment.

FIG. 7, Electric Energy Markets for Ancillary Services, Distributed Resources and for Distributed Ancillary Services shows more detail of the various energy markets for Supply, Storage, or Demand which could be engaged as the preferred implementation. Note that each fuel type or electrical service may not be a direct product or service.

FIG. 8, Auction Model as Two Sided Assignment Problem as solved by English or Dutch Mechanism, by optimization such as LaGrangian Relaxation, Linear Programming, generalized reduced gradient, mixed integer linear programming, etc. The Suppliers 801 and the Buyers 802 would provide cost data or bids/asks for the bulk energy and for each ancillary service.

FIG. 9, Computation Auction Model as Distributed Assignment Problem for bundled contracts for energy and services as presently implemented at ISOs and Future Markets, is a representation of the present embodiment by the USA ISOs to award generation contracts to suppliers based on a day ahead energy exchange 901 with all other services and products trading on subsequent periods, such as the Energy Imbalance Market for forecast errors and outages executed during the day as the day ahead assignments deviate from the forecasted demand. The auction method is an optimization implementation for regulated markets using cost data. The auction method for a competitive environment is based on uniform pricing or pay as bid pricing.

Figure 10:
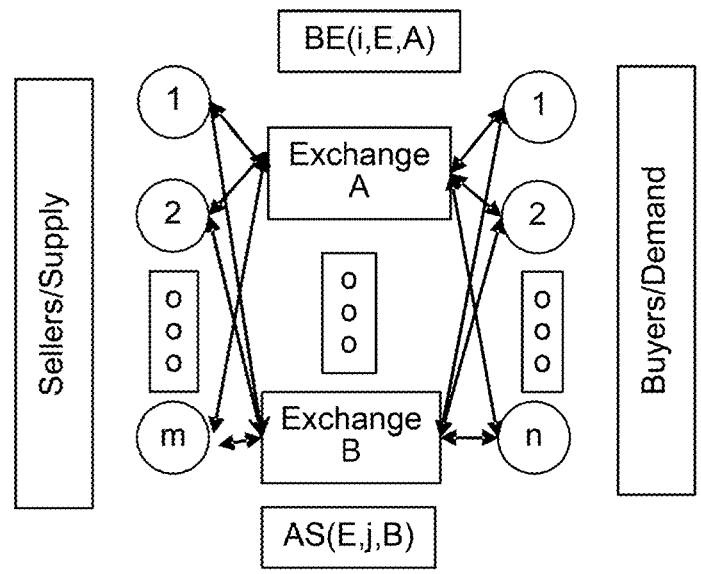
FIG. 10 is a flow diagram of a Computational Auction Method implemented as an Exchange for Bundled Transactive Energy with a Spot/Forward Energy Market according to one implementation of the present invention.

FIG. 10, Computational Auction Method implemented as an Exchange for Bundled Transactive Energy with a Spot/Forward Energy Market is one embodiment to offer various levels of reliability to customers and various level of market/delivery risk for all companies within the supply chain. The auction method is an optimization implementation for regulated markets using cost data. The auction method for a competitive environment is based on uniform pricing or pay as bid pricing. The present EEM in California is based on reliability guarantees at ISOs and Future Markets Exchange Rules, as depicted in this figure.

Figure 11:
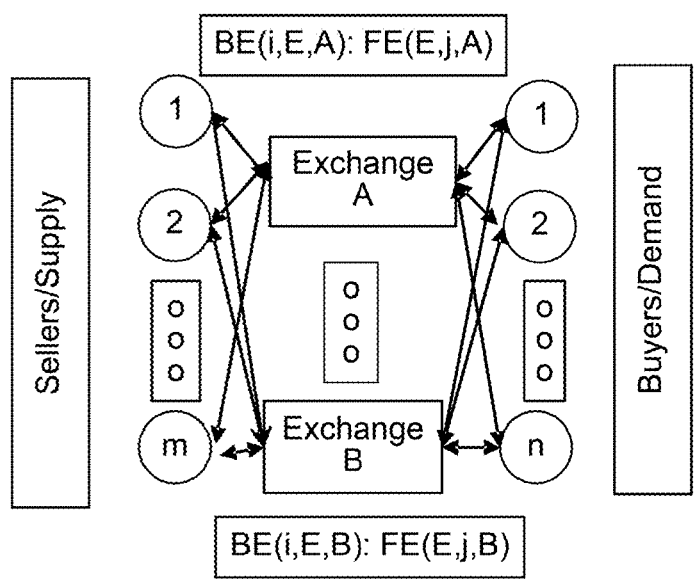
FIG. 11 is a flow diagram of a Spot/Forward Energy Market and Future Markets Implemented across Multiple Distributed Markets according to one implementation of the present invention.

FIG. 11, Spot/Forward Energy Market and Future Markets Implemented across Multiple Distributed Markets, is one embodiment to offer various levels of reliability to customers and various level of market/delivery risk for all companies within the supply chain. The auction method is an optimization implementation for regulated markets using cost data. The auction method for a competitive environment is based on uniform pricing or pay as bid pricing. The present EEM across the USA is based on reliability guarantees at each ISO and Future Markets Exchange Rules, as depicted in this figure.

Figure 12:
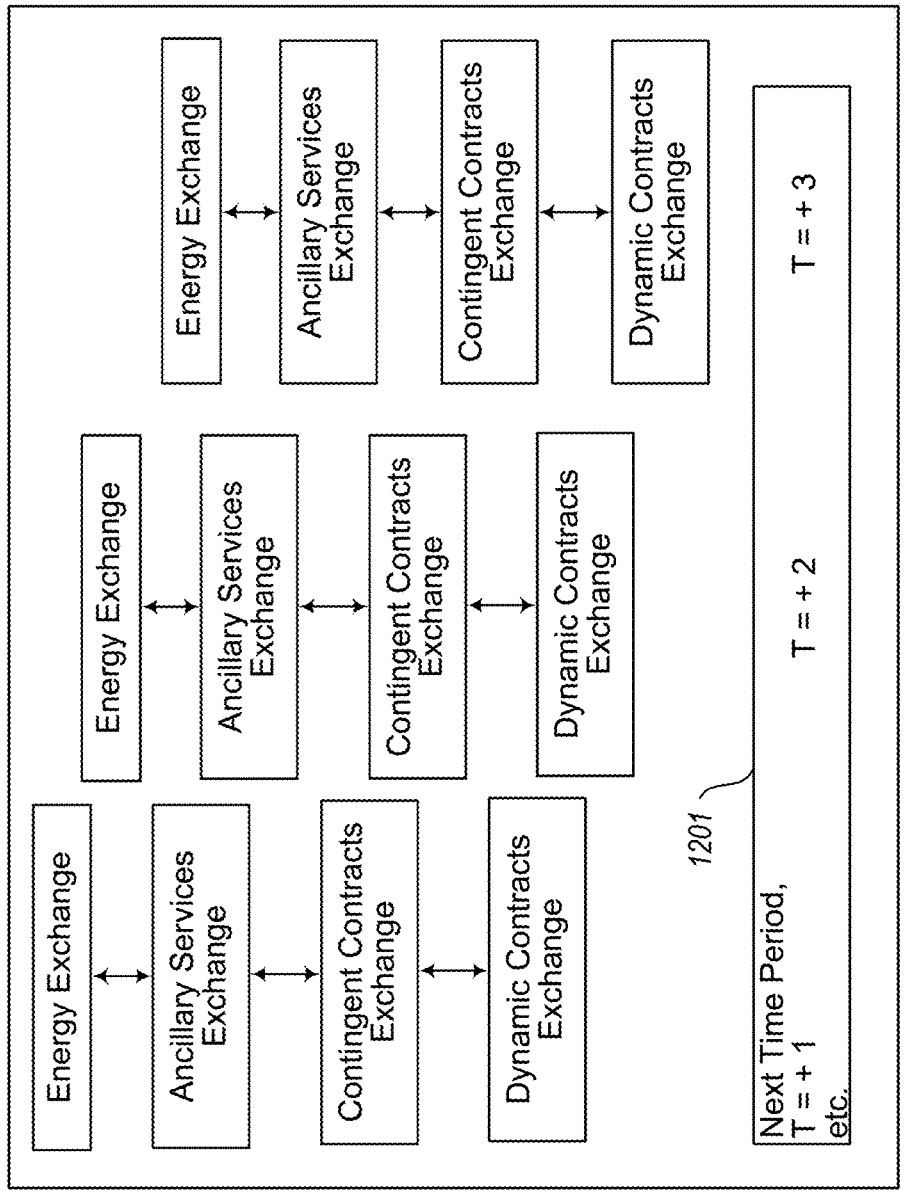
FIG. 12 is a flow diagram of a Sequence of market interaction of Resources over each time period according to one implementation of the present invention.

FIG. 12, Sequence of market interaction of Resources over each time period 1201 within the week. Dynamic Contracts are used for suppliers with less control than traditional generators, such as wind and solar renewable sources. Dynamic contracts are used by storage devices and demand willing to quickly change to match the Dynamic renewable resources.

Figure 13:
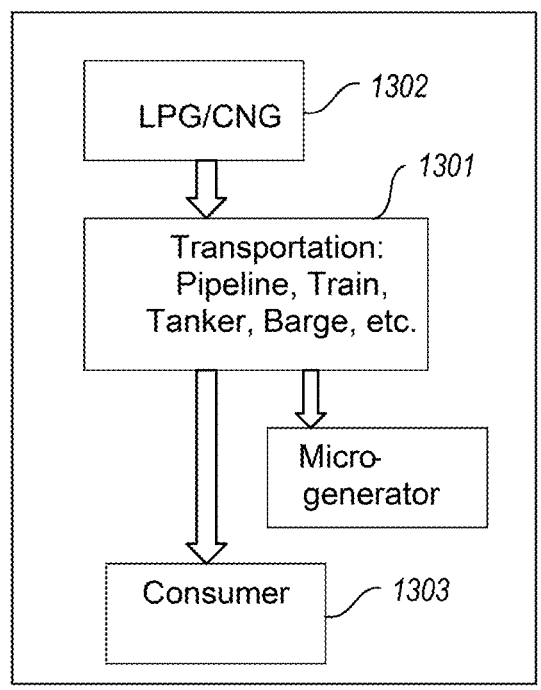
FIG. 13 is a flow diagram of a Liquid Propane, Compressed Natural Gas Supply Chain evaluated according to one implementation of the present invention.

FIG. 13, Liquid Propane, Compressed Natural Gas Supply Chain Separated for Clarity of Network Connections, show the various paths 1301 for fuel from raw harvesting 1302 to consumer end use 1303. It is noted that connections between the various paths 1301 is common, essentially altering the energy services and the ancillary services provided to the customer. The reliability assessment can be applied individually to each chain but the most accurate is to apply the reliability analysis across all markets at the same time. This figure shows that other energy supply chains which can be evaluated by the Tree Convolution process. It is only a matter of modeling the conversion process from raw fuel to transported fuel, even oil to gasoline, and the reliability and capability of each link in the supply chain.

Figure 14:
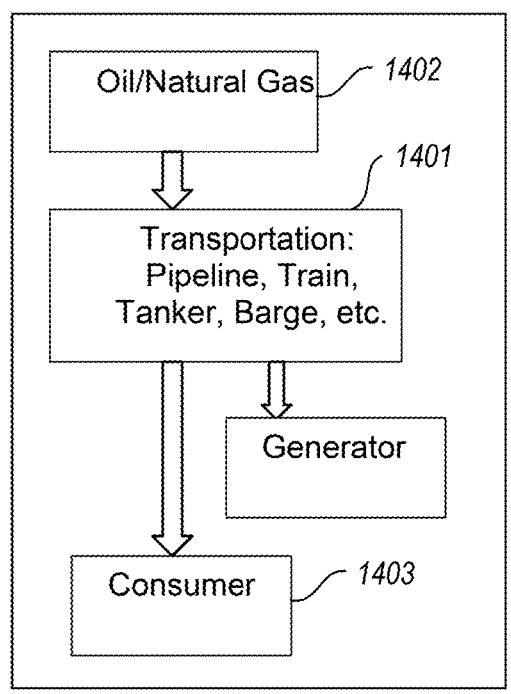
FIG. 14 is a flow diagram of an Oil and Natural Gas Supply Chain evaluated according to one implementation of the present invention.

FIG. 14, Oil and Natural Gas Supply Chain Separated for Clarity of Network Connections, show the various paths 1401 for fuel from raw harvesting 1402 to consumer end use 1403. It is noted that connections between the various paths 1401 is common, essentially altering the energy services and the ancillary services provided to the customer. The reliability assessment can be applied individually to each chain but the most accurate is to apply the reliability analysis across all markets at the same time. This figure shows that reduced energy supply chains can be evaluated by the Tree Convolution process. It is only a matter of modeling the conversion process from raw fuel to transported fuel, even oil to gasoline, and the reliability and capability of each link in the supply chain.

Figure 15:
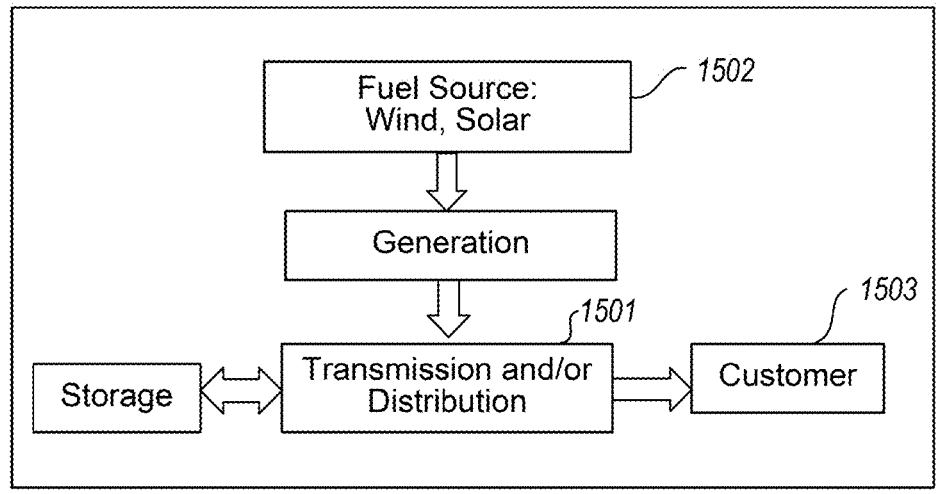
FIG. 15 is a flow diagram of a Wind/Solar Supply Chain evaluated according to one implementation of the present invention.

FIG. 15, Wind/Solar Supply Chain Separated for Clarity of Network Connections, show the various paths 1501 for fuel from renewable resource 1502 to consumer end use 1503. It is noted that connections between the various paths is unchanged, essentially altering the energy services and the ancillary services provided to the customer with only renewable resources. The reliability assessment can be applied individually to each chain but the most accurate is to apply the reliability analysis across all markets at the same time. This figure shows that other energy supply chains can be evaluated by the Tree Convolution process. It is only a matter of modeling the conversion process from resource to the buyer given the reliability and capability of each link in the supply chain.

Figure 16:
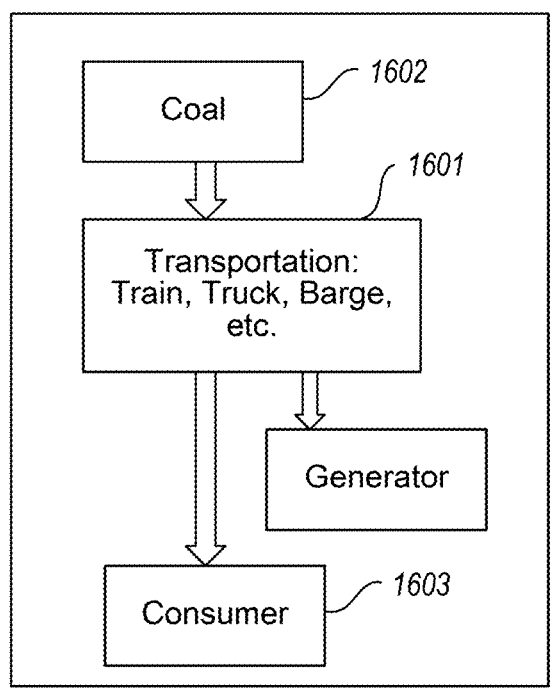
FIG. 16 is a flow diagram of a Coal Supply Chain evaluated according to one implementation of the present invention.

FIG. 16, Coal Supply Chain Separated for Clarity of Network Connections, show the various paths 1601 for fuel from mining 1602 to consumer end use 1603. It is noted that connections between the various paths 1601 is common, essentially altering the energy services and the ancillary services provided to the customer given the availability of the generators. The reliability assessment can be applied individually to each chain but the most accurate is to apply the reliability analysis across all markets at the same time. This figure shows that other energy supply chains can be evaluated by the Tree Convolution process. It is only a matter of modeling the conversion process from raw fuel to transported fuel by any method of transport given the reliability and capability of each link in the supply chain.

Figure 17:
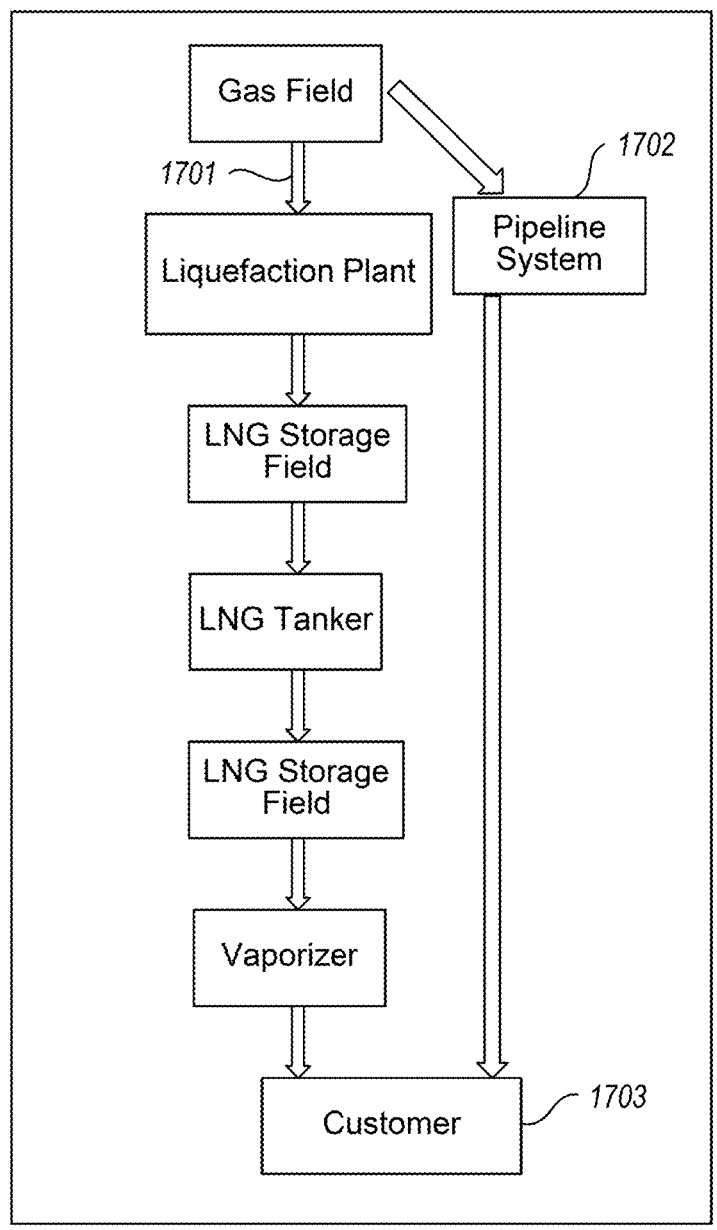
FIG. 17 is a flow diagram of a Natural Gas Supply Chain Pipeline Transport Augmented with LNG Shipment evaluated according to one implementation of the present invention.

FIG. 17, Natural Gas Supply Chain Pipeline Transport Augmented with LNG Shipment Separated for Clarity of Network Connections, show the various paths 1701 for fuel from well 1702 to consumer end use 1703. It is noted that connections between the various paths 1701 is common, essentially altering the energy services and the ancillary services provided to the customer to match the supplier with the buyer. The reliability assessment can be applied individually to each chain but the most accurate is to apply the reliability analysis across all markets at the same time. This figure shows that other energy supply chains which can be evaluated by the Tree Convolution process. It is only a matter of modeling the conversion process from well to various transportation of fuel given the reliability and capability of each link in the supply chain.

Figure 18:
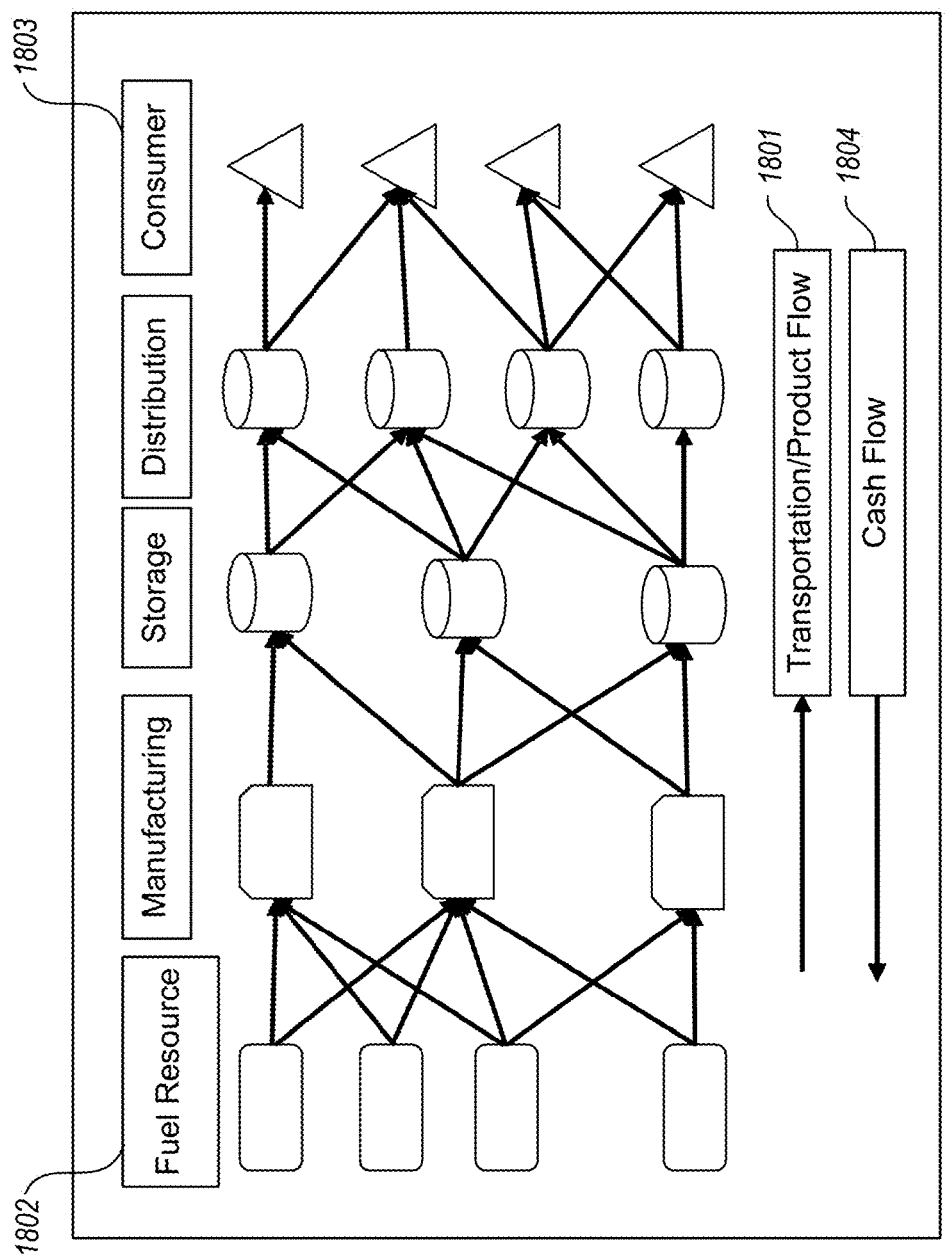
FIG. 18 is a flow diagram of an Electric Energy Supply Chain evaluated according to one implementation of the present invention.

FIG. 18, Electric Energy Supply Chain generalized for a multiplicity of generating services, of storages, and of distribution shows the extension of the Tree Convolution Technique for other supply chains. It is noted that connections between the various paths is common, essentially altering the bulk services and the ancillary services provided to match the supplier characteristics to the buyers characteristics. The reliability assessment can be applied individually to each chain but the most accurate is to apply the reliability analysis across all markets at the same time. This figure lists other supply chains which can be analyzed and controlled. It is only a matter of modeling the supplier conversion process from raw material to transportation, to buyer use given the reliability and capability of each link in the supply chain.

FIG. 18, Generic Supply Chain for Other Products, shows the embodiment for other supply chains such as food, clothing, information, financial services, and military supplies as another embodiment. The information needed is analogous to the capability and the reliability data for the energy supply chain. Note that for all of these supply chains the product flow 1801 is from the resource 1802 to the customer 1803 while the cash flow 1804 is from the customer 1803 to the resource 1802.

Figure 19:
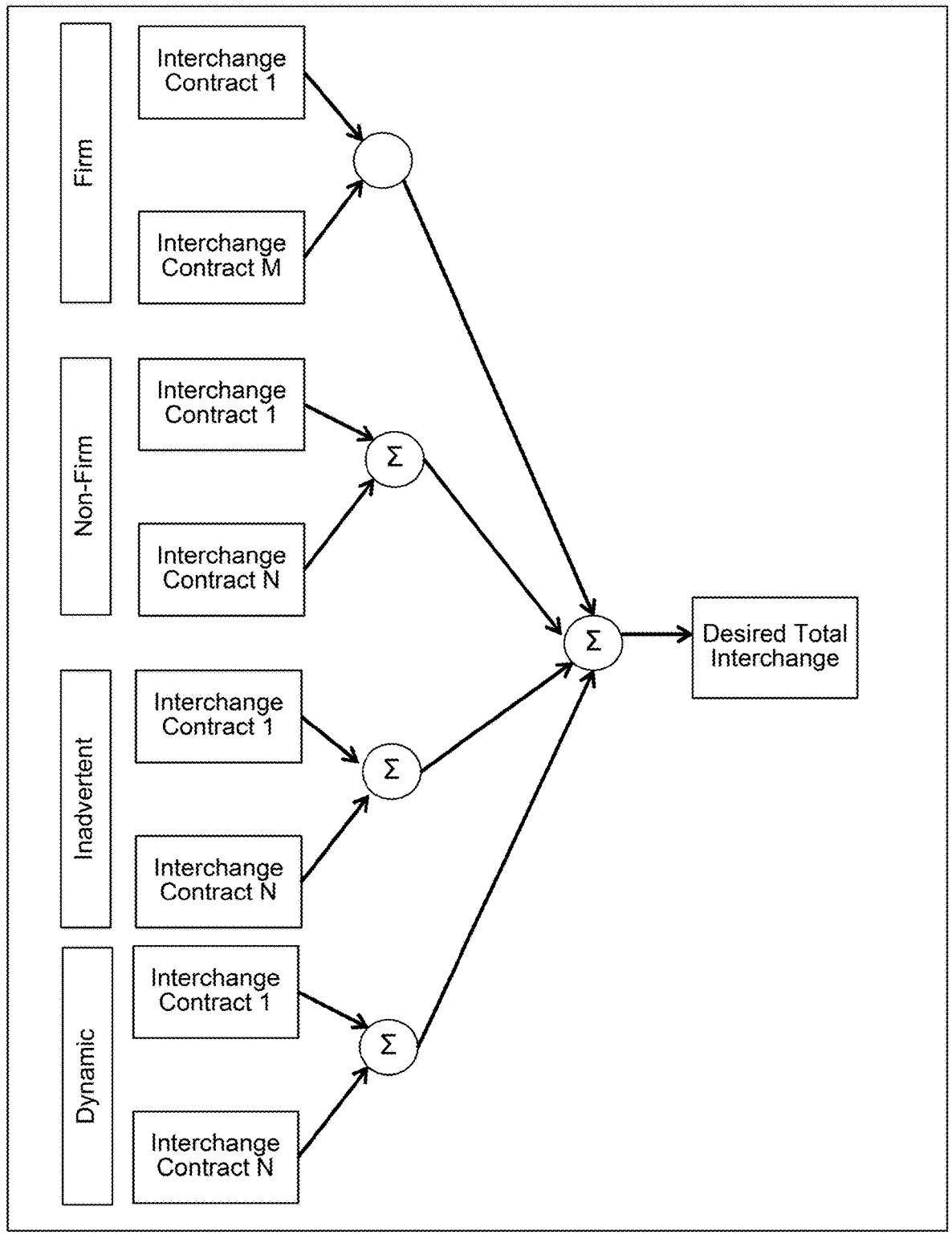
FIG. 19 is a flow diagram of summation of bulk and ancillary service exchanges between control areas according to one implementation of the present invention.

FIG. 19, details the summation of bulk and ancillary service exchanges between control areas. A control area is a geographic segmentation of resources separated by connection limitations. The segmentation can be to the level of a microgrid or to the level of a state/province such as presently implemented in California.

Figure 20:
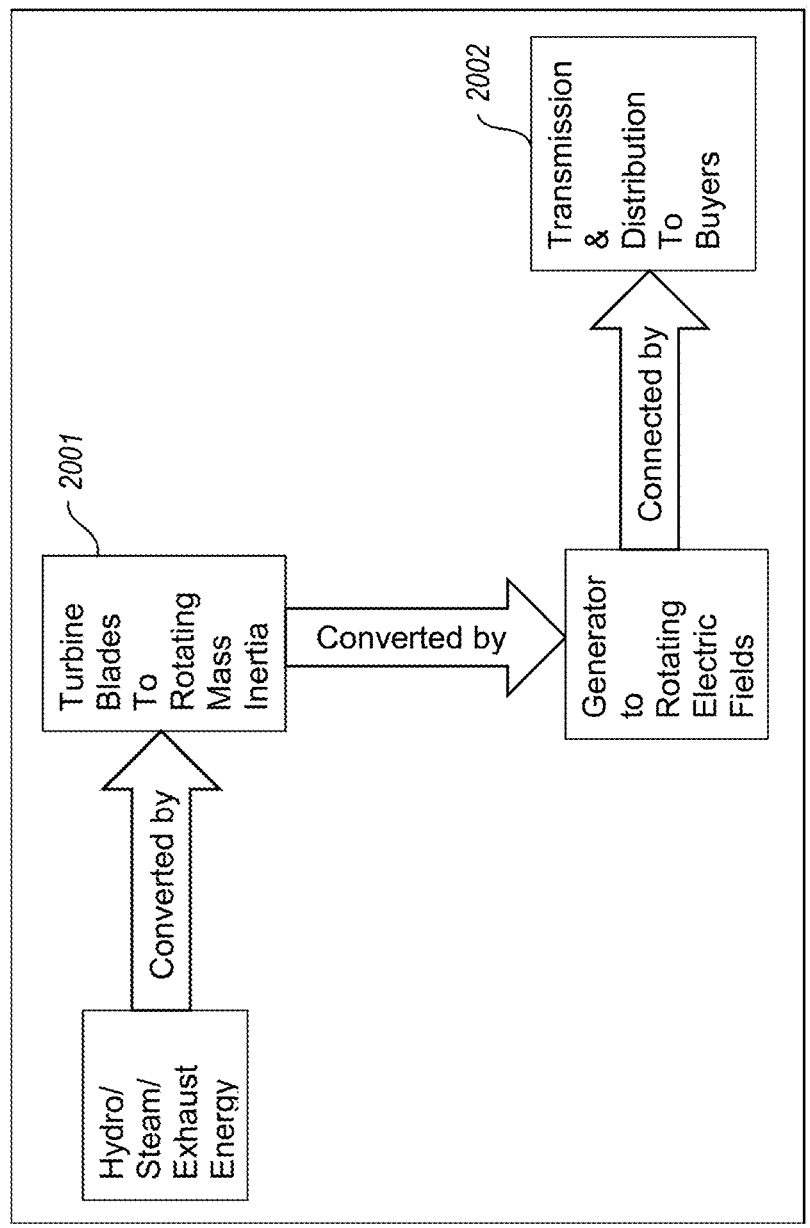
FIG. 20 is a flow diagram of an Inertia Match for Demand Following according to one implementation of the present invention.

FIG. 20, Inertia Match for Demand Following, shows the required link between the inertia suppliers 2001 and the buyers 2002 which maintains the system frequency within operational limitations. The inertia is the instantaneous response to the change in demand as buyers 2002 use more or less electric energy. Such changes include air conditioners cycling on and off, refrigerators cycling on and off, consumers appliance pattern use, etc. Inertial Match for Demand Following, shows the inherent demand following capability of the power system as mechanical energy is converted instantaneously to electrical energy due to changes in demand and losses. Fossil fueled and hydro generation by design have inertia. Wind and solar generation do not have an inherent inertia contribution. Instead inertia has to be provided by energy storage devices, such as batteries, flywheels, fuel cells as established by stability studies. Any inertia imbalance that lasts for over a few fractions of a second leads to a blackout as devices trip due to loss of synchronism.

Figure 21:
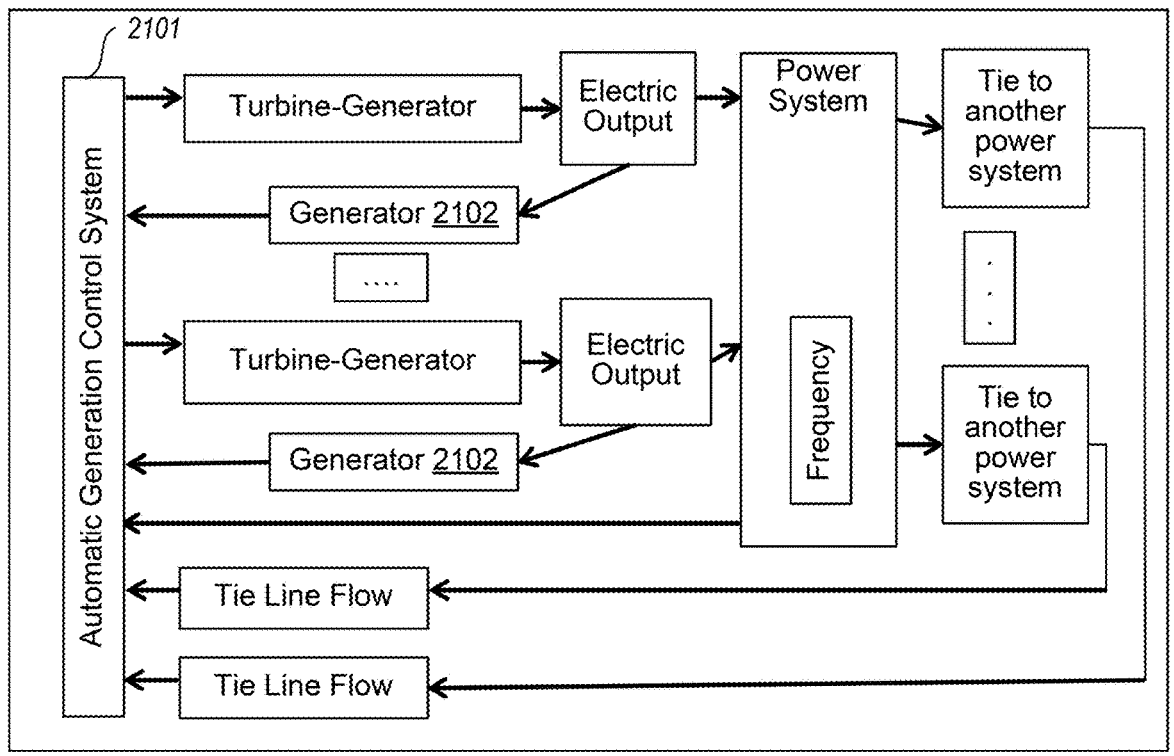
FIG. 21 is a flow diagram of a Resource Selection for Energy Supply and ancillary services according to one implementation of the present invention.

FIG. 21, Resource Selection for Energy Supply and ancillary services, depicts the control systems 2101 implementing the selected resources between multiple supply resources (generation) 2102 and multiple customers (buyers) within the control area and with suppliers and buyers in adjacent control areas. Each component of the control system 2101 is presented in the following figures. The Probability Tree Convolution selects the least cost resources for each component to satisfy the LODP and the EUE given the availability data for each resource 2102. Resource Selection for Demand Following, would include the Energy Imbalance Market selections by the PTC algorithm. The EIM is the market in a competitive environment selected by the PTC algorithm in an auction mechanism for the difference between the energy contracts and the actual demand and interchange. EIM is preferred to be offered for each 5 minute interval. EIM may be a continuous or a one-time auction. It is preferred to be a continuous auction until 5 minutes before the period of the auction.

Figure 22:
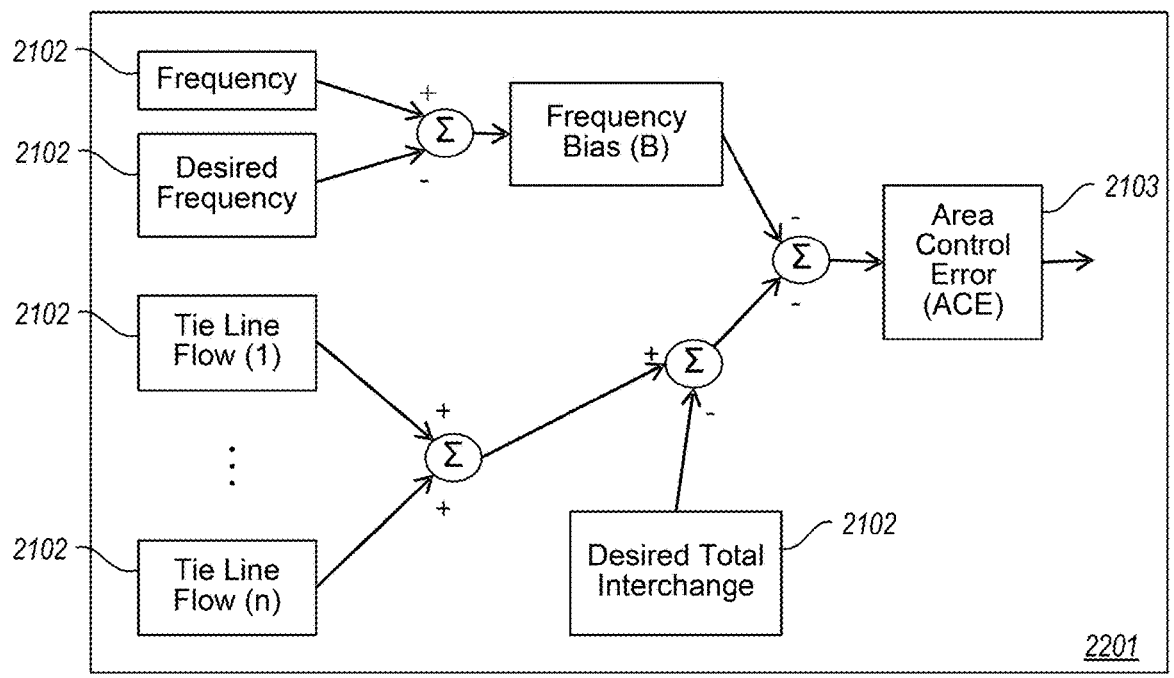
FIG. 22 is a flow diagram of an Automatic Generation Control (AGC) for Demand Following—Frequency and Interchange Control according to one implementation of the present invention.

FIG. 22, Automatic Generation Control (AGC) for Demand Following—Frequency and Interchange Control, shows the overall control system 2201. The major variables 2102 monitored for control and the major outputs 2103 to maintain system operation, frequency operation within system stability limits, and the control variables to enable the control systems to function. The control variables are interchange schedules, energy schedules, energy imbalance schedules, and inertia response to frequency changes. The control variables are based on the energy commodity segmentation selected and has to change accordingly to match the contract against the actual demand and supply chain response. Automatic Generation Control, show the central logic to find the area control error the key performance index of the supply satisfying the demand. The ACE is next used to find the desired output at each resource. This figure details the centralized area control error calculation based on measured frequency and interchange flows.

Figure 23:
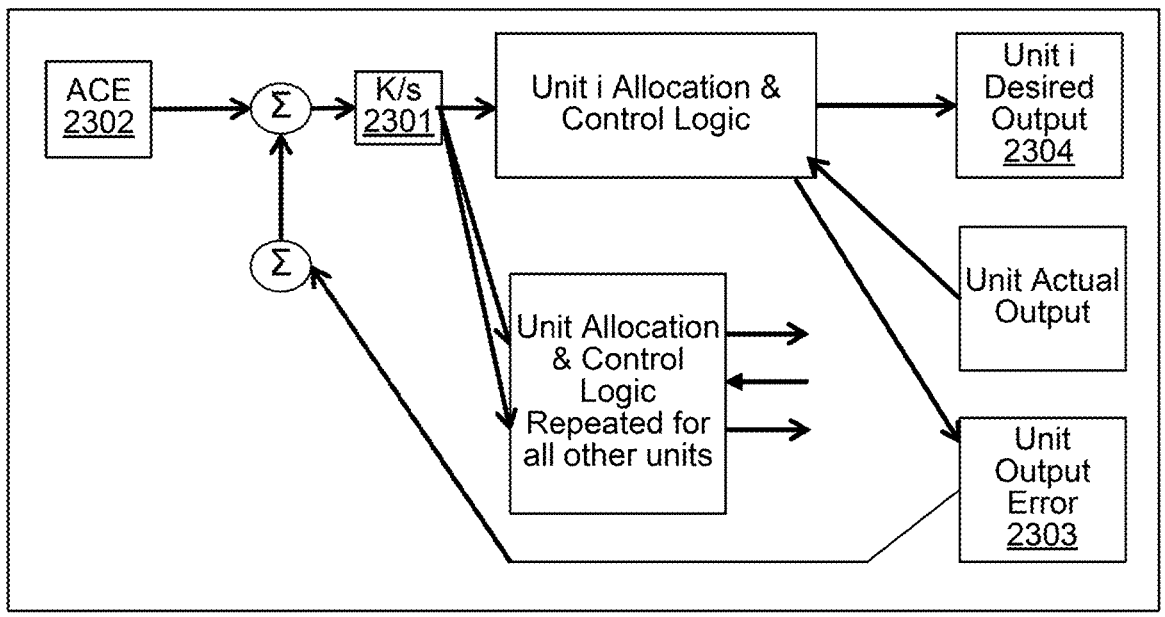
FIG. 23 is a flow diagram of Conversion of ACE to Desired Injection and connection to Allocation Logic according to one implementation of the present invention.

FIG. 23, Conversion of ACE to Desired Injection and connection to Allocation Logic. The area bias factor (K/s) 2301 converts the frequency change to a real power change to be allocated to each resource. The frequency error is converted to a demand error based on the sensitivity of the controlled power system (bias factor). The error between scheduled and actual interchange is added to the frequency error component to find the area control error 2302. The unit output errors 2303 for capability response not achieved and should be investigated for equipment non-response. The selection of Energy Imbalance Market (EIM) Resources in a competitive environment would alter the Unit Desired Output 2304.

Figure 24:
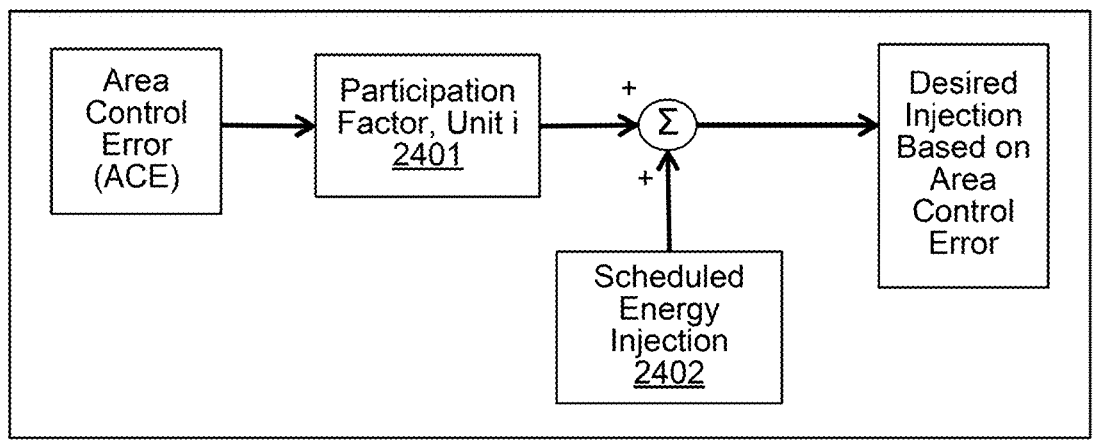
FIG. 24 is a flow diagram of Unit Allocation Logic according to one implementation of the present invention.

FIG. 24, Unit Allocation Logic, shows the allocation of the energy imbalance based on contract response characteristics as a function of the Participation Factor 2401 and the Scheduled Energy Injection (SEI) 2402. The SEI 2402 is the selected resource for Bulk Energy, Energy Imbalance, Demand following, and Frequency Following assignments by the PTC.

Figure 25:
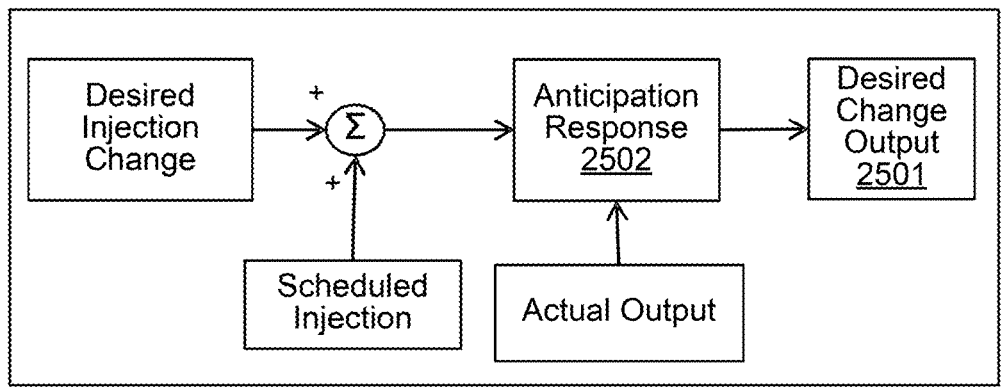
FIG. 25 is a flow diagram of Unit Net Change Logic according to one implementation of the present invention.

FIG. 25, Unit Net Change Logic, adds the ACE contribution to the other energy schedules to determine the total net change 2501 desired. Any changes not yet achieved are subtracted based on the response characteristic 2502 of the resource. The result is the Desired Net Change 2501 which is sent to the resource to be implemented.

Figure 26:
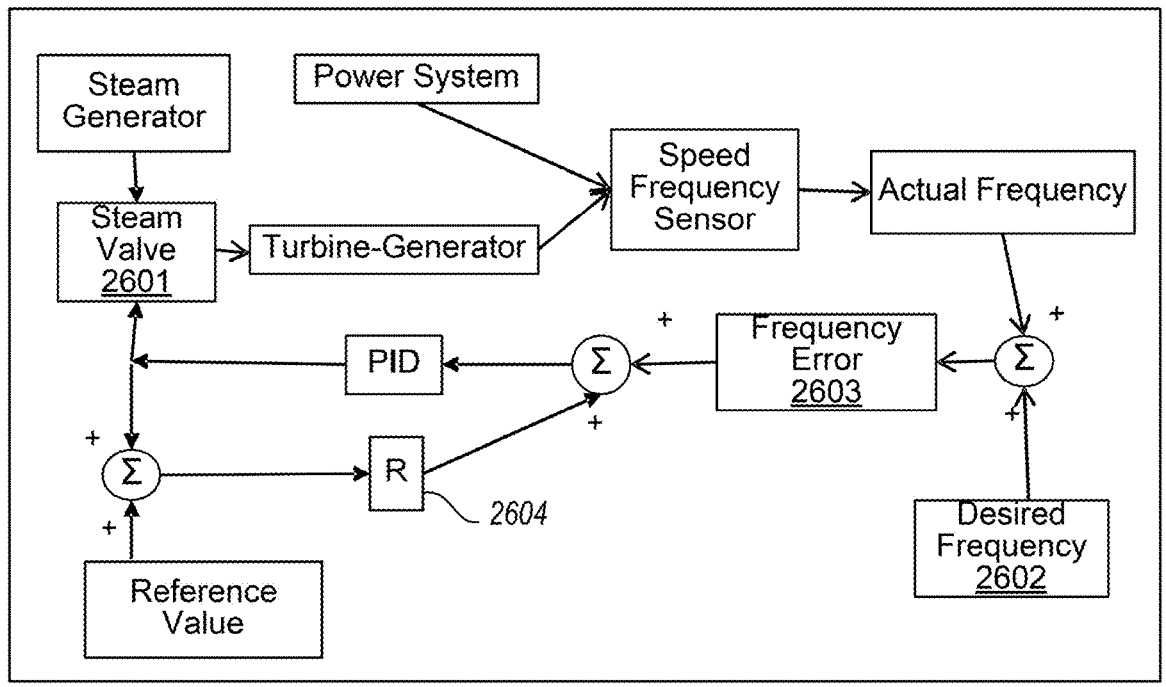
FIG. 26 is a flow diagram of a Governor Setting for Demand Following (and Ancillary Response Capability) according to one implementation of the present invention.

FIG. 26, Governor Setting for Demand Following (an Ancillary Response Capability), shows the connection of the governor to the controlling steam valve 2601, the local change in frequency sensor 2602, and the feedback to open or close the valve to respond to the frequency error 2603. The frequency error 2603 is converted to an energy imbalance by the governor tuning constant. The response of the resource to frequency changes is determined by the Governor Droop constant (R) 2604 selected by the PTC as the least cost resource.

FIG. 26, Governor Setting for Demand Following and Ancillary Response Capability, shows the interaction of the Governor, Prime Mover, Inertia, and Demand Reference. This details the control diagram relating the processing of the governor response to change the valve opening, the prime mover response to the valve change, and the expected mechanical power change added to the demand change to forecast the change in frequency. The rotation of the turbine and generator mass increases or decreases until the load reference point is changed to restore the energy to the rotating inertia. Only then can the desired operating frequency be achieved. This is nominally 60 Hz within the USA, Canada, and Mexico. The reference can be altered to balance previous frequency errors with present resources selected by the TPC analysis.

Figure 27:
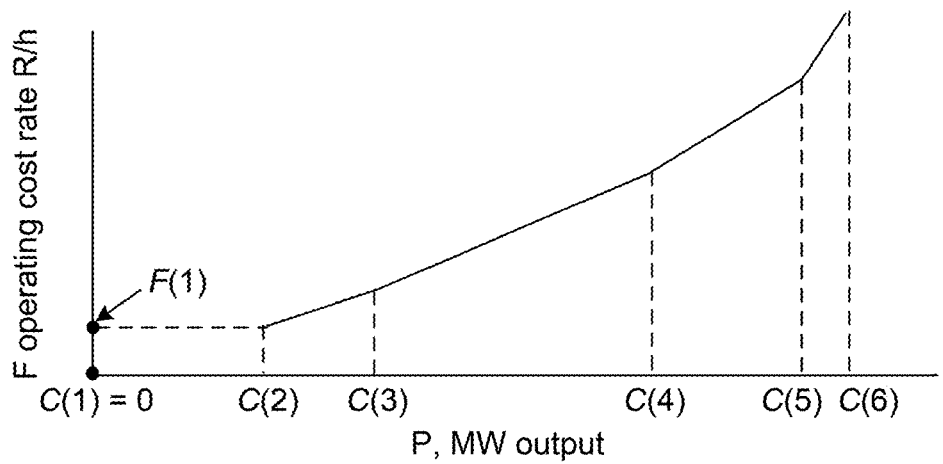
FIG. 27 is a function graph of a fossil fuel generation model for operating cost according to one implementation of the present invention.
Figure 28:
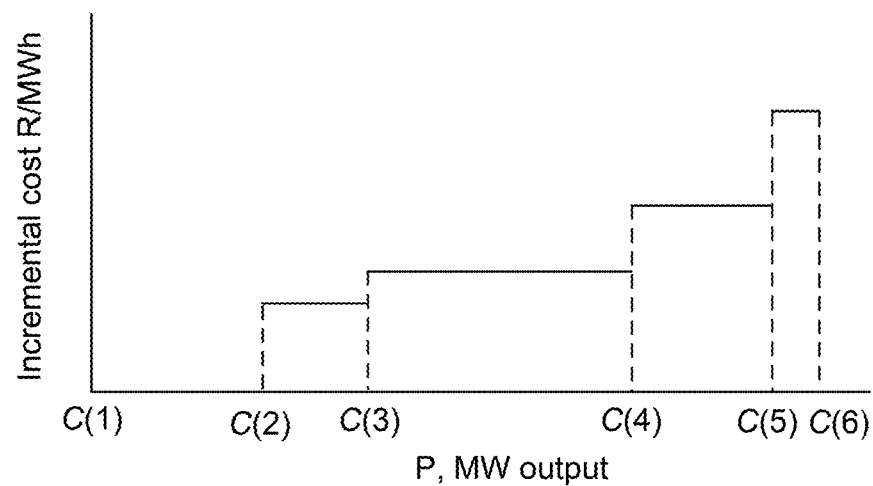
FIG. 28 is a function graph of a fossil fuel generation model for incremental cost according to one implementation of the present invention.
Figure 29:
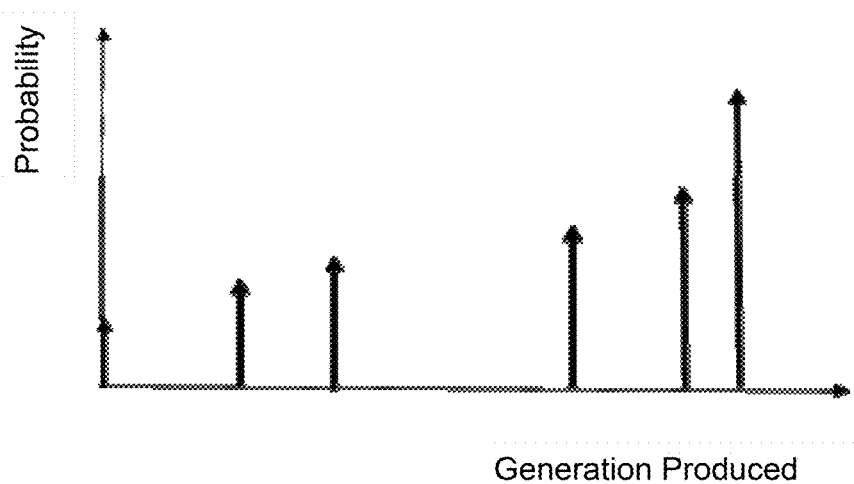
FIG. 29 is a function graph of a fossil fuel generation model for capability and reliability according to one implementation of the present invention.

FIGS. 27, 28, and 29 show the fossil fuel generation models: Cost, Incremental Cost, Capability and Reliability. These are the preferred models for generation resources using fossil fuel, including bio-fuels and geothermal. The cost data is linearized for computational speed but may be modeled by an alternative curve such as quadratic, cubic, or reduced cubic functions. The Capability data shows the availability of each segment. This is reduced to a two state model for initial generation of the EDDC model. The two state model is expanded as needed to iteratively refine the EDDC as indicated by the optimization process sensitivity factors to satisfy the tolerance specified by the user. The present embodiment expects that many levels of generation availability could be commonly used. The efficiency, capability, and fuel quality may be altered temporarily due to weather factors or due to partial equipment malfunction. As operational data is gathered, the distribution is altered to fit the most recent observations. The fuel curves for hydro units detail the amount of water used. The value of the water is found as the opportunity cost of shifting generation from one period to another to reduce the cost of fossil fuel.

Figure 30:
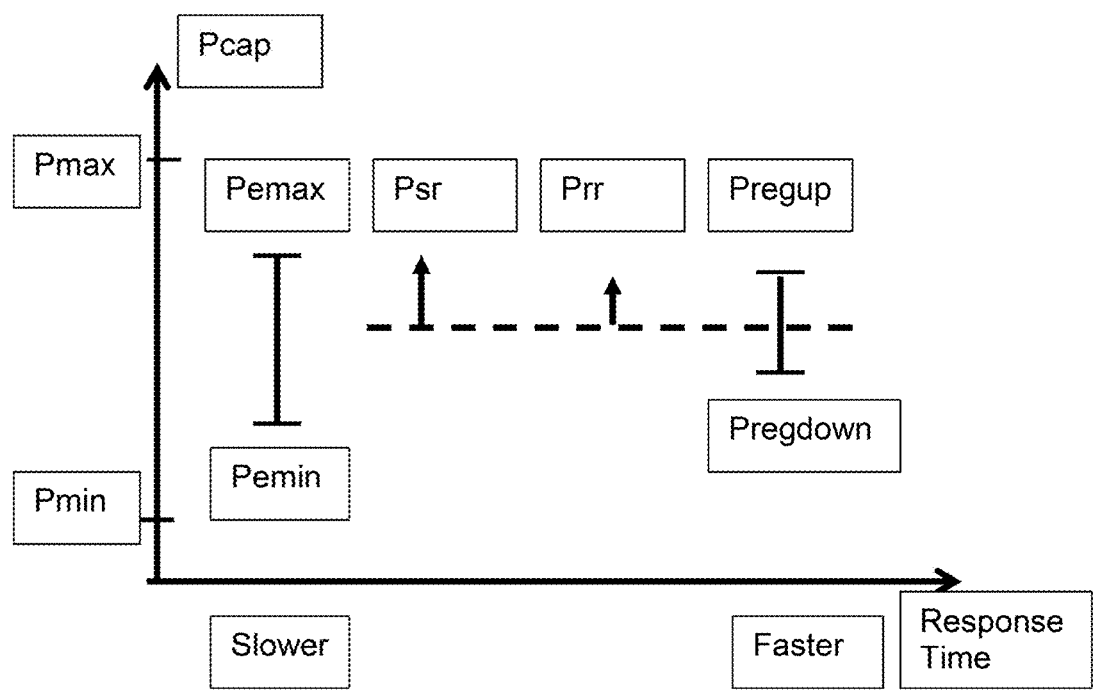
FIG. 30 is a graph of a Fossil Fuel and Hydro Generation Energy and Ancillary Services Model according to one implementation of the present invention.

FIG. 30, Fossil Fuel and Hydro Generation Energy and Ancillary Services Model, depicts the bulk capability as well as the ancillary service capability for a single unit. The number of ancillary services match the number of ancillary requirements based on the selection for the trading intervals and the capability of the equipment.

Figure 31:
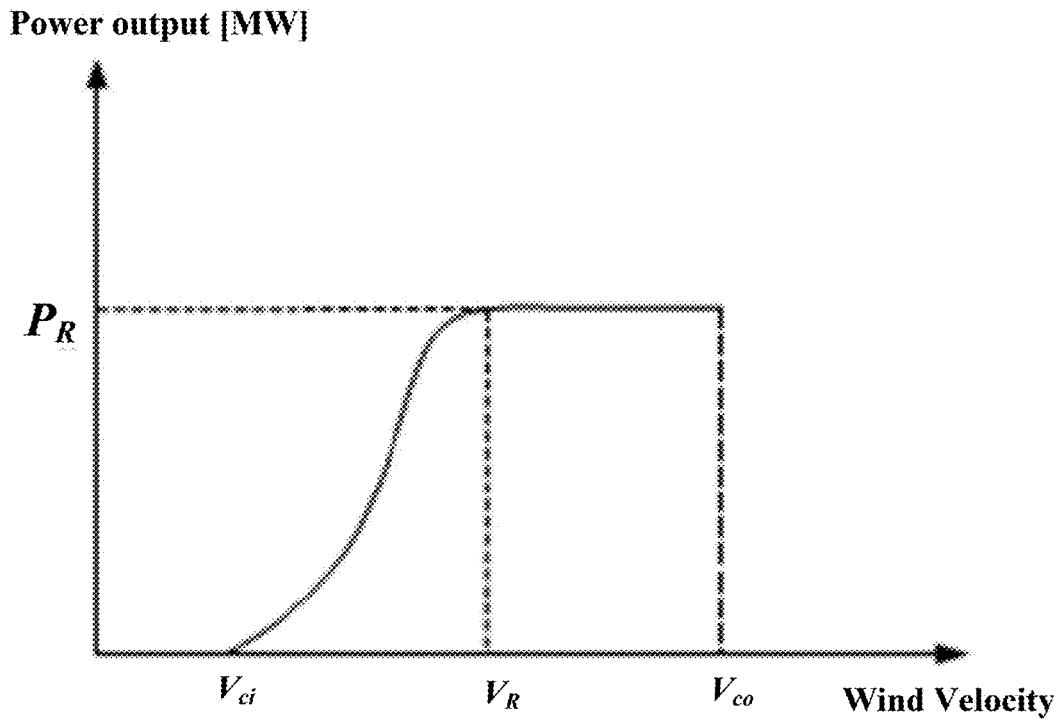
FIG. 31 is a function graph of a Wind Generation Resource Model according to one implementation of the present invention.

FIG. 31, Wind Generation Resource Model, shows the wind generation resource model based on the equipment capability.

Figure 32:
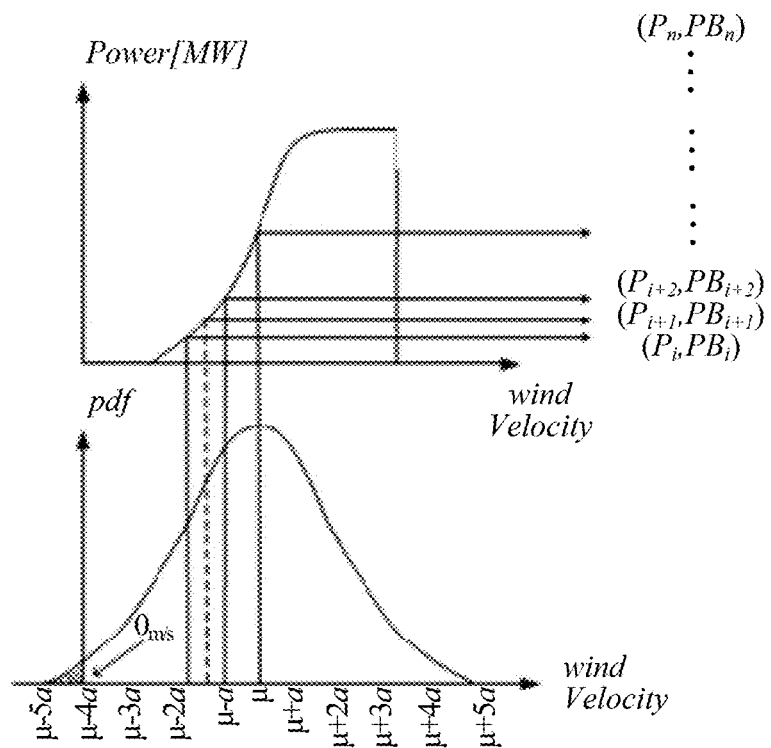
FIG. 32 is a representation of function graphs of a Wind Generation Resource Model for Wind Probable Distributions according to one implementation of the present invention.

FIG. 32, Wind Generation Resource Model for Wind Probable Distributions, depicts the conversion to include uncertainty in the wind forecast. A four state model is preferred by this implementation. A higher degree model may be used as warranted by the historical data. This implementation prefers the three state model based on historically available data. As operational data is gathered, the distribution is altered to fit the most recent observations. The PTC algorithm uses two reduced states initially and adds the remaining states as required to meet the user specified tolerance for EDDC energy accuracy. As operational data is gathered, the distribution is altered to fit the most recent observations.

Figure 33:
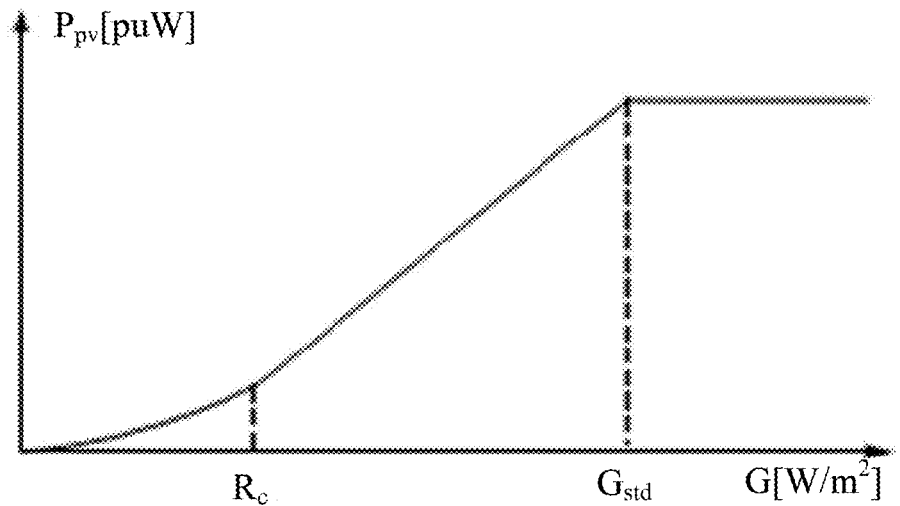
FIG. 33 is a function graph of a Solar Generation Model according to one implementation of the present invention.

FIG. 33, Solar Generation Model, shows the solar cell resource model based on historical sunlight at a given location for a given technology.

Figure 34:
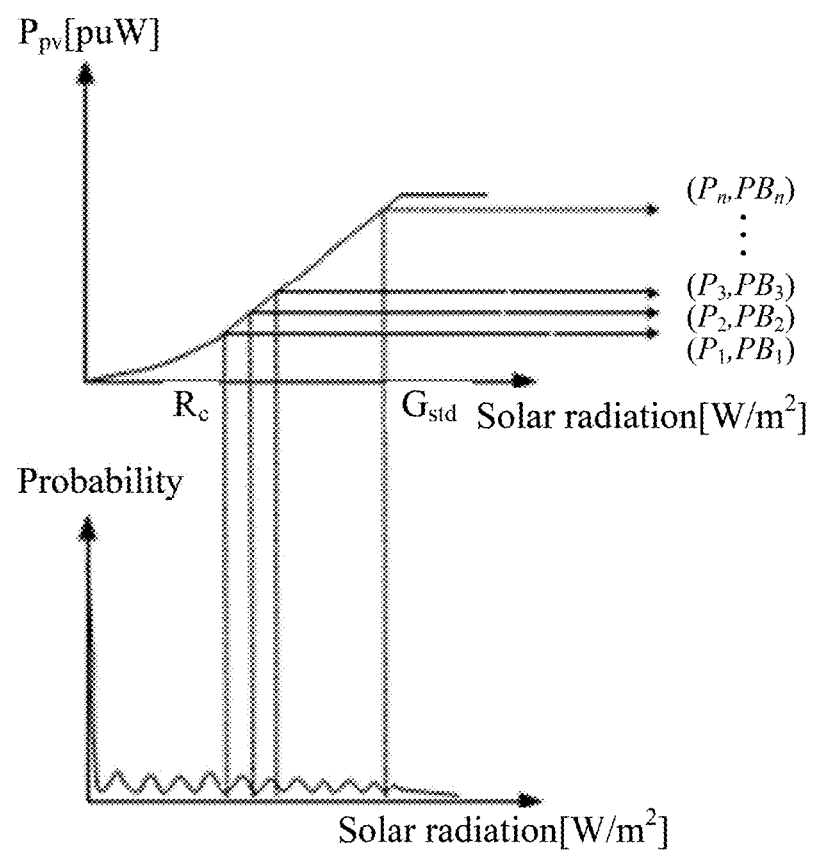
FIG. 34 is a representation of function graphs of a Solar Generation Model for Solar Probable distributions according to one implementation of the present invention.

FIG. 34, Solar Generation Model for Solar Probable distributions, depicts the conversion to include uncertainty in the solar forecast. The preferred method as used in this application five levels for the end model. The PTC algorithm uses two reduced states initially and adds the remaining states as required to meet the user specified tolerance for EDDC energy accuracy. As operational data is gathered, the distribution is altered to fit the most recent observations.

Solar, Wind, and Biofuel resources may provide the same ancillary services as shown in FIG. 30 when such services are installed and under control. Demand Response may also include ancillary services as shown in FIG. 30 when such services are installed and under control.

Figure 35:
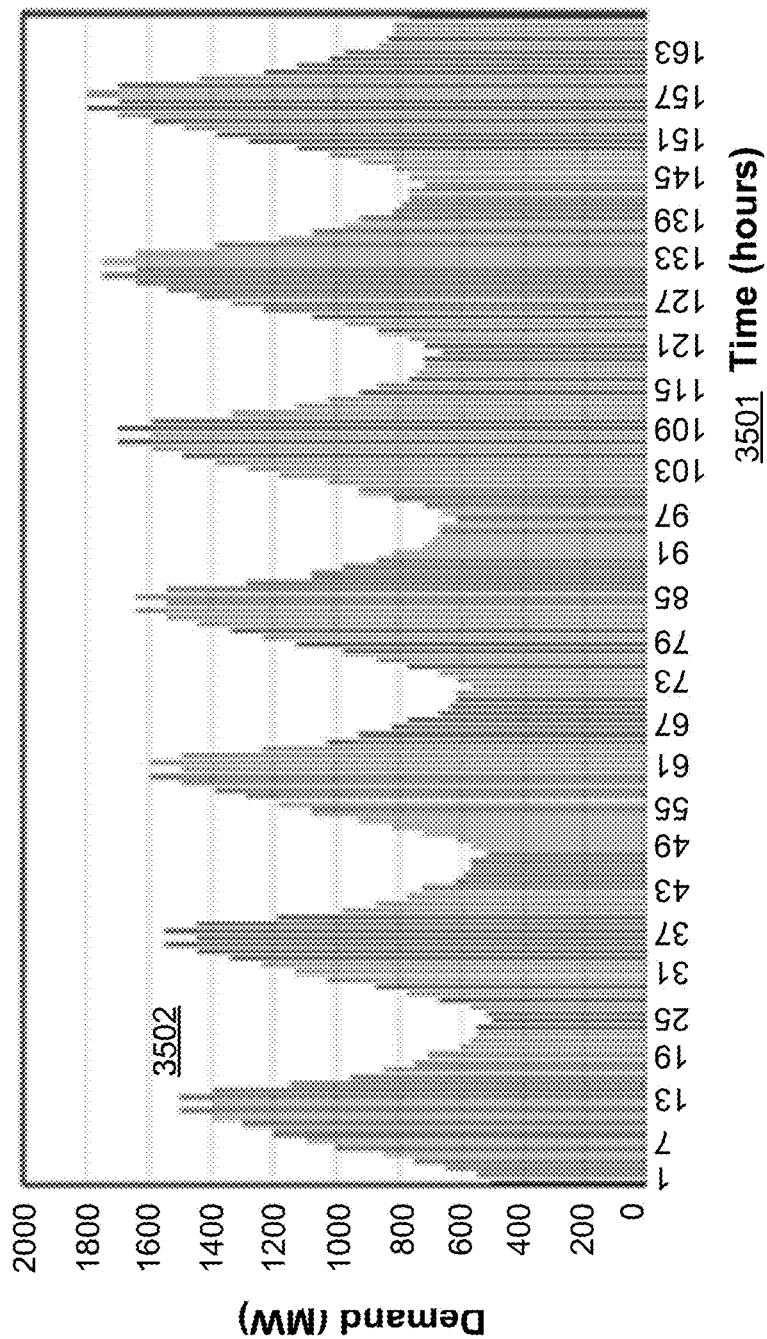
FIG. 35 is a bar graph of an Hourly Demand Curve model according to one implementation of the present invention.

FIG. 35, Hourly Demand Curves, shows the preferred hourly model for one week. The actual demand is monitored and saved for demand forecasting, scheduling, and for production costing studies. As operational data is gathered, the distribution is altered to fit the most recent observations. Models may be altered due to weather conditions, economic conditions, or customer input. The figure shows hourly data intervals 3501, however, the preferred implementation is to use fifteen minute intervals. The hourly demand curve 3502 is the preferred representation of the Demand and Losses.

Figure 36:
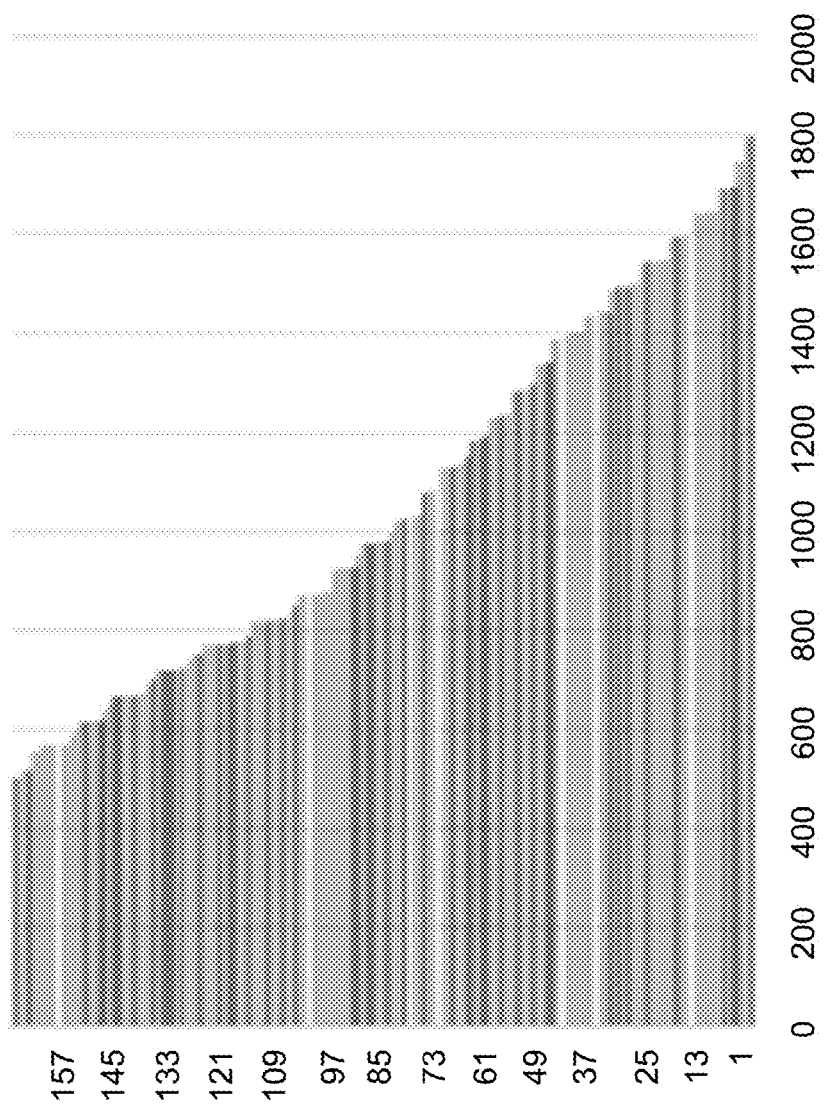
FIG. 36 is a bar graph of a Demand Duration Curve according to one implementation of the present invention.

FIG. 36, Demand Duration Curve, shows the preferred energy commodity segmentation implemented in this preferred simulation as is needed in a competitive market. Each line in the figure typifies the data for each of the markets: energy, energy imbalance/response, and outage contingency. The additional markets for a competitive market include: inertia response, governor response, voltage control or reactive power, spinning reserve, and ready reserve for the industry preferred implementation based on the present USA regulations for competitive markets.

Figure 37:
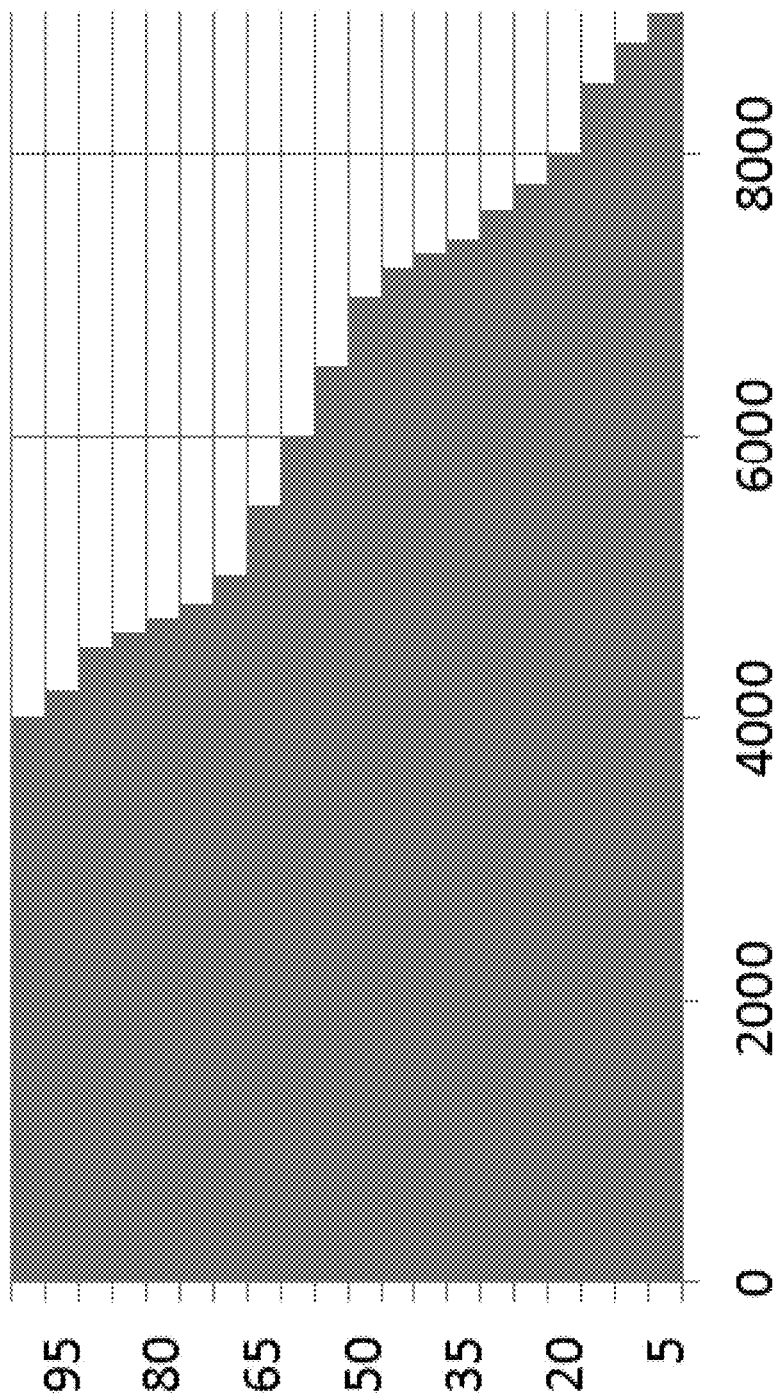
FIG. 37 is a bar graph of an Initial Demand Duration Curve according to one implementation of the present invention.

FIG. 37, the Initial Demand Duration Curve, includes demand management energy and capacity as included in the simulation analysis. The demand management resources include such contracts as interruptible service, real-time pricing, direct demand control, stand-by generation, excess generation, and supplemental energy, as well as any of the ancillary services. The digital simulation includes the physical constraints (e.g., hours per year, days per week, and hours per day) for all energy-limited resources. These resources occupy specific economic positions in the scheduling (commitment) and dispatch order. The position in commitment and dispatch affects the ability of these resources to reduce EUE and the LODP. Various demand management rates, sometimes referred to as active demand response options (active DROs), such as interruptible demand, cool storage, and direct demand control have gained interest by electric operators and customers. The interruptible demand and DROs are handled explicitly in the simulation analysis. Transactive Energy is one implementation included in this model. This figure shows the possible aggregation of demand from the data in the Demand Duration Curve.

Figure 38:
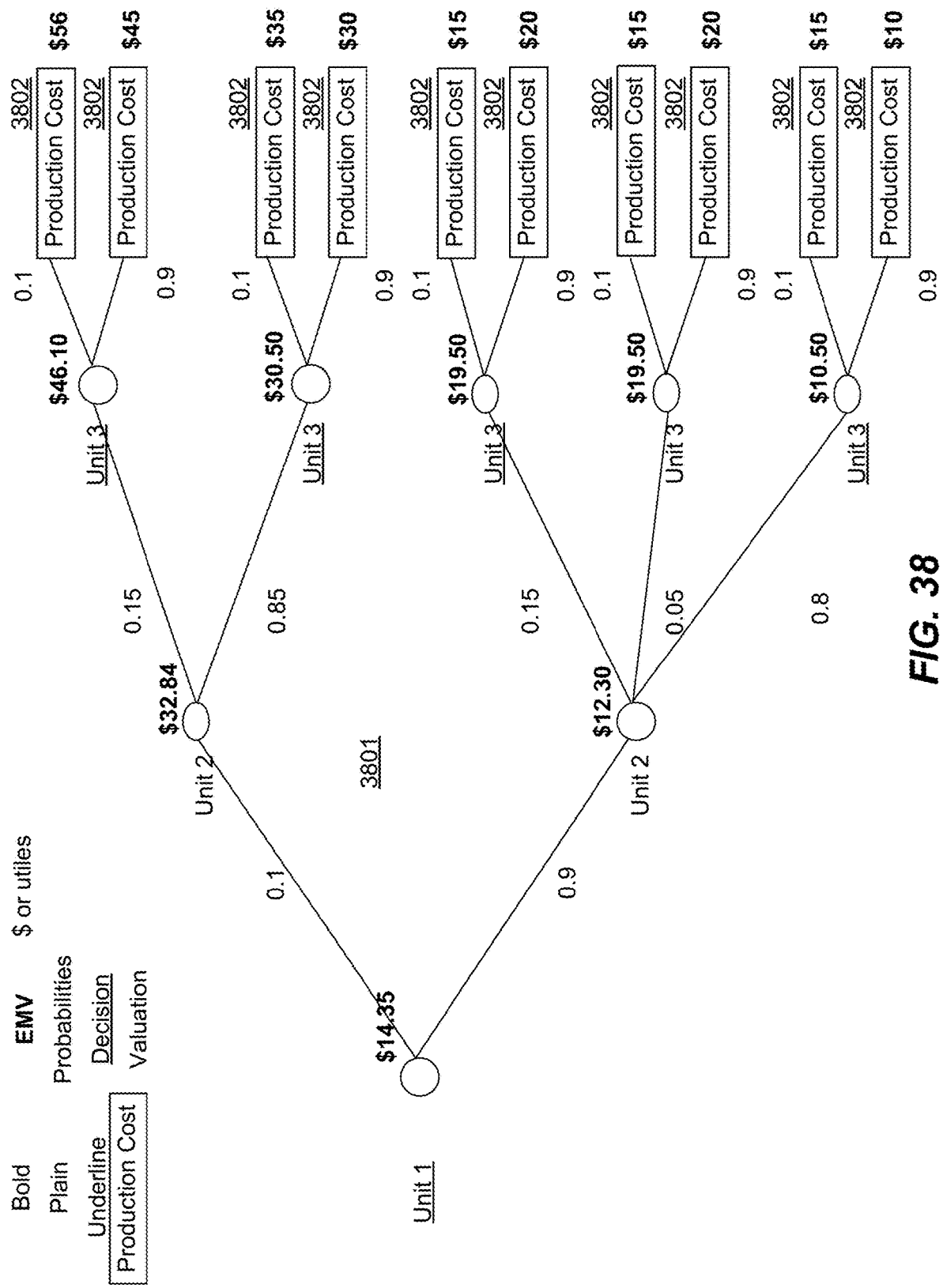
FIG. 38 is a decision tree diagram of a Probability Tree Convolution by Merit Order Commitment (graphical method) according to one implementation of the present invention.

FIG. 38, Probability Tree Convolution by Merit Order Commitment (graphical method), shows the PTC as a decision tree 3801 with production costing at the leaf nodes 3802. Merit Order Commitment is a simplification of the preferred MILP Unit Commitment Method. The results is the EMV after the tree valuation. THE MOC Method is faster as the order of unit commitment (scheduling) is fixed.

Figures 39, 40:
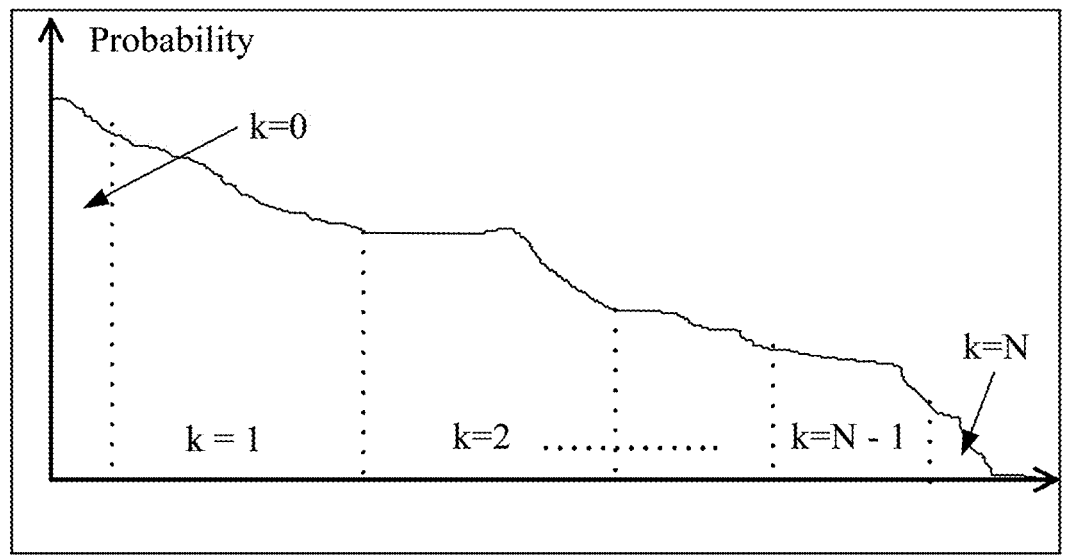
FIG. 39 is a table of a Probability Tree Convolution Path Generation according to one implementation of the present invention.
FIG. 40 is a function diagram of a Tail of EDDC calculated by Tree Convolution according to one implementation of the present invention.

FIG. 39, Probability Tree Convolution Path Generation, shows a binary representation of the probability tree. Each column shows the availability of a resource, generation for this example. A Resource could also include transmission and distribution availability, forecast error, contract availability, as well as fuel, water for hydro, or demand response.

FIG. 40, Tail of EDDC calculated by Tree Convolution, shows the results of the hourly simulation for the period as a cumulative distribution for LODP values in excess of the allowed value. Note that the limited number of probability paths taken shows coarseness in the results.

Figure 41:
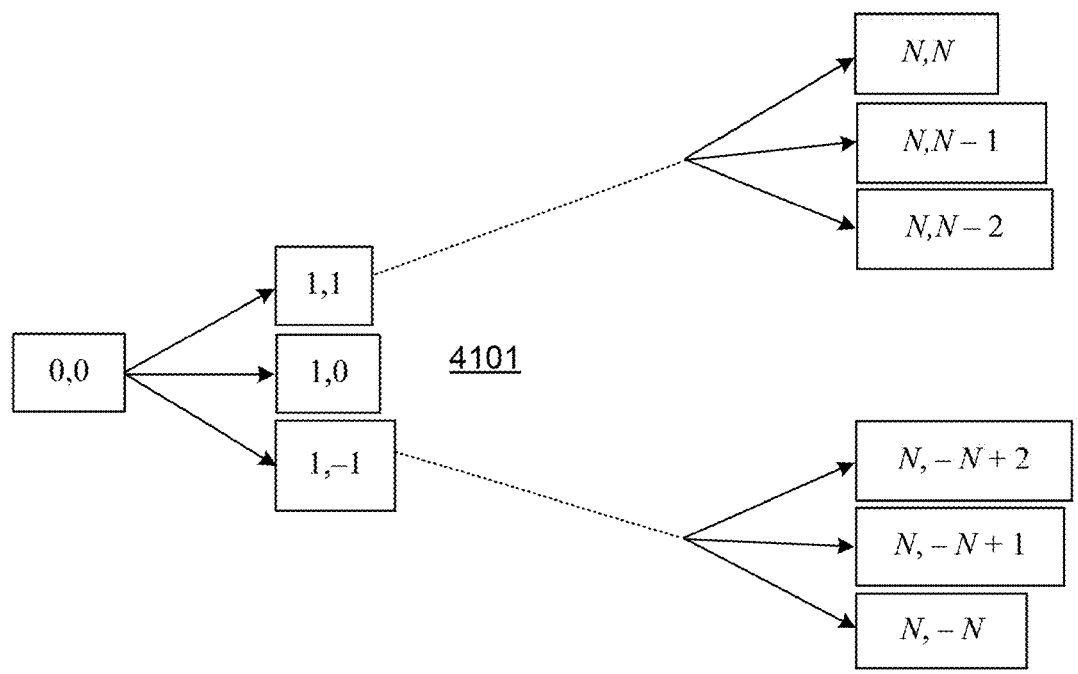
FIG. 41 is a decision tree diagram of a Tree Expanded with Unavailability paths to Minimize EDDC cost Changes according to one implementation of the present invention.

FIG. 41, Tree Expanded with Unavailability paths to Minimize EDDC cost Changes, shows the result of expanding generator availabilities to improve the financial accuracy of the EDDC. The cost of the operation is the first refinement of the Tree 4101 to a given user desired accuracy.

Figure 42:
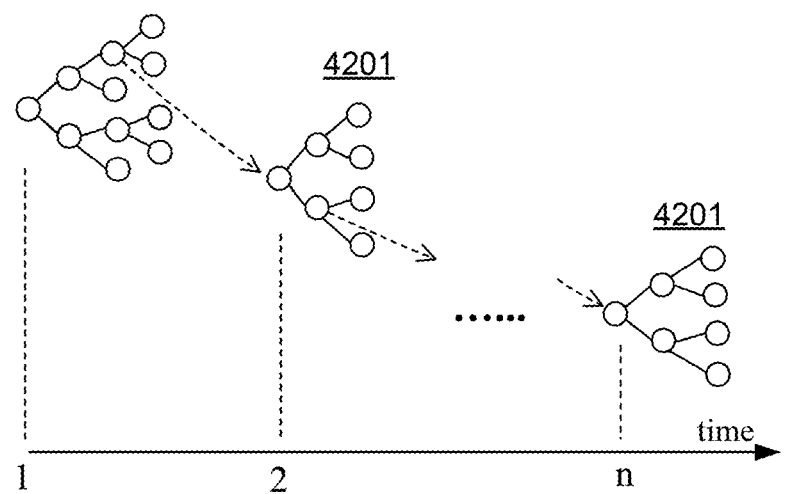
FIG. 42 is a timeline of a PT Evolution with added Unavailability Paths to Increase probability accuracy according to one implementation of the present invention.

FIG. 42, PT Evolution with added Unavailability Paths to Increase probability accuracy. This Figure shows the iterative improvements 4201 and the selection of intervals most likely to improve the accuracy for contract selection based on the optimization sensitivities. Resource selection is the first step in providing the control system with resources to maintain operation.

Figures 43, 44:
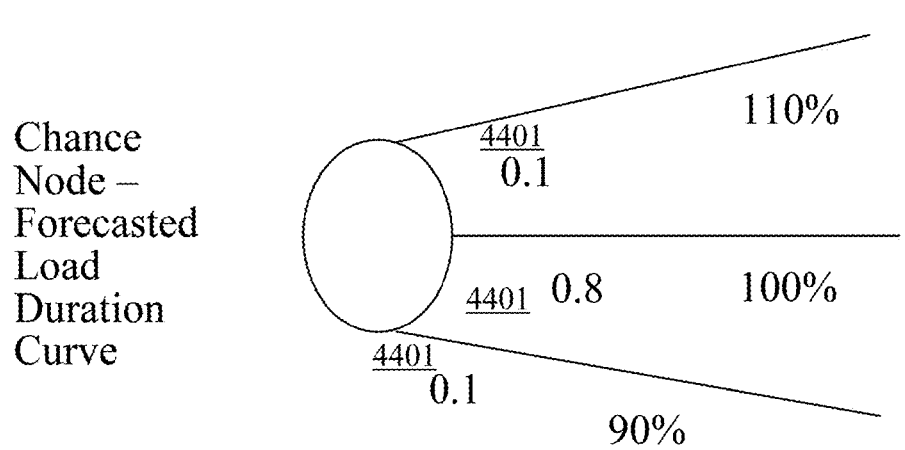
FIG. 43 is a table depicting a Tree Convolution Table Evolution with Unavailability Paths to Minimize Probability Distribution Changes according to one implementation of the present invention.
FIG. 44 is a diagram of Sensitivities to Expand Tree to Include Remaining Resource Segments by Tree Convolution according to one implementation of the present invention.

FIG. 43, Tree Convolution Table Evolution with Unavailability Paths to Minimize Probability Distribution Changes, shows how the PTC expands the tree internally or near the tail to improve accuracy for the tail segments selected. This figure shows how the PTC expands the tree internally, in the middle, or near the tail to improve accuracy. Essentially large branches area added as the tree is expanded in the middle or the root. This figure shows that the binary table is not fully expanded after the user specified tolerance is achieved.

FIG. 44, Sensitivities to Expand Tree to Include Remaining Resource Segments by Tree Convolution, shows process for selecting yet unevaluated paths through the complete tree.

FIG. 44, PTC Expansion to include Uncertainty (Demand, Network, or Fuel Forecast) by Tree Convolution, by expanding the tree to include the uncertainties for these variables. Three paths 4401 are shown as an example. The number of branches included depend upon the uncertainty distribution being sampled and the accuracy of the final EDDC specified by the user.

Figure 45:
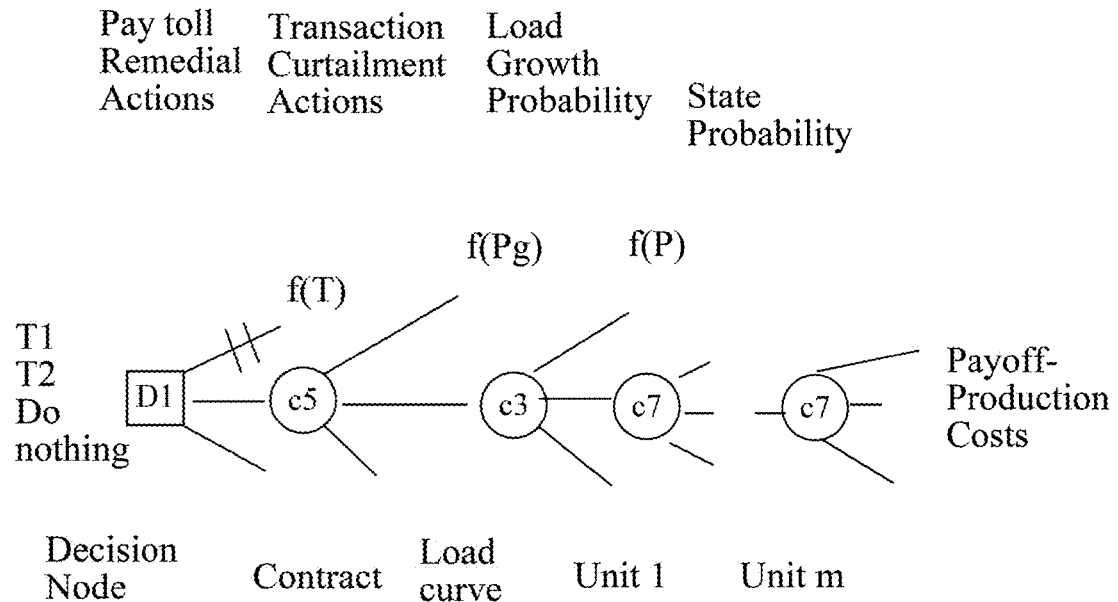
FIG. 45 is a tree diagram of a PTC Expanded to Include Transaction Selection and Remedial Actions for Reliability by Tree Convolution according to one implementation of the present invention.

FIG. 45, PTC Expanded to Include Transaction Selection and Remedial Actions for Reliability by Tree Convolution, to restore LODP and EUE to use specified values. Extends PTC to the applications of asset management or to future planning studies.

Figure 46:
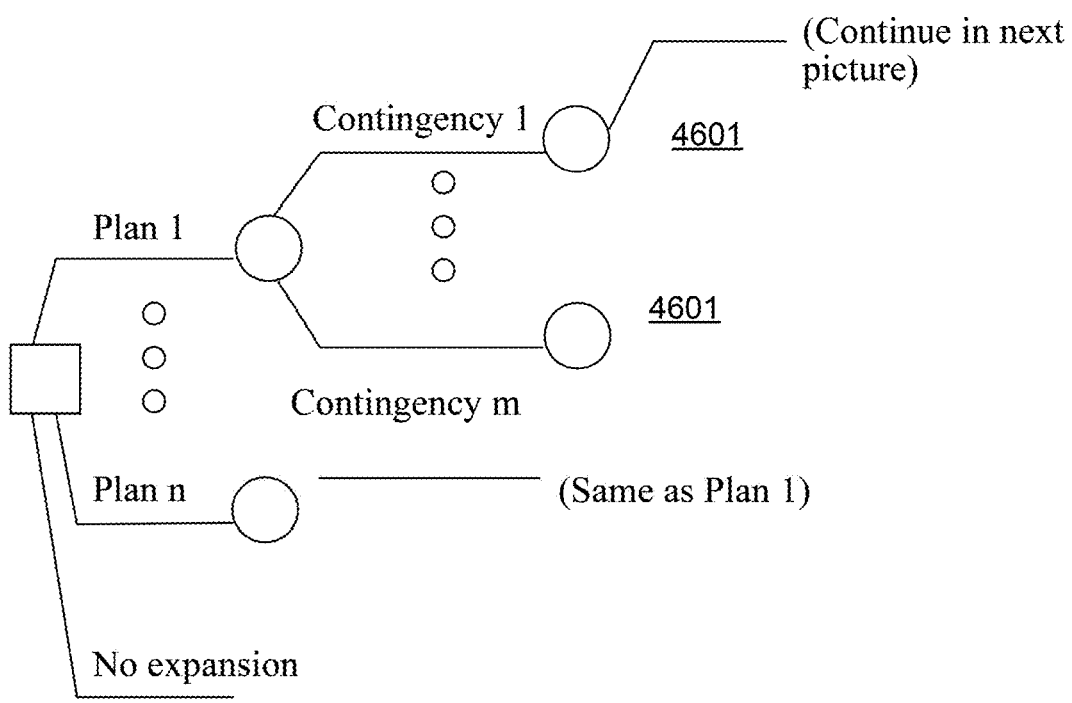
FIG. 46 is a tree diagram of a PTC Expanded for Network Contingency Analysis and Remedial Actions according to one implementation of the present invention.

FIG. 46, PTC Expanded for Network Contingency Analysis and Remedial Actions, details tree extensions 4601 to select an expansion plan and the required Resources for contingencies to restore LODP and EUE to use specified values. Extends PTC to the applications of Interchange asset management or to operational interchange planning studies.

FIG. 47, PTC Similarity with Real Option Binary Lattice, shows comparison with Real Option Binomial Distribution. PTC can thus be integrated with real option valuation for capital budgeting projects. This figure shows how the process to fill in only the tail 4701 and the tree surrounding the decision line to calculate the Value at Risk or the Profit at Risk Threshold level 4702.

FIG. 48, Input Data for each Resource, details the critical data 4801 to model each generation resource 4802. As operational data 4801 is gathered, the distribution is altered to fit the most recent observations.

FIG. 49, Input date for Each Storage Resource, details the critical data 4901 to model each storage resource 4902. As operational data 4801 is gathered, the distribution is altered to fit the most recent observations.

FIG. 50, Input Data for Each Demand Contract (Customer), details the critical data 5001 to model each demand response resource 5002. As operational data 5001 is gathered, the distribution is altered to fit the most recent observations.

FIG. 51, Network Specified Input Data, details the critical data 5101 to model each component 5102 of the transmission and the distribution network. As operational data is gathered 5101, the distribution is altered to fit the most recent observations.

FIG. 52, Sensitivities to Expand Tree, details the PTC algorithm performance variables to expand the tree for the desired accuracy desired by the user.

FIG. 53, Fuel Contract Data, details the critical data 5301 to model each fuel contract for each generation resource. As operational data 5301 is gathered, the distribution is altered to fit the most recent observations.

FIG. 54, Input Data for Demand Response Contracts, details the critical data 5401 to model each demand appliance(s) for market offering calculations. As operational data 5401 is gathered, the distribution is altered to fit the most recent observations. Transactive Energy Contracts are one implementation of these Demand Response Contracts 5402.

FIG. 55, Implementation of Contingency Contracts for Energy or Ancillary Services, details the data to model each resource with such capabilities.

FIG. 56. Hydro Network Model, details the critical data 5601 to model each hydro generation resource 5602, the river network 5603, and the reservoir models 5604 for operation and scheduling. As operational data 5601 is gathered, the distribution is altered to fit the most recent observations.

FIG. 57, Linearized Transmission Model Parameters with Flow Transmission Rights and/or Flowgate Contracts, details the critical data 5701 to model each transmission and distribution system as a linear set of parameters instead of the detailed power flow models. As operational data is gathered, the distribution is altered to fit the most recent observations.

FIG. 58, Interchange Contract Model, details the critical data 5801 to model each contract. Contract type 5802 is defined in the following.

FIG. 59, Input data to link control areas with Transportation Network, details the major connection or boundary 5901 between the physical network configuration and the zones or areas 5902 used by real-time control systems to enforce security constraints. Voltage limits are per node or per equivalent node in linearized model. Security limits are per zone or area 5902 for bulk energy and ancillary services.

FIG. 60, Input Data for Security Constraints per control area, which require ancillary services, details the range limit 6001 for each constraint pre zone or area per service.

Figure 61:
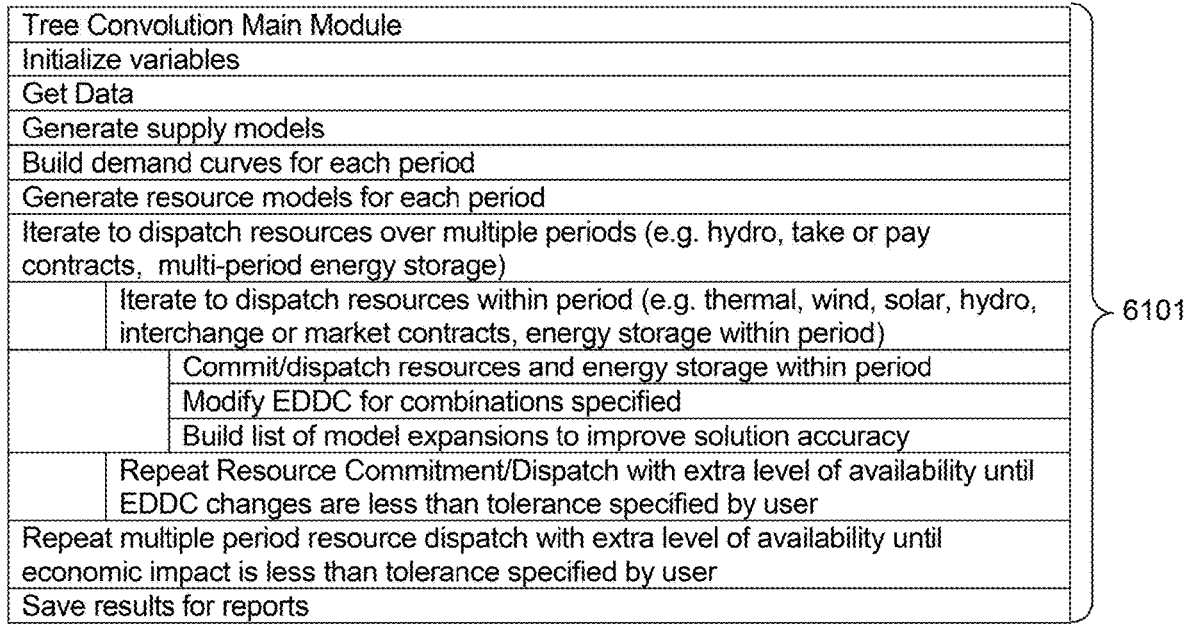
FIG. 61 is a table of a procedure for Single Area Energy Probabilistic Production Costing according to one implementation of the present invention.

FIG. 61, Procedural Diagram Single Area Energy Probabilistic Production Costing, is the pseudo code 6101 for the overall reliability algorithm.

Figure 62:
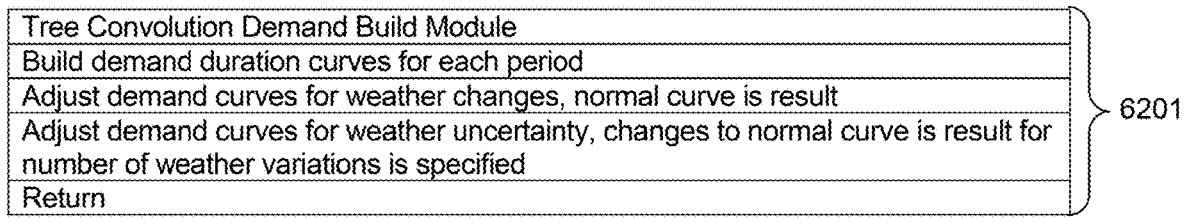
FIG. 62 is a table of a procedure for adjustment of demand models according to one implementation of the present invention.

FIG. 62, Pseudo-code for adjustment of demand models, details the pseudo code 6201 for the expansion of the demand to include forecast uncertainty, especially weather changes.

Figure 63:
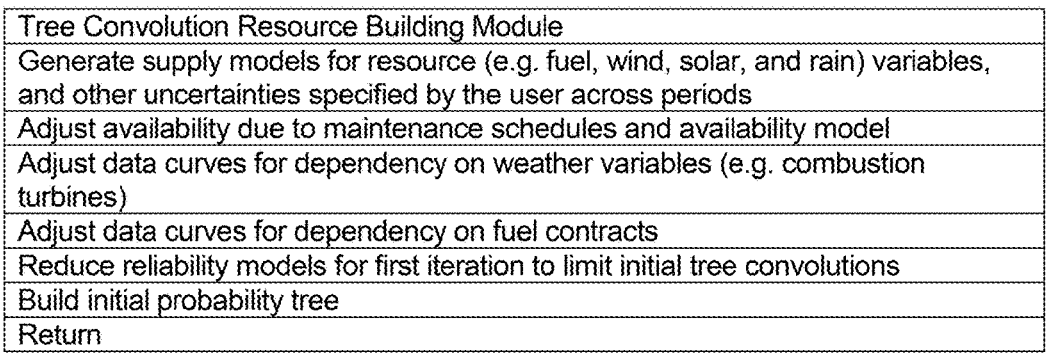
FIG. 63 is a table of a procedure for adjustment of generation models according to one implementation of the present invention.

FIG. 63, Pseudo-code for adjustment of generation models, to expand the number of availability state to more accurately find the EDDC.

FIG. 64, Resource Commitment/Dispatch to Expand Availability Model by Next Resource Impact Value, shows how to expand the PTC to include selecting of contingent contracts to maintain reliability at user specified value.

FIG. 65, Sensitivities to Expand Tree to Include Remaining Resources, details the optimization results to restart the optimization process for the next time period or for a new availability tree.

FIG. 66, One Implementation of Contingency Contracts for Energy or Ancillary Services, details the data needed to represent such resources with those capabilities.

FIG. 67, Forced Outage Rate (FOR) Adjustment Due To Duration Of Operation.

FIG. 68, Basic Output from a single study, shows the output data 6801 in this embodiment. Hourly values are typical based on historical use, smaller time intervals are used as required by regulations (5 minutes is the smallest regulatory interval in international use). This report 6802 details the solution results as found by the embodiment for each generation source, each fuel contract, environmental emissions, transmission and distribution flows, the locational marginal prices at each node or equivalent node, output for contracts, network limits, constraint LaGrangian multipliers, right of way flow limits, and other data based on input data specified or user requested. Hourly values are typical based on historical use, smaller time intervals are used as required by regulations (5 minutes is the smallest regulatory interval in international use). This details the resources passed to the real-time control systems for implementation.

FIG. 69, Solution Results For Ancillary Service Contracts, details the resources 6901 to be used for each ancillary service. Summaries of each cost or each bid/ask as evaluated and selected or rejected in this PTC embodiment.

FIG. 70, Solution Results for Contingent, Transactive, & Demand Response selected contracts, shows the output data in this embodiment given the cost or the bid/ask data.

FIG. 71, Transaction Economic Valuation to select contracts, shows the output data 7101 in this embodiment given the cost or the bid/ask data for energy and services offered.

FIG. 72, Preferred MILP UC Notation 7201, lists the variables and the parameters in the objective function and the constraints for linear constraints.

FIG. 73, Preferred MILP UC Formulation 7301, details the objective and the constraints for Mixed Integer Linear Programming. Sensitivities for the linear set of equations are found by Parametric programming. Sensitivities for the non-linear set of network equations (AC Power Flow) are bound by the gradient method. Energy limitations between periods reduce the solution space as an alternative to logical constraints.

FIG. 74, Preferred MILP extension to find sensitivities by LaGrangian Relaxation for nonlinear network formulation to determine tree expansion for next combination of resource availabilities.

FIG. 75, Notation for EESC Model as Transportation Network Solution, shows an alternative model 7501 for the transmission and distribution grid possibly using power transfer distribution factors (PTDF) of generation transfer distribution factors (GTDF) for hourly simulation.

FIG. 76, LaGrangian Relaxation Formulation, depicts the equations 7601 for the objective function and for the constraints for the nonlinear solution including the AC power flow functions.

FIG. 77, LaGrangian Relaxation Notation, lists the variables for the objective function and for the constraints for a nonlinear solution including the AC power flow functions.

Definitions

A more thorough description of the following terms are found in several textbooks, such as Power Generation, Operation, and Control by Al Wood, Bruce Wollenberg, and Gerald Sheble [1, page 536].

Assist action: Often the incremental heat rate curves for generating units will give trouble to an AGC when an excessive ACE occurs. If one unit's participation factor is dominant, it will take most of the control action and the other units will remain relatively fixed. Although it is the proper thing to do as far as economics are concerned, the one unit that is taking all the action will not be able to change its output fast enough when a large ACE calls for a large change in generation. The assist logic then comes into action by moving more of the units to correct ACE. When the ACE is corrected, the AGC then restores the units back to economic output.

Filtering of ACE: As indicated earlier, much of the change in ACE may be random noise that need not be "chased" by the generating units. Most AGC programs use elaborate, adaptive nonlinear filtering schemes to try to filter out random noise from true ACE deviations that need control action.

Telemetry failure logic: Logic must be provided to insure that the AGC will not take wrong action when a telemetered value it is using fails. The usual design is to suspend all AGC action when this condition happens.

Unit control detection: Sometimes a generating unit will not respond to control actions. For the sake of overall control, the AGC ought to take this into account.

Such logic will detect a unit that is not following control actions and suspend control to it, thereby causing the AGC to reallocate control action among the other units on control.

Ramp control: Special logic allows the AGC to ramp a unit from one output to another at a specified rate of change in output. This is most useful in bringing units on line and up to full output.

Flowgates (see Section 7.5) are a predetermined set of constraints on the transmission system that are expected to experience loading to the limit most of the time. In the flow-based process, these constraints are used to measure the commitments on the transmission system. Flowgates are classified as two types: Power Transfer Distribution Factor ("PTDF") and Outage Transfer Distribution Factor ("OTDF"). A PTDF Flowgate is a Flowgate that monitors the flow on single or multiple transmission elements without a contingency. An OTDF Flowgate is a Flowgate that monitors flow on single or multiple transmission elements for the loss of other transmission elements. A transmission element is a transformer, a transmission line segment, or a generator.

The Available Flowgate Capability (AFC) on a Flowgate refers to the amount of MW transfer capacity on a Flowgate that remains available for additional transmission service above and beyond the already committed and approved uses of the transmission system. Existing uses of the transmission system include the generation to load impacts on the Flowgates and transmission service that has already been sold.

AFC values are time and service type dependent. An ISO* calculates Firm and NonFirmAFC values for up to 3 years into the future from the next hour.

The distribution factor quantifies the incremental impact of a power transfer on Flowgate for a particular transmission path and is expressed as a percentage An AFC zone is the smallest granular area that is modeled in AFC calculations All included transmission service reservations are mapped to these AFC zones for modeling impacts and evaluation. In general, the AFC zones are the balancing authority areas ("BAAs") modeled in the Interconnection Reliability Assessment.

Group ("IRAG") Multiregional Modeling Working Group ("MMWG") models.

An AFC path is defined by a unique source and sink that are modeled as AFC zones. Since the ISO OASIS' uses a list of sources and sinks that may be different than the granularity in the AFC calculation, an electrical equivalent table is used to map the source-and-sink combinations to AFC zones. The electrical equivalent table can also be used to map the source and sink to a study zone that is a combination of multiple AFC Zones to evaluate TSRs more accurately.

The Capacity Benefit Margin (CBM) is the amount of firm transmission transfer capability preserved by the ISO for Load Serving Entities ("LSEs") within a BAA to enable access by the LSEs to get generation from the interconnected systems to meet generation reliability requirements. The CBM is applied as a Total Flowgate Capability ("TFC") reduction to the limiting element(s) of the associated Flowgate.

The Transmission Reliability Margin (TRM) is the amount of transmission transfer capability necessary to provide reasonable assurance that the interconnected transmission network will be secure. TRM accounts for the inherent uncertainty in system conditions and the need for operating flexibility to ensure reliable system derations as system conditions change.

The Total Flowgate Capability (TFC) is the maximum amount of power that can flow across the Flowgate without overloading (either on an actual or contingency basis) any element of the Flowgate. An MW proxy can substitute to ensure sufficient margin against adverse voltage or stability conditions. Flowgate TFCs represent the Interconnection Reliability Operating Limit ("IROL") or System Operating Limit ("SOL") of the defined Flowgates per NERC Reliability Standard MOD-030, R2.4.

The Share of Total Flowgate Capability ("STFC") is the share of the TFC that a particular entity is allocated and that is determined using the various rules laid out in the CMP under the various seams agreements. It is used to limit the firm transmission service in future time periods.

The Available Share of Total Flowgate Capability ("ASTFC") is the available share of the TFC for an entity that is available on a Flowgate for use as Firm transmission service. It is calculated as the share of the TFC minus the existing firm commitments that the entity has on the Flowgate.

Local Balancing Authority ("LBA") is an operational entity or a Joint Registration Organization which is (i) responsible for compliance to NERC for the subset of NERC Balancing Authority Reliability Standards defined in the Balancing Authority Agreement for their local area within the ISO Balancing Authority Area, (ii) a Party to Balancing Authority Agreement, excluding ISO, and (iii) other requirements as specified by FERC, NERC, and state public utility commissions.

ATC is defined in this work as ATC=TTC−CBM−TRM−ETC. This work will not cover all of these terms except to state that CBM, TRM, and ETC are margins required for stability, reliability, and previous commitments. We will only address the calculation of "TTC" in this work. Broadly define ATC as "The maximum amount of additional MW transfer possible between two parts of a power system." Note that additional recognizes that existing transfers are considered part of the "base case." Typically these two points of delivery are in different control areas. The points of delivery can really be any group of power injections. What defines the Maximum injections? The rules include the following:

No overloads should occur in the system as the transfer is implemented.

No overloads should occur in the system during contingencies as the transfer is implemented.

Assume we want to calculate the ATC by incrementing the transfer, resolving the power flow, and iterating in this manner.

The following definitions of terms used in this description are provided for ease of reference by the reader:

Availability Factor (AF)—[available hours/period hours]×100(%)

Available—this is the state in which a unit is capable of providing service, whether or not it is actually in service, for the capacity level that can be provided.

Available Hours—(a) sum of all service hours, reserve shutdown hours, pumping hours, and synchronous condensing hours, or; (b) period hours (PH) less planned outage hours, forced outage hours, and maintenance outage hours.

Demand Forecast Error (DFE)—Demand Forecast Error is based on the error in estimating the non-weather related growth in the demand from year to year. It is primarily economic growth that is estimated in this component. This distribution can be estimated using historical projections of demand compared to actual weather-normalized peak demands.

Demand-side Response Contract Management (DRCMs)—Demand-side response contracts are options offered by customers to reduce costs or to reduce demand in order to avoid unserved energy. When demand is going to be greater than capacity, the options are to increase capacity or reduce demand. By calling a non-firm customer to reduce demand or automatically switching off a large block of residential cooling units on demand-side programs, the user can control demand.

Economy Purchases—In many hours, there is excess capacity in the market that is below the cost of the incremental unit. This is estimated by using the economy purchase input data to simulate the availability of economy purchases. One type of Interchange Contract.

Energy Brokerage System was an embodiment of an energy market before deregulation legislation. The Florida Public Service Commission required the utilities within the state of Florida to establish and energy market for the next incremental bid and ask for energy during the next hour of service. Each utility had to enter the cost of purchases for 5 and 10 MW and of sales for 5 and 10 MW. The bids and asks were submitted 15 minutes before the hour manually based on "Economy A" analysis. The selected bids and asks were matched until the benefit of interchange was exhausted. The selected bids were then entered for the next hour as firm interchange.

Energy Imbalance Market provides suppliers and buyers with financial opportunity to change positions based on errors in Equivalent Forced Derated Hours is the product of the forced derated hours and the size of reduction, divided by the net maximum capacity.

Equivalent Forced Outage Rate (EFOR) is defined as the [(forced outage hours+equivalent forced derated hours)/(forced outage hours+service hours+equivalent forced derated hours)]×100(%)

Expected unserved energy (EUE) is the amount of firm demand that is estimated to be shed in a given hour.

Forced Derated Hours is the sum of all hours experienced during forced deratings.

Forced Derating is an unplanned component failure (immediate, delayed, or postponed) or other condition that requires the demand on the unit be reduced immediately or before the next weekend.

Forced Outage is an unplanned component failure (immediate, delayed, postponed, startup failure) or other condition that requires the unit be removed from service immediately or before the next weekend.

Forced Outage Factor (FOF) is [forced outage hours/period hours]×100(%)

Forced Outage Hours is the sum of all hours experienced during forced outages.

Forced Outage Rate (FOR) is the [forced outage hours/(forced outage hours+service hours)]×100(%)

Generation Reliability is the ability of the resource to be able to meet firm demand obligations irrespective of internal transmission constraints.

Interchange Contracts are energy or power exchanged between vertically regulated utilities are typified as Economy A (EDC based), Economy B (UC based), Unit Sales (generator), Diversity, Banking (storage), Inadvertent (in error), Take or Pay, Dynamic Based Jointly Owned Unit Sale, Dynamic Based Remote Demand Sale, Wheeling between utilities, Reliability or Contingent Contract (e.g., spinning reserve, ready reserve, emergency, capacity). Interchange in a competitive market is based on bid and ask tenders to a market mechanism. The markets implemented may be complete or incomplete. Complete markets match bids and asks for each type of product or service to enable the continuing operation of the supply chain (power system). Demand Side Management or Demand Response enables the buyers to sell the scheduled resources back to the market instead of taking delivery. Transactive Energy contracts are one embodiment of the buyer offering reduced demand product or services. Transactive Energy is an alternative business embodiment for buyers, for distributed generation sources (wind, solar, and CHP), and for distributed storage devices to tender bids and asks for each product or service market. The presence of the regulatory obligation to serve entitles buyers to sell products and services already paid. Interchange was also designated as firm (must implement) and non-firm (implementation could be delayed or canceled).

Jointly owned transmission equipment is contracted by a number of participants who contract sale of the equipment with defined costs and benefits for each. High Voltage Direct Current transmission is often constructed and operated in this fashion.

Loss of demand hours (LODH) is the duration in hours over which there is unserved energy.

Loss of demand probability (LODP) is the probability of a EUE event occurring in a given period. Loss of load probability includes not only the demand but also the transportation losses.

Maintenance Derated Capability is the ability of the resource to be able to meet firm demand obligations during maintenance deratings and scheduled derating extensions of any maintenance deratings.

Maintenance Derating is the removal of a component for scheduled repairs that can be deferred beyond the end of the next period, but requires a reduction of capacity before the next planned outage.

Maintenance Outage is the removal of a unit from service to perform work on specific components that can be deferred beyond the end of the next period, but requires that the unit be removed from service before the next planned outage. Typically, a maintenance outage may occur anytime during the year, have flexible start dates, and may or may not have a predetermined duration.

Maintenance Outage Hours—Sum of all hours experienced during maintenance outages and scheduled outage extensions of any maintenance outages.

Net Capacity Factor (NCF)—[net actual generation/(period hours×net maximum capacity)]×100(%)

Normal Weather—Normal weather is the weather that would be expected to result in the study period and reflects a 50% probability that the weather would be more severe and a 50% probability that the weather would be less severe.

Obligation to serve (OTS) is the legal requirement for a utility to provide products and services to any customer in a franchise area.

Peak Demand—Peak demand is the highest firm demand for the year. When forecasting the peak demand, it is done using the weather-normalized peak demand.

Period Hours—Number of hours a resource was in the active state.

Planned Derated Hours—Sum of all hours experienced during planned deratings and scheduled derating extensions of any planned deratings.

Planned Derating—The removal of a component for repairs that is scheduled in advance and has a predetermined duration.

Planned Outage—The removal of a unit from service to perform work on specific components that is scheduled in advance and has a predetermined duration (e.g., annual overhaul, inspections, testing).

Planned Outage Hours—Sum of all hours experienced during planned outages and scheduled outage extensions of any planned outages.

Planning Reserve Margin—This is calculated as (expected peak capacity/expected peak demand)−1.

Power Pool is the aggregation of two or more companies to operate as if a single company. Power pool is combined by members who have contracted to joint operation by a defined sharing mechanism for costs and for benefits.

Quick Start Reserves—These are generally diesel, hydro, or combustion turbine units that can be ramped up within 15 minutes.

Ready Reserve—A contingent contract to provide power or energy capacity when an unscheduled event occurs resulting in under providing product or services in a period beyond spinning reserves.

Reserve Margin—A measure of available capacity over and above the capacity needed to meet normal peak demand levels. For an energy producer, it refers to the capacity of a resource to generate more energy than the system normally requires. For a transmission company, it refers to the capacity of the transmission infrastructure to handle additional energy transport if demand levels rise beyond expected operating levels. Regulatory bodies usually require producers and transmission facilities to maintain a constant reserve margin of 10-20% of normal capacity as a risk mitigation margin against breakdowns in part of the system or sudden increases in energy demand as spinning reserve. If the energy market is for a sufficiently long period, ready reserves may be contracted to provide product or services beyond the time frame of spinning reserves.

Reserve Shutdown—A state in which a unit is available but not in service for economic reasons.

Reserve Shutdown Hours—Sum of all hours experienced during reserve shutdowns (RS). Reserve shutdown hours may be computed by subtracting the reported service hours, pumping hours, synchronous condensing hours, and all the outage hours from the period hours.

Scheduled Derated Hours—Sum of all hours experienced during planned deratings, maintenance deratings and scheduled derating extensions of any maintenance deratings and planned deratings.

Scheduled Deratings—Scheduled deratings are a combination of maintenance and planned deratings.

Scheduled Outage Factor (SOF) is the [scheduled outage hours/period hours]×100(%) (?)

Scheduled Outage Hours—Sum of all hours experienced during planned outages, maintenance outages, and scheduled outage extensions of any maintenance outages and planned outages.

Scheduled Outages—Scheduled outages are a combination of maintenance and planned outages.

Service Factor (SF)—Service hours/period hours×100(%)

Service Hours—Total number of hours a unit was electrically connected to the system.

Spinning Reserves—A portion of the North American Electric Reliability Council (NERC) required operating reserves must be spinning, meaning that the unit is online but has excess unused capacity that can be accessed quickly.

Unavailable—State in which a unit is not capable of operation because of the failure of a component, external restriction, testing, work being performed, or some adverse condition.

Unavailable Hours—Sum of all forced outage hours, maintenance outage hours, and planned outage hours.

Unplanned Derated Hours—Sum of all hours experienced during forced deratings, maintenance deratings, and scheduled derating extensions of any maintenance deratings.

Unplanned Outage Hours—Sum of all hours experienced during forced outages, maintenance outages, and scheduled outage extensions of any maintenance outages.

Overview

A probabilistic digital simulation quantifies the risk of expected unserved energy (EUE) and the corresponding loss of demand probability (LODP). Unique structure and processing of input and output data enables the digital simulation to consider not only a large number of components that contribute to unreliability, but to process a large number of scenarios quickly. With a large population size, decisions can be made on relative risks between periods, within periods, weather impacts, resource outage impacts and demand forecast errors. The expense of market or interchange purchases, the amount of demand response, the amount of fuel, the scheduling of renewable resources (wind, solar, hydro) and the production of biofuels required to avoid shedding firm-demand customers across a wide range of possible scenarios is determined.

Resources (e.g., wind, solar, coal units, oil units, natural gas units, combustion turbines, combined cycle units) typically operate for a period of time, fail and are repaired, and then return to operation. Probabilistic production costing draws on each resources historical operating performance are used in the invention to determine expected forced outages at a multiple of levels. Fossil fired steam units are typically more reliable during high demand seasons (summer for summer peaking utilities and winter for winter peaking utilities) because of the emphasis on keeping the units running due to the higher levels of demand. Since the forced outage data includes only a series of observations, statistical models are used to forecast more realistic values to better reflect actual patterns of reliability. Typical actual data for a generating unit could have 8-12 entries in the time to failure (TTF) input data record ranging from a few hours to several thousand hours. The corresponding entries in the time to repair (TTR) input data record could range from a few hours to many. In one embodiment, the simulation will randomly select time to failure from the first data record and then select a random time to repair duration. Individual unit operation thus reflects historical data over a selected time period for which data is available. Since supply resources are independent random events, multiple resources can be down (i.e., failed) concurrently.

Generating units also periodically experience equipment failures that require the units to operate at reduced output. These partial outages are generally much less significant than full forced outages, but must still be considered when determining system reliability. Supply resources have been found to have slightly lower reliability in the summer months in terms of partial outages when the weather is harsher to heat dissipation. Partial outages occur more frequently and are repaired more quickly in the high demand periods. The higher level of partial outages is representative of periods when unserved energy will occur.

The process is shown in FIG. 61 as Pseudo Code.

The first step is to enter the input data (input group):
Resources for supply
Demand forecast
Demand response models
Network description (transmission and distribution for electric grids)
Scenario Builder (for forced outages)
The input data is then validated.

The probability tree is then generated for the initial screening.

The supply chain is then simulated (optimized) using one of the methods appropriate for the supply chain model.

The probability distribution is then generated from the probability tree values and the cost values from the chain simulation.

The distribution is then evaluated for adequacy (convergence) as required by the user.

If more accuracy is required, the probability tree is expanded and the simulations are repeated for the new paths.

The probability distribution is then expanded with the additional data from the tree and the valuation.

Again, the distribution is then evaluated for adequacy (convergence) as required by the user.

If more accuracy is required, the probability tree is expanded and the simulations are repeated for the new paths. This process is repeated until the user defined accuracy is achieved.

The reports are then generated as specified by the user.

Process Descriptions

Supply Chain Composite Models

Thermal Generation Models

FIGS. 27 through 30 depict the preferred models for generation resources for fossil fuel units, including biofuels, geothermal and hydro. The cost data is linearized for computational speed but may be modeled by an alternative curve such as quadratic, cubic, or reduced cubic functions in other embodiments. The Capability data shows the availability of each segment. This is reduced to a two state model for initial generation of the EDDC model. The two state model is expanded as needed to iteratively refine the EDDC as indicated by the optimization process sensitivity factors to satisfy the tolerance specified by the user.

FIG. 31 shows the wind generation resource model to include uncertainty in the wind forecast. A three state model is preferred by the presented embodiment. A higher degree model may be used as warranted by the historical data. This implementation prefers the three state model based on presently available data.

FIG. 33 shows the solar cell resource model based on historical sunlight at a given location. The preferred method as used in this application five levels for the end model. The Tree Convolution uses two reduced states initially and adds the remaining states as required to meet the user specified tolerance for EDDC energy accuracy.

Three data inputs are used to model partial outages for each system resource. These inputs are mean time to failure (MTTF), mean time to repair (MTTR) and percent derating (PD). The invention simulates partial outages based on resource service hours, MTTF and MTTR. Partial outages are represented as similarly in the model, as a distribution, because of their significant effect within the analyses.

Hydro

The determination of the reliability impact of conventional hydroelectric "hydro" generation is one of the major reasons for developing a probabilistic system simulation. The operation and flexibility of conventional hydro generation is very complex to model when part of a river network. A hydro generation can be divided into two types: (1) run-of-river (ROR) and (2) scheduled hydro generation. Multiple hydro generation scenarios matched with multiple weather scenarios are reflected in the simulation model. For each scenario, ROR and scheduled hydro generation are modeled based on actual historical results, as a function of weather events. ROR hydro operates in every hour as water moves into the non-schedulable reservoir, varies in each year and with each month due to weather conditions.

The major constraint in dispatching hydro generation involves the assumptions concerning how the river network delays flows from one facility to another. The simulation model calculates the ROR hydro energy available in each day due to natural in-flow. The simulation model also determines how to store the natural in-flow not needed in that period. The daily hydro upper limit is the sum of today's natural in-flow and any energy not used previously. For a series of flow capacity-constrained days, only the normal in-flow energy will be available each day. This modeling approach results in more accurate EUE and LODP projections than the traditional production cost approach of simply adjusting demands for hydro operation.

Pumped Hydro Storage

The pumped hydro storage units are dispatched in economic order, i.e., units with larger ponds are dispatched first. Pumping will occur any time energy is available at an economic price. The pumped hydro schedules follow the market paradigm of buy low and sell high. The goal of calculating EUE requires that risk measures be used to determine the economic targets associated with pumped storage hydro operation. Alternatively, it could be viewed that it is always economical to build up the reservoirs of storage units with any generating resources available if that is what is required to avoid unserved energy. An energy storage algorithm based on expected production costs for trough periods are saved for possible dispatch for high demand periods Demand Models Demand data is input into the simulation model as an hourly time function or as an equivalent demand duration curve for the entire system being analyzed. Temperatures should be input with the hourly demands; for systems that span a wider geographical area, the temperatures for different geographical areas should be weighted by the demand in different geographical areas to develop a composite temperature relationship for heating and air conditioning appliances. The equivalent demand duration curve is produced for either demand model.

FIG. 35 shows the preferred hourly model for one week. FIG. 14 shows the demand duration curve that was used by the inaccurate convolution method of delta functions and the demand duration curve.

FIG. 4 shows the preferred energy commodity segmentation implemented in this preferred simulation as is needed in a competitive market. Each line in the figure typifies the data for each of the markets: energy, energy imbalance/response, and outage contingency. The additional markets for a competitive market include: inertia response, governor response, voltage control or reactive power, spinning reserve, and ready reserve for the preferred implementation.

Demand management energy and capacity is also included in the simulation analysis. The demand management resources include such contracts as interruptible service, real-time pricing, direct demand control, stand-by generation, excess generation, and supplemental energy, as well as any of the ancillary services. The digital simulation includes the physical constraints (e.g., hours per year, days per week, and hours per day) for all energy-limited resources. These resources occupy specific economic positions in the commitment and dispatch order. The position in commitment and dispatch affects the ability of these resources to reduce EUE and the LODP.

Various demand management rates, sometimes referred to as active demand response options (active DROs), such as interruptible demand, cool storage, and direct demand control have gained interest by electric operators and customers. The interruptible demand and DROs are handled explicitly in the simulation analysis.

Interchange

If inexpensive energy is available from neighboring systems, then contracts are committed to buy energy. Such interchange can be by standing contract as approved by public utility commissions or market based contracts bought and sold on the interchange markets.

Weather

The unpredictability of weather also impacts system generation reliability. Historical weather patterns for a large number of consecutive years and their associated probabilities of occurrence are utilized in the simulation model. In general, if weather remains normal over time, concerns for system generation reliability are reduced. However, if an area experiences many days of abnormal temperatures, system demand would increase significantly. The demand forecast error can be increased for these scenarios.

The capacity of some fossil and combustion turbine resources change based on the ambient air temperature. With each demand forecast an expected temperature is saved for each hour. In the unit data, a model is specified for temperature degradation. During the simulation, the model is updated to calculate the efficiency for each unit.

Commitment and Dispatch

System operators have restricted flexibility regarding the commitment and dispatch order in which generating resources are called to operate. Resources are committed beginning with the least expensive operating costs. When resources are insufficient or are not the most economical way to meet the demand, the system operators call on an economic order of the following options: interchange contracts (e.g., economy purchases), scheduled hydro, energy storage (e.g., pumped storage hydro), emergency diesel or combustion turbines, demand response management, and other market resources. The combination and the order of the options called varies with system conditions and projections of each period, based on risk management targets. During most periods, the dispatch order is follows an economic valuation: (1) scheduled hydro; (2) renewable resources, (3) fossil fueled units; (4) pumped storage; (5) interchange economy; (5) natural gas or biofuel combustion turbines; (6) demand management; and (7) emergency resources. Resources are committed and dispatched in economic sequence.

Since the simulation switches committed and dispatch orders dynamically over time, this feature is called the "economic dispatching option." Thresholds and dispatch order may vary from system to system and can be accounted for in the model especially to force the commitment of must run resources.

EUE Result

The cost of EUE is one of the most important risk metrics. Whenever EUE is incurred, an estimated societal cost is applied to that energy. This cost is based on regulatory rules based on surveys and estimates of the impact that unserved energy has on customers. The invention models the cost of EUE based on the duration of firm demand shedding events.

Supply Resources

FIG. 48 lists the preferred data for the application implementation for each supply resource. This would include traditional fossil fuels, geothermal, hydro, pumped hydro, solar, wind, etc. Note that the fuel inventory includes water in reservoirs for hydro and for pumped hydro facilities.

FIG. 49 lists the preferred data for the application implementation for energy storage devices. Compressed air, liquid compressed air, liquid natural gas and other storage mediums are included as well as batteries operated separately or as a vehicle.

FIG. 50 lists the preferred data for the application implementation to represent firm demand contracts. Appliance demand, thermal storage, shedding and other customer agreed actions are included in these contract models.

FIG. 51 lists the preferred data for the application implementation when the transmission and/or distribution gird is modeled as a power flow conservation of energy solution. The modeling of the power flow equations would produce the more accurate solution for the valuation. This application uses the transportation network as the preferred implementation for explanation simplicity as such is sufficient for many systems, especially for system planning.

FIG. 53 shows the fuel contract data as is needed to simulate and to optimize the analysis and scheduling of fuel contracts (e.g., take or pay).

FIG. 54 lists the preferred data for the application implementation to commit/dispatch demand response contracts for customers to provide supply resources by curtailing demand. The availability model preferred data for the application implementation is to the same detail as the fossil fuel fired resource (generation). One price per market contract is the preferred data for the application implementation. Other price models such as piece-wise linear, quadratic, cubic, or reduced cubic may be implemented. As with resource cost data, the function selected should encompass the conversion process as measured in real time with consideration of the accuracy of the measuring equipment.

FIG. 56 lists preferred data for the application implementation to represent hydro systems with scheduled reservoir storage. The hydro system is solved by multiple period simulation as needed to include the storage capabilities of the reservoirs.

FIG. 57 lists preferred data for the application implementation to represent a linearized model of the transmission network as used by PJM ISO. This model can be included in the transportation model as exemplified in this application.

FIG. 53 lists preferred data for the application implementation to represent fixed interchange contracts.

These models and traditionally used algorithms are detailed in several texts, such as "Power Generation, Operation, and Control" by Wood, Wollenberg, and Sheblé 92014).

Probability Tree Convolution Software Implementation

FIG. 58 lists preferred application implementation as a computer program on a single computer. The process is to get the input data, build the demand forecast as uncertainty scenario specified by the user, adjust the resource models for the initial Tree Convolution estimate of the EDDC, adjust the demand models, and perform the valuations for the availability of resources on a single path of the probability tree. A single path of the probability tree is defined by the status of each resource. As an example unit 1, unit 2 available, unit 3 available is the cheapest operating simulation as the least expensive resources are used this is shown in the tree graph of FIG. 38. There are ten (10) paths shown in this probability tree. FIG. 39 lists preferred data for the application implementation to generate the initial EDDC. The initial EDDC is shown in FIG. 37. This solution is valid if every resource is modeled as a two state model (available or unavailable). The user selects how many combinations are included by listing the maximum number of outages for the initial EDDC as shown in FIG. 52. This is considered a pruned probability tree as availability states have been merged or not included due to insignificant economic impact on the EDDC.

The valuations are performed for these combinations and the sensitivities of the next segment impact is found. The sensitivities are order by decreasing impact to the EDDC. The combinations of each valuation is then performed in the ordered sequence as shown in FIG. 36. The tail end of the EDDC is shown in FIG. 33 as combinations are added. The pruned tree is grown to include those paths of economic impact. FIGS. 41 and 42 show that the resource models are expanded from the initial two state model to three state models with the most impact on the EDDC estimate. The number of segments for each supply unit are increased up to the availability model specified by the input data for that resource. FIG. 43 shows the pruned tree augmented with the paths previously omitted to grow the tree based on economic impact.

FIG. 47 shows the concept of the probability tree as analogous to the real option valuation using binomial models. Since the LODP and the EUE are the primary results sought, only the right tail has to be completely solved. The EDDC is a cumulative probability distribution whereas the real option tree is a probability density. The preferred probability models are discrete for the application implementation as are exemplified by probability mass functions and the cumulative probability distribution function shown in FIG. 31.

FIG. 36 shows the graphical growth of the EDDC for the application implementation. The curve will expand and contract dependent on whether supply or demand resources are selected by the optimization algorithm to value the resources.

Demand Forecast (DF)

FIG. 50 illustrates demand model building data entered through a user interface for creating a scenario. Resource data also controls the scenarios that are run for each study period. The number of periods and the time representation of a period is defined by the user. The exemplary implementation uses weeks for each period. There are primary inputs on the scenario builder step that are used to build the studies: demand data, resource data, solution tolerance(s), number of paths included pre study, interchange contract data, and demand response contract data. Demand data is a representation of the deterministic demand the weather dependent demand, and the weather data for the periods to be studied. The demand data is stored in data files that are input in the demand section, but during the demand forecast and the scenario builder process, the user selects a specific demand file to use as well as weather dependencies. The user has flexibility to specify different system data for each period. The user can then specify which year to use by selecting an individual or combination of data. The selection process requires first selecting the demand forecast, the weather forecast, and the resource data. Then all the required data for a study period is stored in a file or memory space for the period(s) under study. The user then selects the dispatch technique (economic, economic with must run, etc.). The number of natural paths controls how many combinations of availability will occur for each study period. A larger number of paths will result in a more accurate result. The demand forecast error is an estimation of the distribution of errors from forecasting the weather normalized peak demand. The availabilities (probabilities) that go with each distribution are then user specified. Demand forecast error is based on the error in estimating the non-weather related growth in the demand from year to year. It is primarily economic growth that is estimated in this component for this exemplary implementation. Using historical projections of demand compared to actual weather-normalized peak demands, this distribution can be estimated.

Scenario Builder (SB)

Each combination of scenarios corresponds to a case number for report generation. The SB determines which contingencies are to be valued, if more than one contingency is to be bundled with others in a valuation, or if contingencies are to be excluded. Contingencies are excluded as equipment is maintained over a long period or retired from operation.

Resource Builder (RB)

FIG. 61 illustrates the processing of resource data for supply units. The first step is to select the units that will be used. The different resource types that can be selected include nuclear, fossil steam, combustion turbine, interruptible units, emergency units, scheduled hydro, run of river hydro, wind, solar cell, and energy storage. After selecting the resources for the study, all the required data units will be loaded into the respective arrays for optimization and for simulation. The user is then able to check all the units to be included for the study period. The summary report determines a running total of the resource capacity that has been selected. Note that only units that have global values for capacity can be accurately summarized. If a unit's capacity is input seasonally or has a varying capacity based on weather, an accurate total will not be calculated. Units that do not have global capacity values are highlighted. Although the industry uses one level of contingency as of this writing, multiple should be implemented to handle weather dependent parameter changes and events such as wildfires.

Resource information can be input in multiple different formats including global, annual, monthly, seasonal, global monthly, and global seasonal. Unit variables include, but are not limited to, the following: unit peak hour rating; unit continuous hour rating; unit capacity levels, curtailable days per week limit, curtailable hours per day limit, curtailable hours per year limit, unit fixed cost, unit fuel handling cost, unit variable operations and maintenance cost, pumped storage hydro cycle efficiency; unit dispatch type; unit primary fuel number; unit heat rate coefficients; unit incremental heat rates; hydro unit monthly energy; unit in-service dates; curtailable minimum down time; unit maintenance period start, end dates; unit dispatch penalty factor; unit partial outage derating percentage; unit partial outage time to failure; unit partial outage time to repair; pumped storage hydro pond capacity (MWh); combustion turbine start up probability; steam unit startup time (H); unit time to failure cumulative probability distribution (hours); unit time to failure hourly distribution; unit time to failure multiplier; unit time to failure probability; unit time to failure reference; unit time to repair probability distribution (hours); unit time to repair probability distribution (days); unit time to repair hourly distribution; unit time to repair multiplier; unit time to repair probability; and unit time to repair reference. The energy system model detail and the optimization method determines the data needed for the valuation.

Control Variables

The user selects the control variables for the simulated operation each hour. The control variables in the simulation model include, but are not limited to the following: (1) ancillary service margins and contribution from each resource; (2) number of committed/dispatch paths included in present analysis (an analysis can be restarted to include more paths in a subsequent analysis); (3) dispatch accuracy for selected optimization method; (4) equivalent demand duration curve accuracy to eliminate paths beyond economic impact; (5) energy storage dispatcher estimate look ahead (hours); (6) dispatch type calculation look ahead (hours); (7) hydro look back period (days); (8) demand adder (MW); (9) normal dispatch order; (10) risk-aversion dispatch order; (11) must run "reliability" dispatch order; (12) study period date; (13) normal risk—aversion dispatch threshold; and (14) risk aversion—reliability dispatch threshold.

System Variables

System variables include, but are not limited to, the following: minimum area security requirement (MW); daily peak estimate error distribution; economy purchases by period; fuel cost; hydro hours of operation limitation; neighbor interchange import limit (MW); amount for reserves (MW); reserves as percentage of largest unit; segment size (MW) of energy distributions; and sub-period definitions. Every hour of the week needs to fall into one of three sub-periods: weekday, weeknight, or weekend for the demand duration curve model.

Reports

The user specifies which reports are to show the result data from the analysis. There are three categories of reports embodies in this exemplary implementation. Standard reports include all of the summary data for each period: resource use, margin contributions, costs, margins not used, and system results. Customized reports may be selected to focus on a particular resource (e.g., wind or solar energy use). Iteration-specific reports are detailed data listing the order of commitment/dispatch, dispatch accuracy, contracts selected, and optimization specific data to examine the quality of the solution. These reports are not generally used in the outcome of the study, but are rather used for debugging the simulation to validate different components of the input data or the simulation process. Such data can also be used to justify the analysis for tariffs, for contract selection or valuation, for resource selection or valuation, for ancillary service margin requirement costs, etc.

The standard reports that are visible in the reporting section are based on the reports selected by the user. The standard reports that can be selected include monthly energy deficits; annual energy deficits; monthly outage report; annual outage report; multi-study analysis (for certain analyses, reliability costs need to be summarized across all the periods for a study); incremental capacity equivalent (ICE) factor; demand interruptible service (IS) summary; annual IS summary; period reliability metrics; average reliability metrics over periods; reliability cost; debug reports; and resource expected hourly operation.

To evaluate the worth of energy-limited resources, the simulation model tracks the resources from the demand response options. This report will give the hours and amounts for each of the curtailable demand contract.

The monthly reliability metrics report contains many of the industry standard reliability variables such as LODP and EUE. The reliability cost report contains data for each period. Each of the points represents the percentage of all the reliability costs that fell in the corresponding periods for the entire study. It is summed across all scenarios and weighted according to the case probability. The sum of all points for a sequence of periods represents the annual, monthly, weekly, or daily factors.

The debug report is primarily used to ensure that the simulation is progressing according to the algorithms for optimization of selecting availability paths. The debug report contains demands, resource use, demand interruptible service, scheduled hydro generation, emergency resource generation, interchange sales or purchases, energy storage use, and the capacity offline.

The resource operation report outputs for every period, the operating state of each resource, the production of each resource.

Input Groups

FIGS. 48-60 illustrate the input data for a single period analysis and a multiple period analysis. The user selects the time period data to condition the base case data. The time period data includes maintenance schedules, weather forecasts, fuel forecasts, interchange and market forecasts, as well as changes to resource models. The user interface is a tabular description that can be validated against the base case and the rules for operation.

Data represent portions of a resource (e.g., units that are sold either as independent unit, jointly owned units, or pooled units). Typically these are sold as blocks but in any hour the entire capacity is cannot be exceeded. The excess is available for dispatch since the resource has been committed. Therefore monthly capacities and hourly energy contracts are used to calculate the amount of capacity available. When a resource, which has a portion of its capacity sold, is forced offline, the sales from that unit are curtailed. If the contract was firm, then market resources replace the sale capacity with the market price being paid by the resource. If the sale energy in any hour is less than the capacity of the sale, the remaining capacity will be available to the system to meet demand if economic to do so. The resource sales can vary from study to study, so the data is input in groups. Each sale must have a monthly capacity that corresponds to a resource and a month.

Each resource has a fuel assigned to it, even if water, wind or solar. This information is primarily for setting the dispatch order. The fuel prices can vary from study to study, so the data is input in fuel groups. Each fuel file must have the referenced resource's identifier as well as a week, month and year to go with the fuel cost.

Input Validation

Input validation information is stored for each case that is run in a study. Much of the data will be the same between cases in a study, but may change drastically depending on the select records that are used. There are multiple sections in the input validation information: diagnostic report, maintenance report, outage report, resources report, and demand report. There are three sections in the diagnostic report—a note section, a warning section, and an error section. Only an error will stop the simulation. The maintenance report is a summary of all the maintenance information input. The outage report is also a summary of the outage information. This aids the user to verify that what was intended is what is actually being used in the study. The resources report summarizes all the units that are being used in the study. The resources are summed by week, month and capacity type. This also helps to show changes in capacity based on selected values that are input into the application. For example, if a resource has a global value, but also different weekly or monthly values for a certain year, and the year is currently selected, the logic is going to select the correct values. The demand report summarizes the demand for each week by calculating the peak demand, the sum of all the demands. This report is done after the adjustments have been calculated, so the user can see how the forecast model has affected the demands.

Dispatching Combined Cycle Generation Resources

Because the analysis is attempting to minimize production cost, incorporating logic for the different combinations of combined cycles is complex. The supplemental resources (turbines) modes can or cannot operate unless the base mode is operating, additional resources will be created to represent the supplemental resources. These additional resources will then be linked to the base resource using a conditional variable. Only in hours when the base resource's status is operating, are the supplemental resources included in the based resource model. The base resource model is dependent upon the number of supplemental resources committed. The supplemental resources will be modeled as combustion turbine units. The base resource power augmentation will not be able to operate at temperatures below a user input lower limit (e.g., 60 degrees F.). The impact of dispatching these supplemental resources has to take into consideration the weather based capacity function.

Dispatching Interruptible Resources (e.g., Demand Response Contracts)

All interruptible resources are included in a block loading commitment/dispatch as preferred for this application. When interruptible contracts are called, they are called in sequence to ensure terms and conditions are satisfied among such contracts. Each curtailable resource is assigned a block loading order based on contract terms and conditions.

The rules of traditional utility operation ensure equality of impact. Interruptible contracts are scheduled in a rotating manner to ensure equal demand curtailment. Therefore, all available interruptible contracts are sorted in descending order of the time since that contract's previous commitment.

Market Purchases and Firm Contracts (Interchange)

The true cost of reliability is not only the cost of EUE, but also the incremental cost of market purchases beyond the production cost of all other resources. In the PTC model, there are three components factored into making market purchases: (1) market price, (2) available resource capacity, and (3) available transmission capacity.

Some of the factors that affect market price are the following: resources—total demand at each location; time of day; day of week; alternatives (seller, buyer); elasticity of demand; equilibrium transported market price; fuel resource (e.g., natural gas) availability; seasonal fuel market price; other resource availability; hydro reserves; transmission availability; and forecasted weather expectations. The market price should include the incremental price above the cost transportation.

The impact of these factors can generally be estimated through two variables: (1) the expected reserve margin for the year and (2) the magnitude of the hourly difference between available resources and demand. Estimated cost of market purchases are based on the ancillary services (e.g., reserve margin) and the hourly shortage of scheduled capacity. The market purchase cost data is included input with ancillary service requirements (e.g., reserve margin (RM)) and corresponding shortage level with the cost. This must be provided for a sufficient number of data points such that a reasonable forecast estimation can be made.

Generating PTC Table

The Probability Tree Convolution table is generated a shown in FIG. 30. The status of all resources are started as available at maximum capacity for each segment. This initial tree is the least expensive production cost value. Next, the status of each unit, starting with the first to be committed or dispatched in merit order is outaged. The largest impact should be the first resource as it is the least expensive requiring all more expensive resources to provide service when it is not available. This process could be terminated earlier or later depending on the impact a unit has on the EDDC and the user specified option.

Once the initialization is completed, the sensitivity of each resource to be outaged next is calculated from the previous optimal solutions. The sensitivity is calculated by the deterministic valuation module for each leaf of the probability tree. Since the new solution is committing or dispatch one resource in sequence, the preferred implementation is based on parametric programming (LP) to find the next solution and the next set of sensitivities. Parametric programming is implemented within this embodiment as an exchange of a variable with another variable. Alternative warm start algorithms are discussed in the following. When the impact of the next resource segment committed or dispatched is below a user specified threshold, the process is terminated.

Once the initial EDDC impact threshold is achieved, then the impact of breaking the unit reliability models into more detail is calculated. This process splits the probability tree into two paths at the point where the unit is in the merit order list. Since the new solution is committing or dispatch one resource in sequence, parametric programming (LP) is one approach, other warm start techniques using interior point algorithms are more appropriate for other supply chains. The method used to find the next solution and the next set of sensitivities determines the speed of the algorithm. When the impact of the next resource segment committed or dispatched is below a user specified threshold, the process is terminated.

As the availabilities are processed, the production costing, ancillary services, committed or dispatched resources are accumulated for the building for the EDDC. The EDDC determines the Loss of Demand Probability (LODP) and the Expected Unserved Energy (EUE) for each period of analysis. The EDDC is calculated as the weighted sum of the PTC path and the production cost of the valuation at the leaf.

Operating Valuation Procedure

The valuation of a tree path is accomplished by a deterministic optimization algorithm, such as Newton, LaGrangian Relaxation or Linear Programming. The tree path determines the status of each resource. The status is based on the forced outage rate and the availability of each resource with the amount of resource for energy and for each ancillary service. The optimization algorithm implied in this implementation uses the Merit Order Loading Commitment with Transportation Network Optimization by Linear Programming for the transportation model . . . .

The most common optimization, historically, would be Unit Commitment by LaGrangian Relaxation as defined in FIGS. 76 and 77. The transportation model is defined in FIG. 75. One preferred solution for the application implementation is Linear Programming augmented with Parametric Analysis to yield the most global sensitivities. Mixed Integer Linear Programming would be the preferred method to facilitate present Independent System Operation in USA competitive business environments.

All resources are considered for the energy market and for all ancillary services market as is user specified for that period.

An implementation including the transmission grid would include an optimal power flow to be used for the valuation/auction of resources.

Fixed Dispatch

In one embodiment of the resource model, schedules are made regarding the availability of fixed resources and the rules of dispatching during period conditions. In general, resources will be dispatched as available throughout the week. Also, because of the difference between wind, solar projects, and run-of-river (ROR) hydro resources, capacity is assigned as forecasted. Market based and interchange contracts that are fixed and firm are considered fixed dispatch.

Storage Resources Dispatch

In one embodiment of the optimization, reservoir schedules are made regarding the availability of hydro resources and the rules of dispatching during period conditions. In general, hydro will be dispatched more economically throughout the week than would be in a more aggressive reliability model. Also, because of the difference between storage projects and reservoir hydro projects, capacity may be available at some hours when it is unavailable at other locations. The reservoir schedules are established by multiple period analysis to minimize the cost of production.

To implement risk management dispatch assumptions, the logic for reservoir scheduled hydro can be weighted. Reservoir scheduled hydro represents the normal weekly dispatch capacity for a hydro unit, and will be dispatched based on a conservative dispatch embodiment for risk management.

Steps performed by the processing logic of the economic embodiment to dispatch reservoir based hydro follows:
1. Schedule minimum resources per day across the peak demand;
2. If the resources exceed demand, exit;
3. Until the dispatched hydro energy is exhausted, repeat the following;
   a. Add the next incremental demand per day;
   b. Increment the dispatched hydro resource to shave remaining peak demand such that the peak hours have the same resource allocation;
4. Exit.

The storage level in the reservoir hydro storage projects changes from period to period. A rule curve is input that identifies the range of water levels within which projects can operate. The dispatch rules do not assume that it is possible to go below the rule curve on any of the resources. To determine the amount of energy available for reserve hydro during a month or a year, a risk assessment analysis is made for the reserve hydro. The available energy reserve is to level the risk per period. The impact on other reserve and ROR hydro units in the same river system is calculated. This available energy is spread over the periods. Hydro dispatch risk management is used in dispatching reserve hydro in the simulation model.

The following points summarize the processing logic for dispatching hydro in the risk management dispatch embodiment:
1. Reserve scheduled hydro is dispatched for multiple periods in advance to shave the peaks such that the LODP is optimized across the multiple periods. The reservoir capacity is set by the analyst for each year. The energy to be scheduled is the forecasted hydro energy for the year being modeled.
2. Reservoir scheduled hydro represents the difference between the scheduled hydro capacity and the declared maximum hydro capacity. Reservoir scheduled hydro will be dispatched hourly as needed within period energy limits.

The same logic and models are used for scheduling fuel contracts (e.g., take or pay) and for Maintenance Scheduling.

LaGrangian Relaxation Unit Commitment

The basic LaGrangian relaxation is illustrated with the minimization problem below. The constraints are divided into two types, the equalities and the inequalities:

The problem is decomposed from a primal problem to several smaller problems that are easier to solve. This is accomplished through the creation of the relaxed problem by including the constraints into a new objective function. A new variable, called the LaGrange multiplier or dual variable, penalize the objective as an unconstrained optimization problem, a relaxed problem. The new variables are included in this unconstrained optimization, in addition to the original problems. The original optimum is found whenever the dual variable is zero or the constraint is satisfied.

The formulation for the unit commitment problem referenced within this work includes the heat demand models for a Combined Heat and Power resource, including co-generation facilities. The total system cost is minimized, including startup costs, minimum up and down times, resource limitations, resource ramping limitations, and cost of alternative heating resources.

One such formulation is show on in FIG. 74. The LaGrangian method may be implemented as a Dantzig-Wolfe decomposition into a master problem and several sub problems. This can result in a smaller search space in LP-based branch-and-bound algorithms. This is applicable to IP and MILP solutions as well. The preferred LaGrangian multiplier update algorithm is an implementation of the master problem updating algorithm.

The power production relaxed problem includes the restriction for the electric demand and the reserve requirements into the primal problem:

A system of CHP turbines, with given heat and electric demand, the possibility to buy electric energy from the market or a take-or-pay contract, the possibility to buy or sell electric energy on the energy imbalance market (EIM), or to buy and/or sell ancillary services, can be formulated, in part, as follows:

The fuel consumption in this formulation is a linear equation. The relationship of the power and heat production is described with a plant-characteristic maps, called PQ charts. Three straight lines with constants are used in this formulation. More complex functions (e.g., quadratic, cubic, reduced cubic, piece-wise linear) can be used if more accuracy is desired by the user or the regulatory agencies.

Linear Programming Transportation Network

The transportation model is used for this explanation as a valuation that can represent zonal locational marginal prices. FIGS. 8-11 show the structure for such an auction based algorithm. The transportation model includes the flow connections between resources and demands. The flow connections include maximum limits for each flow connection. Reservation prices are used to set the incremental margin price. All resources bid on the energy market for each hour. Energy storage devices are expected to bid in one hour and ask in another representing the transaction to store energy. The ancillary services are auctioned simultaneous with the energy market to clear the energy transactions. Several ancillary services are dependent on the energy transactions committed.

The formulation for the transportation problem is given in the following. Consider the market situation when "Sellers" have an amount of product to sell:

$$a_i > 0 \text{ for } i=1, \ldots, m$$

and when "Buyers" have an amount to buy:

$$b_j > 0 \text{ for } i=1, \ldots, n$$

Assume for now that there is one homogeneous product offered by each seller. Thus there is a common product from each seller. Assume that there are heterogeneous products amongst sellers, thus there is some difference between sellers. The price would have to be the same if all sellers offered the same product with the same quality, unless some of the information was hidden. There are different values for the product from each seller for the following discussion.

The following model assumes that a buyer j tenders a sealed bid for the product from a seller i:

$c_{ij} \geq 0$

This is the maximum amount the buyer is willing to pay for one unit of product from seller i's based on the buyers value of the product.

Consider the market situation when "Sellers" have an amount of product to sell:

$a_i > 0$ for $i = 1, \ldots, m$ and when "Buyers" have an amount to buy:

$b_i > 0$ for $i = 1, \ldots, n$

Assume for now that there is one homogeneous product offered by each seller. Thus there is a common product from each seller. Assume that there are heterogeneous products amongst sellers, thus there is some difference between sellers. The price would have to be the same if all sellers offered the same product with the same quality, unless some of the information was hidden. There are different values for the product from each seller for the following discussion.

The following model assumes that a buyer j tenders a sealed bid for the product from a seller i:

$c_{ij} \geq 0$

This is the maximum amount the buyer is willing to pay for one unit of product from seller i's based on the buyers value of the product.

The buyer's surplus is determined by the KKT conditions at the optimal solution, just as the transportation problem is solved.

Note that the LaGrangian dual variable v is the buyer's surplus. Note that we should require the price to be positive:

That the above should be a solution to the auction problem can be presented as a set of fairness requirements that both the buyers and the sellers would agree to enter the auction:

The rational seller should be required to:
Not sell more than is available
Get the same price for all units sold
If the price is positive, then more units are sold
If the price drops to zero, then no more units are sold
Since we are using the simplex, one should notice that a buyer and a seller are matched as each vertex is reached. The simplex will continue to match buyer and seller until the entire buyer surplus is consumed. The equivalent LP formulas are:

The rational buyer should be required to:
Not buy more than is needed
Get the same surplus for all units bought
If the surplus is positive, then more units are bought
If the surplus drops to zero, then no more units are bought
Note that at this optimal solution that the price and the surplus will be of zero value. This shows how a market could collapse when supply does not equal demand. We will show an additional condition later that raises the final price above zero.

The LP form based on the above requirements is presented to determine how this formulation fits the desired auction solution. The objective is to maximize the number of transactions to obtain all of the buyer's positive surplus:

Each of these constraints should be checked with the above requirements.

The objective function embodies the auction goal that the maximum total bid value is found. An economist would refer to this as the "invisible hand." This is also an economic potential function. This potential function is at a maximum at the optimum.

The above is augmented with the equations for the ancillary services, including bids and asks for these services, and solved simultaneously FIGS. 7 and 12 show the addition of a market for more reliable supply of demand at different LODP margins. Such models duplicate the transportation model for the difference in firm demand contracts.

Mixed Integer Linear Programming Unit Commitment

The quality of MILP solvers has improved dramatically in recent years, mathematical models to be suitable for those solvers must convert nonlinearities to linearized mathematical models. The equations implementing the parameters include the following:

Two types of system constraints are central to a solution: system power balance and spinning reserve requirements. The impact of ramp constraints can be considered when setting reserve constraints.

Operating constraints include: minimum up and down time.

Generating limits and ramp rates.

Startup cost for hot and cold starts.

Switch on and off variables for integer solution.

Objective function to be minimized and variable constraints converted to linear form:

The notation used is a preferred solution over LaGrangian Relaxation as the sensitivities are directly available from the MILP solution. Other formulations and other MILP algorithms may be used as LP provides sensitivities that are strong within the present area of solution.

Linear Programming Security Constrained Dispatch

Security constrained dispatch includes the power flow equations in addition to the unit commitment models presented above. Extending the operational model provides a more detailed solution for a competitive business environment. As the market price is determined, the actual energy available for purchasing is determined. Each of the interfaces from which an electric utility can purchase energy could be modeled in the period PTC analysis model. The first factors to determine capacity available are the total resources and projected reserves for ancillary service margins for the control areas on the interface.

Available transfer capacity data is input as a distribution for each neighboring system for each hour. It is important that each neighboring system has points in the distribution that correspond to each other. This is done through the position locators in the input data. Locator one in neighbor one must correspond to position one in all the other neighboring system models. For example, if position one for neighbor one came from the 33rd hour in July, position one for all other neighbors should come from the same hour. Several inputs are required to model neighboring utilities correctly. These include EFOR, number of units, capacity, peak demand, and capacity benefit margin (CBM).

For each hour that energy is needed from outside the neighboring system or electric utility's control area, the following calculation is performed for each interconnection.

The final component to the market purchase processing logic is the interface with the transmission module. There are two components to the transmission module: internal constraints and interface constraints.

The logic for modeling constraints on internal interfaces requires the capability of entering demand on an area basis and not just for the entire control area. The optimal power flow equations provide the most descriptive physical relationships. The transportation model is a linearized approximation to the OPF equations which are appropriate if a less accurate solution is acceptable, given the forecast uncertainties and the network uncertainties, such a transmission line parameters.

Collecting available transfer capacity (ATC) and market purchase data for all of the interfaces to the electric utility allows for the creation of distributions for the availability of transmission capacity at each interface In summary, market purchases may be dispatched twice in the simulation model. The first dispatch is based on economic values; the second dispatch may be based on a reliability risk management index.

During the economic dispatch, the available transmission capacity may be treated specially as a function of availability. This choice is up to the user to specify. During the risk management dispatch, the available transmission capacity will reflect calling CBM if specified by the used. Emergency dispatch of market purchases will only occur if all other resources have been expended.

To determine the expected amount of economic transmission capacity available, a distribution of megawatts available for each interface will be stored hourly. When the model selects values across the interfaces, the correlation between the available transmission capacities at different ties to represent the general reality that transmission capacity is low to a neighboring system, that it will likely be low at other tie-points.

To calculate the net megawatts purchased, the minimum of short amount, generation capacities available and transmission capacity available will be used to calculate the amount of energy purchased.

Note that resources included in other formulations may be included here based on the portfolio of resources within an area. Demand response, hydro, pumped hydro, CHP, CoGen, and other resources are included to solve the complete problem for a given network.

Sensitivity Analysis for Repeat Solutions as Branches are Added or Subtracted

The splitting of a branch to add another path for solution accuracy renders the previous solution for the original branch infeasible. The two new solutions to be added may use the previous original branch solution as a warm start or a neighboring branch solution in the previous EDDC built.

As each branch is a minor change to the LP model before it is restarted. This happens because the conditions being modeled have changed as the availability is cut into two segments. The traditional mixed-integer programs using branch and bound, solve numerous LPs in a tree-structured search for a solution that is both LP-feasible and integer-feasible. Each LP is identical to a previous LP except that a bound on one variable has been adjusted so that the previous LP solution is rendered infeasible. In LP infeasibility analysis, these algorithms require the solution of sequences of LPs that differ by the addition or removal of one or several of the constraints or bounds. In cases such as these where the next LP to be solved is substantially similar (but not identical) to a previous LP, then a warm start that makes use of the previous solution and basis may be effective. This usually means that you can arrive at a new feasible (and optimal) solution in only a few iterations.

In warm-starting, if the changes made to the model have not rendered the warm-start point infeasible, then the primal simplex iterations just pick up where they left off and continue iterating to optimality. However, if the changes to the model have made the warm-start point primal-infeasible (normally by a change to a constraint or bound, or by the addition of one), then the warm-start point will still be dual feasible. The solver then switches to the dual simplex method and will quickly reach primal feasibility at the dual optimum point, normally in a small number of iterations.

As many resolution algorithms are possible, the embodied algorithm evaluates all possible warm and hot start algorithms based on user selection.

Warm and Hot Start Algorithms

The Big M method used in most techniques is one alternative as it is used in most Linear Programming textbooks. It is not normally used in practice, thus it is not detailed in this embodiment.

The phase 1 method addresses this problem by introducing nonnegative artificial variables into the problem so that a basic feasible solution is immediately available at the origin in the artificial space. A phase 1 objective function is also introduced which reaches its optimum value when the artificial variables are driven to their lowest possible values. If all artificial variable are zeroed, then a feasible solution for the original problem has been found.

If the phase 1 LP terminates at an optimum solution in which the new objective is zero, then it has found a point at which the artificial variables can be dropped and all of the original constraints are satisfied. This is a feasible point for the original problem. The original objective function is reintroduced. Ordinary simplex iterations then proceed to the optimum of the original objective function. The original objective function is included in the phase 1 matrix and updated as a nonbinding row so it is in proper form for the phase 2 problem. If the phase 1 objective function is greater than zero, then the original LP is infeasible. An alternative resource or resources are added to find the least costly feasible solution. The dual prices of slack variables provide information in analyzing the cause of the infeasibility, thus alternative resources may be requested for contract offers.

Redundancies (degeneracy) may be present when the phase 1 objective function reaches zero, these are handled to match the branches included for the present valuation.

It may be numerically convenient to peg some of the nonbasic variables at values between their bounds; these variables are called super basic as they may be outside of their bounds during phase 1, i.e., the solution may be infeasible. The goal of the phase 1 procedure is then to drive all of the basic variables that are currently outside their bounds to within the bounds.

This means that whenever infeasibility is discovered, the cost vector is replaced by the prices and reduced costs. The simplex method is able to iterate in the normal manner towards feasibility. The cost component is reset to zero when a variable that is outside its bounds eventually satisfies them. When variables can violate their bounds, or can be nonbasic at either the upper or the lower bound, there are several conditions to consider when choosing the leaving basic variable during simplex iterations.

A variable may be basic, outside its bounds and moving away from them, and hence will never be chosen as the leaving basic variable.

A variable may be basic, outside its bounds and moving towards them, in which case it may pass through the violated bound and become nonbasic at the opposite bound.

A variable may be basic and within its bounds, in which case it may become nonbasic at the first bound it meets.

These conditions are checked when determining the leaving basic variable, and the basic variable that most restricts the change in the value of the entering basic variable is chosen as the leaving basic variable. An entering basic variable may be decreasing in value. Any variables that satisfy their bounds are kept inside their bounds by this procedure, while variables that violate their bounds are gradually made to satisfy them. The number of infeasibilities (NINF) is gradually reduced, eventually to zero if the LP is feasible.

While this procedure is effective, the fact that it keeps a variable within its bounds once it satisfies them can be overly restrictive. In some cases it is preferable to allow an entering basic variable to increase beyond the point at which the first currently-feasible basic variable encounters a bound because the overall sum of infeasibilities is still decreasing. When choosing the leaving basic variable, there are up to two thresholds associated with every basic variable:

No thresholds if the basic variable is currently outside its bounds and moving away from them.

One threshold if the basic variable is currently within its bounds. Beyond this threshold, the variable contributes to the sum of the infeasibilities.

Two thresholds if the basic variable is currently outside its bounds and moving towards them. The first threshold moves the basic variable into its feasible range, but is not blocking; beyond this threshold the variable no longer contributes to the sum of the infeasibilities. The second threshold is at the second bound and beyond this point the variable again contributes to the sum of the infeasibilities.

An alternative, more advanced procedure, for choosing the leaving basic variable first sorts all of the thresholds in order from smallest to largest. Then examine the rate of change of the sum of the infeasibilities in the zone between each threshold. The threshold dividing the last zone that shows a rate of decrease in the sum of the infeasibilities from the first zone that shows a rate of increase in the sum of the infeasibilities identifies the leaving basic variable. This emphasizes the decrease in the sum of the infeasibilities at the possible expense of increasing NINF. It is also possible to combine the two goals by examining the thresholds to reduce the sum of the infeasibilities as much as possible while not increasing NINF. This is done by choosing the threshold that is latest in the sorted list that does not increase NINF.

The "Big-M" method requires the introduction of the same artificial variables as in the phase 1 method. The difference lies in how the artificial variables are driven out of the basis. "Big M" refers to a large positive multiplier M used as a penalty to remove any artificial variables in the basis, such as a resource that is no longer available. Traditional guidelines are used to select the appropriate value for "M." Even though the Big-M method is seldom used in practice, it is of value to remove a previous segment and add two new segments when a resource availability is split into two availabilities. Each has an energy segment that is less than the branch being replaced.

A crash start in the context of linear programming is a procedure for generating a high quality initial basis. It may not be feasible, but it should be as close to feasibility as possible and have other helpful characteristics such as providing a nearly triangular matrix to speed the calculations. An LP with m independent rows and n original variables is normally converted to a form having n+m variables where one slack variable is added for each row. The main operation in crashing the initial basis is selecting m of the variables to be in the initial basis. Once the basis is selected, the current values of the basic variables can be calculated. Then an appropriate phase 1 cost structure is iterated to feasibility.

The unit basis consisting of the slack variables is first set up, and then nonbasic original variables are gradually exchanged for basic slack variables. A basic slack variable is a candidate for an exchange with a nonbasic original variable if the pivot element at the intersection of the row for the basic slack variable and the column for the nonbasic original variable is nonzero. Efficient coding uses the fact that there has been no update to the pivot element if the variable columns elected in previous exchanges have nothing but zeroes on the current pivot row. If the rows and columns in the revised basis are ordered in the same order as their selection into the basis, this leads to a triangular basis.

The row selected for an exchange should have as few nonzero elements as possible in columns that are candidates for exchange into the basis, on the principle described above. A variable is then selected for exchange into the basis, and all other candidate nonbasic variables that have a nonzero pivot element in the current row are marked as unsuitable for exchange into the basis later. Otherwise a matrix update would be required.

There are many ties for the selection of the row corresponding to the basic variable and the column corresponding to the nonbasic variable to be exchanged when the selection is based on sparsity. Ties for the basic variable row are broken in favor of equality constraints (so that artificial variables are removed from the basis), and after that according to the degree of restriction, from most to least (i.e., basic variables that have a smaller range are exchanged first). Rows having free variables are never selected. Ties for the nonbasic variable column are broken by preferring to exchange variables that have the largest range, with first consideration being given to free variables (those without bounds). Fixed columns are never selected for exchange into the basis. The crash procedure can also be adjusted, primarily by changing the tie-breaking rules, to reduce the amount of degeneracy in the crashed basis.

If the phase 1 procedure uses artificial variables, then the crashing procedure can be designed to reduce the number of artificial variables in the basis. Only rows corresponding to basic artificial variables are selected. The nonbasic variable is chosen so that the pivot element is of "reasonable size" to avoid basis singularity. The algorithm input data includes a parameter that allows the user to select a minimum size for any pivot. This embodiment sets a minimum fraction of the largest element in the column.

Crossover refers to the process of moving from a feasible point provided by an interior point LP algorithm to a nearby feasible basis (the basic solution is desirable because it gives access to sensitivity analysis, etc.). If an advanced infeasible basis can be provided, by a crash procedure, then it is sometimes possible to crossover from that basis to a nearby feasible basis.

At a basis provided by a crash start, the solution counts the number of superbasic variables (nonbasic variables that are not equal to one of their bounds, but instead lie between their bounds). A purify or push algorithm is used to move superbasic variables to either a basic or nonbasic status, i.e., to arrive at a feasible basis. The main idea is to examine the effect on the basic variables when the value of a superbasic variable is adjusted. This is similar to the bound replacement algorithm where a variable reaches the alternative bound, and the alternative variable is substituted. If the superbasic variable reaches one of its bounds before any basic variable does, then the superbasic is simply switched to nonbasic status. If a basic variable reaches one its bounds before the superbasic does, then a basis change is made, in which the basic variable is made nonbasic and the superbasic is made basic.

The version of the crash heuristics that tries to eliminate artificial variables may be preferred by the user with the push heuristics since to reduce the amount of work during the push phase. In addition, during the push phase, any original variables that are at their bounds after the crash are temporarily fixed at those values.

An approximate solution that is even closer to feasibility can be supplied by improving the output of the crash step before purifying using a successive over relaxation (SOR) algorithm. This is an iterative technique for solving systems of linear equations. The procedure has three steps: (i) apply the crash heuristic to create an approximately lower triangular basis, (ii) apply the successive over relaxation algorithm to improve the point provided by the crash heuristic, and (iii) apply the push algorithms to cross over to a feasible basis. Based on the data values and structure of the matrix, SOR procedure produces a feasible solution directly, which eases the crossover to a basic solution. If it does not produce a feasible solution, then the push algorithms are used.

Seeking Feasibility and Optimality Simultaneously is an option provided in simplex-based algorithms is the ability to seek feasibility and optimality simultaneously. This is the basis of using the big-M feasibility-seeking algorithm.

The simplest approach is to use a composite objective that weights the objective function and a measure of infeasibility, normally the sum of the infeasibilities. A composite objective of the form minimize $\sigma w(cx)+(sum of infeasibilities)$, where $\sigma=1$ for a minimization objective function and $\sigma=-1$ for a maximization objective function and w is a user specified weight. If the LP solver reaches an optimum solution for that objective function while the original model remains infeasible, then w is reduced by a factor of 10, and up to five such reductions are allowed before the algorithm gives terminates. The composite parameters and the number of iterations is selected by the user.

Interior Point Linear Programming

The addition of another tree branch requires a fast repeat solution to demonstrate superior algorithmic speed. Interior point or convex optimization algorithms are used to provide the sensitivity analysis to find the new solution quickly. The embodied algorithm uses multiple s paper describes and analyzes warm-start strategies for interior-point methods applied to linear programming (LP) problems. The PTC is set in the situation in which one linear program, the "original instance" has been solved by an interior-point method, and we are then presented with a new problem of the same dimensions, the "perturbed instance" in which the data is slightly different.

Interior-point iterates for the original instance are used to obtain warm-start points for the perturbed instance, so that when an interior-point method is started from this point, it finds the solution in fewer iterations than if no prior information were available.

The final solution of any Interior Point LP (IPLP) algorithm is the division of variables into the basis and non-basis categories of a feasible solution at an interior point in this embodiment. The nearest optimal solution of this problem normalized by the objective function values is selected as the best solution. The original IPLP solution is then evaluated for the new branch for feasibility or infeasibility. If feasible, then the nearest solution satisfying the new set of constraints is selected by projection. If infeasible, then the IPLP is resolved to find the nearest interior feasible solution.

Maintenance Scheduling

The maintenance of resources is scheduled by keeping the LODP and the EUE above a user specified minimum level for the duration of the period of time. The analysis at each period selects additional contracts to achieve the desired target minimum of LODP and EUE. These contracts include but are not limited to generation offers, transportation control offers, ancillary service offers, demand response offers, and others. The optimal selection is found by using with Linear Programming over all maintenance periods by adding a price adjustment factor to signal changes to resources each period. The results in the present embodiment is the additional scheduling of suppliers, transporters, and buyers.

Transmission System Remediation to Restore LODP and EUE

As exemplified by the Commonwealth Edison Tariff mechanism for wholesale market access approved by FERC in 1995, the tree convolution process is extended to include transmission availability and remedial action to restore LODP and EUE to user specified levels when additional interchange contracts are bid or asked. The ComED implementation used the full tree model.

The security constrained dispatch is expanded to include contingency analysis for all user specified network outages. Those outages that reduce the LODP or EUE below the target values are returned to the target values by selecting remedial contracts as options to mitigate the outage impact. The target values are specified by the user in the present embodiment.

Such extension would include network or supply chain outages in addition to the resource, energy storage, and demand response outages previously evaluated. Outages in the resource supply chains, such as natural gas, oil, coal, hydro, and others, are mitigated.

Unit Forced Outage Rate(s) Processing Logic

The most pressing issue in modeling resource forced outages is the impact of time between failure and time to repair on reliability modeling. Because an outage can overlap multiple periods of the simulation and each period is not independent, the forced outage rate is not a constant. If each period is not independent, forced outage rates vary from period to period. Simply re-initializing the position of each unit in the time to repair and time to failure distributions could lead to inordinately high forced outage rates if the starting points are randomly selected out of these distributions. Because a point with a low number of hours could be selected as easily as a point with a high number of hours, the low number points could be chosen more often than they should be chosen statistically.

In order to model forced outage rates more accurately, an exponential degradation algorithm is implemented as shown in FIG. 26.

The user can select if only the seasonal maintenance events are considered in the rate adjustment model. If a resource has an operational issue, but is able to stay online until the end of the study period, the resource is not assigned to a forced outage (FO) state, but rather to a maintenance state.

Weather Capacity Relationships

An important use of the reliability simulation model is the development of incremental capacity equivalent (ICE) factors for interruptible contracts (e.g., customers). Generally, ICE factors represent the worth of demand management resources, such as interruptible service contracts, relative to the value of incremental resource supply capacity that can be added to the system. To do this accurately, it is important to correctly model the demand to supply balance at all hours of a day. The reliability PTC simulation model has the ability to limit the capacity of resources on an hourly basis based on the temperature. In summary, the PTC reliability simulation model determines weather capacity relationships as follows:

- Each period case file includes forecasted temperature(s);
- All combined cycle and combustion turbines will have a unique set of values specifying the capacity function for each degree for possible temperatures;
- Adjust available capacity each hour for combined cycles and combustion turbines based on the above set of specified capacity values;
- Adjust committed capacity when transferring resources to or from committed capacity;
- Use the adjusted capacity values of the resources for calculating the commitment for that period.
- Use the adjusted capability for each transmission line based on the actual or forecast weather variables.
- Adjust the transformer capabilities based on the actual or forecasted weather variables and the availability of the equipment cooling equipment.

Weather Dependencies

Transmission line parameters and transfer capability are a function of weather. The preferred implementation is to include the weather data as presently monitored and as predicted for future periods.

Transformer transfer capability is a function of weather. The preferred implementation is to include the weather data as presently monitored and as predicted for future periods.

FACTS and HVDC parameters and transfer capability are a function of weather. The preferred implementation is to include the weather data as presently monitored and as predicted for future periods.

Transmission line parameters and transfer capability are a function of weather. The preferred implementation is to include the weather data as presently monitored and as predicted for future periods.

Supply resource parameters and capability are a function of weather. The preferred implementation is to include the weather data as presently monitored and as predicted for future periods.

Adjust the transformer capabilities based on the actual or forecasted weather variables and the availability of the equipment cooling equipment. The availability is adjusted as forced outages are weather dependent.

EUE Sharing and Accounting

The cost of EUE is dependent on a number of factors including the number of EUE events in a given year, the duration of the outage event, the contract (e.g., customer class split), the duration of the event before rolling to different contracts, the day of the week, and the time of day. Not all contracts can be modeled efficiently due to the variations across jurisdictions.

The general philosophy in a firm demand shed event is to shed non-essential contracts (e.g., demand) first. If there are a very small number of events per year, this implementation is a practical compromise. However, if the electric utility system is forced to shed demand more often, then the demand must be shed on a more equitable basis based on contract terms and conditions.

The EUE cost calculation is performed at the end of each period. Each event based on the consecutive hours of EUE will be matched with the appropriate cost per kilowatt hour from the cost array. The impact of which contracts (e.g., customers, interchange) will be cut is taken into account during the determination of the cost of EUE.

Scenario Building

Outages are traditional rolled in a regulated environment, so that one customer doesn't experience an inequitable share of the unserved energy. As customers roll off the firm demand shed, they will experience a significant increase in demand as their appliances are in start-up. This will require shedding even more firm demand for the subsequent hour. Also, there is a significant impact to the cost of EUE on a cost per kilowatt hour basis depending on whether an individual customer's demand is shed for one hour or four hours.

Input variables are provided for the user to specify the length of each customer's outage in hours as well as for the payback energy penalty. In the simulation model, a counter is implemented for consecutive hours of EUE. Each hour that the counter becomes greater than the input variable, the EUE will increase based on the payback energy penalty, and the counter will be reset.

If a demand shed were to occur on a weekend or at night, there would be a lower cost of EUE. However, because such a very small percentage of EUE will fall on nights and weekends, the increasing complexity to include this logic is not offset by the improvement in accuracy of the model.

Results

In summary, the tree convolution simulation model determines EUE as follows:

1 The EUE for each hour will be assigned to unique customer blocks;
   a. In the following hour, if the outage duration has been reached, that customer's EUE block will be set to 0;
   b. If the outage duration has not been reached, and the EUE decreases, the EUE for the customer block will decrease to the amount of EUE;
   c. If EUE increases in the following hour, the first customer block of EUE will stay constant, and a second customer block will be assigned the additional EUE;
   d. When a customer's EUE is reduced, additional demand is incurred based on an energy payback input by the analyst. The net impact of bringing a customer group back online is shown in the formula below:
      i. adjusted_eue(current_hr)=adjusted_eue(prev_hr)−(adjusted_eue(prev_hr)−preadjustment eue(current hr))/(1+payback)
      ii. In this formula, adjusted_eue is the final value reported for eue; preadjustment_eue is the result of demand−total resources prior to the impact of payback penalty energy; and payback is the percentage energy payback input by the analyst. This formula is applicable only when the EUE for the current hour is less than the EUE for the previous hour.
2. At the end of the day, the duration of all the events is calculated and assigned an EUE cost. The EUE cost is determined by the duration and how many EUE events have been incurred in the case year.

Transmission or Transportation Network Constraints

One of the embodied implementation for this application is a transportation network is based on a zonal representation of the flows between supply resources and demand within a zone to other zones. If only one zone is represented for an electric system, then the resulting model is based on one supply demand conservation of energy constraint.

If the number of zones is increased to the number of buses in the electrical grid, then the resulting model is based on the "direct current" power flow conservation of energy equations. If the ancillary services and flow limits also include the reactive power models, then the resulting model is based on the "alternating current" optimal power flow conservation of energy basis.

If the ancillary services include dynamic and transient constraints, then the resulting model is based on the stability solution of control system and the alternating current conservation of energy equations. The computational resources to include the transportation flow limitations is dependent on the complexity of the transportation model. The more accurate models enable more detailed study of ancillary services and more detailed analysis of real time operation.

The network models may be improved by inclusion of dynamic data as is recorded by synchro-phasor (phasor) measurement networks instead of supervisory control and data acquisition remote terminal units. These network models would enable the inclusion of blackout mitigation, coherence management, and islanding management.

The transportation constraints are a function of the weather variables as noted in the equipment models above. The preferred implementation is to include the weather impact as presently monitored and as predicted for future periods.

CLOSING

A market based committed/dispatch order for a plurality of energy supply resources is selected if the committed resources are not economically suited to meet the firm energy demand. Demand and associated ancillary services response is used to assist by a plurality of end user devices and/or storage devices as specified by the user. Demand response based on thermal storage, air conditioner control, and/or other interruptible or schedule altering devices are included. Resources are committed based on the economic (price) order until the firm energy demand is met. The expected unserved energy (EUE) is determined and an estimated loss of demand probability (LODP). An associated cost for the expected unserved energy is also determined. The expected production of each resource is estimated for each study period. Multiple study periods enable the alteration of failure rates, longer term energy storage analysis and scheduling, analysis and scheduling of fuel contracts (e.g., take or pay contracts), equipment maintenance analysis and scheduling, and expansion planning.

This method is a means to link the spot and forward markets with the futures market for all energy forms across the various energy supply chains in a competitive market. This method is applicable to the electric energy transmission system, the gas pipeline system, the oil pipeline system, as well as the coal and nuclear energy supply chains. The method selects contracts for operation to be controlled on an instantaneous basis as well as a longer term basis such a futures contracts.

The method is a means to justify tariffs in a regulated market when the study horizon satisfies the regulatory rules. Study could be for select weeks or months as required by the government commissions.

Other energy supply chain applications requires models for barge and train transportation for coal or for pipeline and LNG shipping for Natural gas. Other supply chains can be included by simulating the operation of those chains in a similar manner to the following, such as food and drug distribution.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as internet, analog or digital communications links.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

Those skilled in the art will appreciate that a multiple computer implementation for concurrent processing would be of advantage. This would provide the results more quickly as a separate computer could provide the valuation solution for each combination.

In addition, it is possible to use some of the features of the present invention without the corresponding use of the other features. The lack of any specific resource such as fossil fired, hydro, wind or solar would only remove such resource from the reliability analysis. Accordingly, the foregoing description of the exemplary embodiment is provided for the purpose of illustrating the principles of the present invention, and not in limitation thereof, since the scope of the present invention is defined solely by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. provisional patent application Ser. No. 62/048,815, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a smart grid control system to control a smart energy grid, the method comprising:
  receiving, by the smart grid control system, input data that describes one or more operational parameters of each of a plurality of resources of the smart energy grid, the plurality of resources comprising at least a plurality of energy generation resources;
  building, by the smart grid control system, a probability tree based at least in part on the received input data, the probability tree comprising a plurality of leaves, each leaf of the plurality of leaves representative of one or more of the plurality of resources of the smart energy grid;
  performing, by the smart grid control system, a plurality of approximation iterations to iteratively revise the probability tree based at least in part on iterative updates to an estimated demand duration curve, the iterative updates to the estimated demand duration curve based at least in part on iterative selections of paths through the probability tree, each of the approximation iterations comprising revising, by the smart grid control system, the probability tree based at least in part on an analysis of a most recently updated version of the estimated demand duration curve, the revising comprising:
    splitting a first path of the paths through the probability tree into at least a second path and at least a third path, and
    determining, by the smart grid control system, a sensitivity factor for each resource included in said at least second path and said at least third path, the sensitivity factor determined for said each resource indicating a magnitude of impact that operational unavailability of said each resource will have on the estimated demand duration curve; and
after performing the plurality of approximation iterations, controlling, by the smart grid control system, the smart energy grid to activate or deactivate one or more resources of the smart energy grid based at least in part on the most recently revised probability tree.

2. The method of claim 1 wherein each approximation iteration further comprises:
    updating, by the smart grid control system, the estimated demand duration curve based at least in part on the determined sensitivity factor for each resource included in said at least second path and said at least third path
    determining, by the smart grid control system, whether to perform an additional approximation iteration based at least in part on an updated estimated demand duration curve.

3. The method of claim 2 wherein each said approximation iteration further comprises determining, by the smart grid control system, at least one of an expected unserved energy, a loss of demand probability, and a loss of load probability for the updated estimated demand duration curve.

4. The method of claim 1 wherein said revising, by the smart grid control system, the probability tree comprises:
    selecting, by the smart grid control system, at least one new path through the revised probability tree; and
    revising, by the smart grid control system, the probability tree to increase a number of states associated with at least one of the plurality of leaves traversed by the most recently selected at least one new path.

5. The method of claim 4 wherein said revising, by the smart grid control system, the probability tree to increase a number of states associated with at least one of the plurality of leaves comprises revising, by the smart grid control system, the probability tree to include uncertainty regarding one or more of a demand, a transportation network, or a fuel for the resource represented by the at least one of the plurality of leaves.

6. The method of claim 1 wherein said revising, by the smart grid control system, the probability tree comprises revising, by the smart grid control system, the probability tree to include at least one new leaf respectively representative of at least one new resource controllably introducible to and operable with the smart energy grid.

7. The method of claim 6, further comprising:
    selecting, by the smart grid control system, the at least one new resource from a plurality of available new resources based at least in part on a merit order ranking associated with the plurality of available new resources.

8. The method of claim 6 wherein revising, by the smart grid control system, the probability tree to include at least one new leaf respectively representative of at least one new resource controllably introducible to and operable with the smart energy grid comprises revising, by the smart grid control system, the probability tree to include the at least one new leaf respectively representative of at least one new demand response resource or at least one new transactive energy resource.

9. The method of claim 1, further comprising selecting, by the smart grid control system, at least one new path through a revised probability tree, the selecting comprising at least one of adding, by the smart grid control system, a new path to the probability tree and revising, by the smart grid control system, a previous path to follow a new route.

10. The method of claim 2 wherein said determining, by the smart grid control system, whether to perform an additional approximation iteration based at least in part on the updated estimated demand duration curve comprises determining, by the smart grid control system, whether the updated estimated demand duration curve satisfies one or more accuracy parameters.

11. The method of claim 10 wherein said determining, by the smart grid control system, whether the updated estimated demand duration curve satisfies one or more accuracy parameters comprises comparing, by the smart grid control system, the updated estimated demand duration curve to an expected demand duration curve descriptive of an expected energy demand for at least a first period of time.

12. The method of claim 11, further comprising:
    generating, by the smart grid control system, the expected demand duration curve for at least the first period of time based at least in part on a weather forecast for at least the first period of time.

13. The method of claim 2 wherein said determining, by the smart grid control system, whether to perform an additional approximation iteration based at least in part on the updated estimated demand duration curve comprises determining, by the smart grid control system, whether the updated estimated demand duration curve satisfies one or more user-inputted accuracy parameters.

14. The method of claim 1 wherein each said approximation iteration further comprises:
    selecting, by the smart grid control system, at least one new path through the revised probability tree; and
    performing, by the smart grid control system, a deterministic optimization technique for the selected at least one new path to simulate or value the selected at least one new path.

15. The method of claim 1 wherein said revising, by the smart grid control system, the probability tree based at least in part on an analysis of a most recently updated version of the estimated demand duration curve comprises revising, by the smart grid control system, a portion of the probability tree that corresponds to the resource with a smallest sensitivity factor that is still greater than a threshold value.

16. The method of claim 1, further comprising:
    generating a plurality of expected demand duration curves respectively for a plurality of different time periods; and
    performing, by the smart grid control system, the plurality of approximation iterations for each of the plurality of different time periods, the plurality of approximation iterations performed for each respective time period including iterative updates to an estimated demand duration curve for such time period based at least in part on a respective expected demand duration curve generated for such time period.

17. The method of claim 1 wherein said building, by the smart grid control system, a probability tree comprises building, by the smart grid control system, the probability tree comprising the plurality of leaves, at least some of the plurality of leaves respectively representative of energy transmission and transportation resources or energy generation fuel resources.

18. The method of claim 1 wherein said controlling, by the smart grid control system, the smart energy grid to activate or deactivate one or more resources of the smart energy grid based at least in part on the most recently revised probability tree comprises causing, by the smart grid control system, one or more of the plurality of resources to come online or offline based at least in part on the most recently revised probability tree.

19. A smart energy grid control system to control a smart energy grid, the smart energy grid control system comprising:
at least one processor; and
at least one non-transitory processor-readable medium storing at least one of data and instructions that, when executed by the at least one processor, cause the smart energy grid control system to:
receive input data that describes one or more operational parameters of each of a plurality of resources of the smart energy grid, the plurality of resources comprising at least a plurality of energy generation resources;
build a probability tree based at least in part on the received input data, the probability tree comprising a plurality of leaves, each leaf of the plurality of leaves representative of one or more of the plurality of resources of the smart energy grid;
select at least one initial path of paths through the probability tree;
determine an estimated demand duration curve based on the at least one initial path through the probability tree;
determine whether the estimated demand duration curve for the at least one initial path satisfies one or more accuracy requirements;
responsive to a determination that the estimated demand duration curve does not satisfy the one or more accuracy requirements, perform one or more approximation iterations in which the smart energy grid control system iteratively revises the probability tree based at least in part on an analysis of the estimated demand duration curve, iteratively selects at least one revised path through a revised probability tree, and iteratively updates the estimated demand duration curve, the instructions to cause the smart energy grid control system to perform each of the one or more approximation iterations further causing the smart energy grid control system to:
revise the probability tree based at least in part on an analysis of a most recently updated version of the estimated demand duration curve, including causing the smart energy grid control system to:
split a first path of the paths through the probability tree into at least a second path and at least a third path, and
determine a sensitivity factor for each resource included in said at least second path and said at least third path, the sensitivity factor determined for said each resource indicating a magnitude of impact that operational unavailability of said each resource will have on the estimated demand duration curve; and
responsive to a determination that the estimated demand duration curve satisfies the one or more accuracy requirements, control the smart energy grid to respectively activate for at least one period of time at least one of the plurality of resources of the smart energy grid that respectively correspond to the leaves of the probability tree included in a most recently selected path.

20. The smart energy grid control system of claim 19 wherein the at least one of data and instructions that cause the smart energy grid control system to perform one or more approximation iterations further cause, for each of the one or more approximation iterations, the smart energy grid control system to:
update the estimated demand duration curve based at least in part on the determined sensitivity factors for each resource included in said at least second path and said at least third paths; and
determine whether an updated estimated demand duration curve satisfies the one or more accuracy requirements.

21. The smart energy grid control system of claim 19 wherein the data or instructions that cause the smart energy grid control system to revise the probability tree based at least in part on the estimated demand duration curve cause the smart energy grid control system to revise a portion of the probability tree associated with at least one of the plurality of resources selected based on the sensitivity factors.

22. The smart energy grid control system of claim 21 wherein the data or instructions that cause the smart energy grid control system to revise a portion of the probability tree associated with at least one of the plurality of resources selected based on the sensitivity factors cause the smart energy grid control system to revise the portion of the probability tree to increase a number of states associated with the at least one of the plurality of resources selected based on the sensitivity factors.

23. The smart energy grid control system of claim 20 wherein the data or instructions further cause the smart energy grid control system to:
generate an expected demand duration curve for the at least one period of time, the expected demand duration curve descriptive of an expected amount of energy demand for the at least one period of time;
wherein the data or instructions that cause the smart energy grid control system to determine whether the updated estimated demand duration curve satisfies the one or more accuracy requirements cause the smart energy grid control system to compare the updated estimated demand duration curve to the expected demand duration curve for the at least one period.

24. A smart energy grid, comprising:
a plurality of resources, at least some of the plurality of resources comprising energy generation resources; and
a smart grid controller respectively controllingly coupled to the plurality of resources, the smart grid controller comprising at least one processor, wherein the smart grid controller:
generates a plurality of operational models respectively for the plurality of resources for at least one time period, the plurality of operational models respectively descriptive of operational availability of the plurality of resources during the at least one time period;

builds a probability tree having a plurality of leaves, each leaf being representative of one or more of the plurality of resources during the at least one time period, the probability tree including respective probabilities of operational availability for the plurality of resources based on the respective operational models;

evaluates an availability for each of the plurality of resources according to at least one initial path of paths through the probability tree;

determines a plurality of sensitivity factors respectively for the plurality of resources, wherein the sensitivity factor determined for each resource indicates a magnitude of impact that operational unavailability of such resource will have on an estimated demand duration curve for the smart energy grid for the at least one time period;

revises a portion of the probability tree associated with at least one of the plurality of resources selected based on the sensitivity factors, the revising comprising:

splitting a first path of the paths through the probability tree into at least a second path and at least a third path, and determining, by the smart grid control system, a sensitivity factor for each resource included in said at least second path and said at least third path; and controls one or more of the plurality of resources based at least in part on the revised probability tree.

25. The smart energy grid of claim 24 wherein, prior to determination of the plurality of sensitivity factors, the smart grid controller further determines whether the plurality of resources according to the at least one initial path through the probability tree provide sufficient energy to meet an expected energy demand, and, responsive to a determination that the plurality of resources according to the at least one initial path through the probability tree do not provide sufficient energy to meet the expected energy demand, supplements the probability tree to include at least one additional representation of at least one additional resource controllably coupleable to the smart energy grid.

26. The smart energy grid of claim 24 wherein the smart grid controller further:

evaluates the availability for each of the plurality of resources according to at least one additional path through the revised probability tree; and generates an estimated demand duration curve based at least in part on at least one additional path through the revised probability tree.

27. The smart energy grid of claim 26 wherein the smart grid controller further:

calculates at least one of an expected unserved energy, a loss of demand probability, and a loss of load probability based at least in part on the estimated demand duration curve.

28. The smart energy grid control system of claim 19, wherein the instructions cause the smart energy grid control system to, responsive to a determination that the estimated demand duration curve does not satisfy the one or more accuracy requirements, perform the one or more approximation iterations to iteratively revise a structure of the probability tree based at least in part on an analysis of the estimated demand duration curve.

29. The smart energy grid of claim 24, wherein the smart grid controller revises a structure of the probability tree associated with at least one of the plurality of resources selected based on the sensitivity factors.

* * * * *